(12) United States Patent
Ishiguro

(10) Patent No.: US 7,216,368 B2
(45) Date of Patent: May 8, 2007

(54) INFORMATION PROCESSING APPARATUS FOR WATERMARKING DIGITAL CONTENT

(75) Inventor: Ryuji Ishiguro, Tokyo (JP)

(73) Assignee: Sony Corporation (JP)

( * ) Notice: Subject to any disclaimer, the term of this patent is extended or adjusted under 35 U.S.C. 154(b) by 566 days.

(21) Appl. No.: 10/276,907

(22) PCT Filed: Mar. 27, 2002

(86) PCT No.: PCT/JP02/02956

§ 371 (c)(1),
(2), (4) Date: May 21, 2003

(87) PCT Pub. No.: WO02/080442

PCT Pub. Date: Oct. 10, 2002

(65) Prior Publication Data

US 2003/0185397 A1  Oct. 2, 2003

(30) Foreign Application Priority Data

Mar. 29, 2001 (JP) ............................. 2001-94807

(51) Int. Cl.
  *G06F 7/04* (2006.01)
  *H04L 9/00* (2006.01)
  *G06Q 99/00* (2006.01)
(52) U.S. Cl. .................. 726/32; 713/176; 713/189; 726/27; 705/57; 705/59
(58) Field of Classification Search ............. 713/176, 713/182, 189; 726/27, 28, 29, 32; 705/59
See application file for complete search history.

(56) References Cited

U.S. PATENT DOCUMENTS

| | | | |
|---|---|---|---|
| 6,611,607 B1 * | 8/2003 | Davis et al. | 382/100 |
| 6,792,113 B1 * | 9/2004 | Ansell et al. | 380/284 |
| 6,886,098 B1 * | 4/2005 | Benaloh | 713/193 |
| 6,912,512 B2 * | 6/2005 | Miyazaki et al. | 705/51 |
| 7,046,807 B2 * | 5/2006 | Hirano et al. | 380/234 |
| 2001/0037456 A1 * | 11/2001 | Levy | 713/176 |
| 2001/0051996 A1 * | 12/2001 | Cooper et al. | 709/217 |
| 2002/0007456 A1 * | 1/2002 | Peinado et al. | 713/164 |
| 2002/0049580 A1 * | 4/2002 | Kutaragi et al. | 704/1 |
| 2002/0052885 A1 * | 5/2002 | Levy | 707/200 |
| 2002/0077988 A1 * | 6/2002 | Sasaki et al. | 705/59 |
| 2002/0138593 A1 * | 9/2002 | Novak et al. | 709/219 |
| 2002/0194209 A1 * | 12/2002 | Bolosky et al. | 707/205 |
| 2003/0135464 A1 * | 7/2003 | Mourad et al. | 705/50 |

FOREIGN PATENT DOCUMENTS

| | | |
|---|---|---|
| EP | 0 999 488 A2 | 5/2000 |
| EP | 1 001 419 A1 | 5/2000 |
| JP | 11-55618 A1 | 2/1999 |
| JP | 2000-172648 A1 | 6/2000 |
| JP | 2000-207835 A1 | 7/2000 |
| JP | 2000-357201 A1 | 12/2000 |
| JP | 2001-52072 A1 | 2/2001 |

* cited by examiner

*Primary Examiner*—Ayaz Sheikh
*Assistant Examiner*—Christian LaForgia
(74) *Attorney, Agent, or Firm*—Lerner, David, Littenberg, Krumholz & Mentlik, LLP

(57) ABSTRACT

This invention relates to an information processing apparatus for managing copyrights under SDMI provisions as well as the copyrights for contents distributed over the Internet. Data Enc(Kc, Content) generated by encrypting a given content using a content key Kc are recorded, along with a header (Header), certificate (Cert), data Enc(KR, Kc) generated by encrypting the content key Kc using a root key KR, and an enabling key block (EKB). The header includes a content ID (CID), a license ID (LID), a URL, and a watermark (WM), supplemented with a header signature Sig(Header). The inventive apparatus is applied to devices that provide contents.

9 Claims, 45 Drawing Sheets

FIG. 8

| LICENSE ID |
| :---: |
| DATE AND TIME OF PREPARATION |
| EXPIRATION DATE |
| USE CONDITIONS |
| LEAF ID |
| DIGITAL SIGNATURE |
| LICENSE |

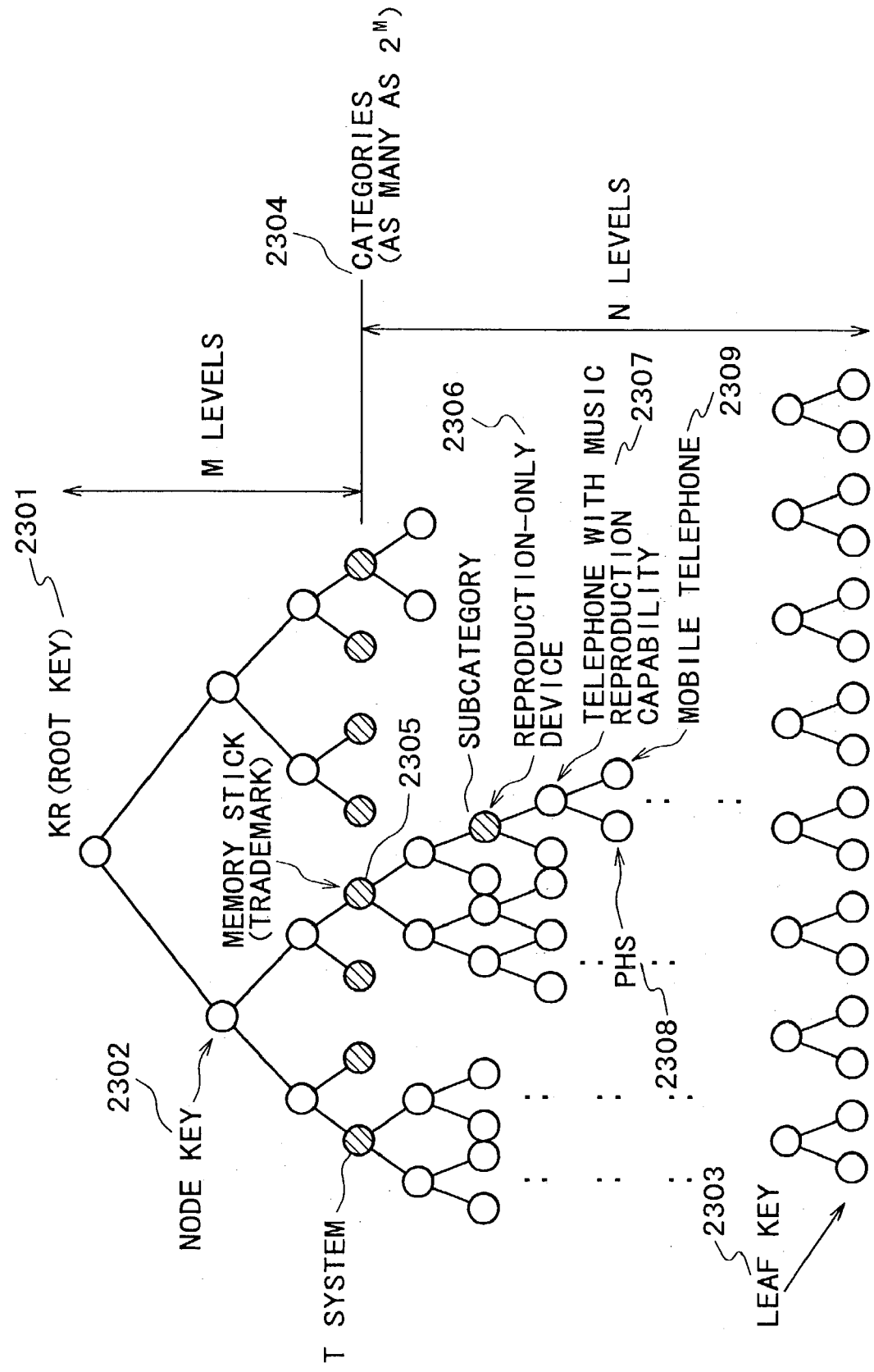

FIG. 15A

| VERSION t ||
|---|---|
| INDEX | ENCRYPTION KEY |
| 0 | Enc (K(t)0, K(t)R) |
| 00 | Enc (K(t)00, K(t)0) |
| 000 | Enc (K000, K(t)00) |
| 001 | Enc (K(t)001, K(t)00) |
| 0010 | Enc (K0010, K(t)001) |

FIG. 15B

| VERSION t ||
|---|---|
| INDEX | ENCRYPTION KEY |
| 000 | Enc (K000, K(t)00) |
| 001 | Enc (K(t)001, K(t)00) |
| 0010 | Enc (K0010, K(t)001) |

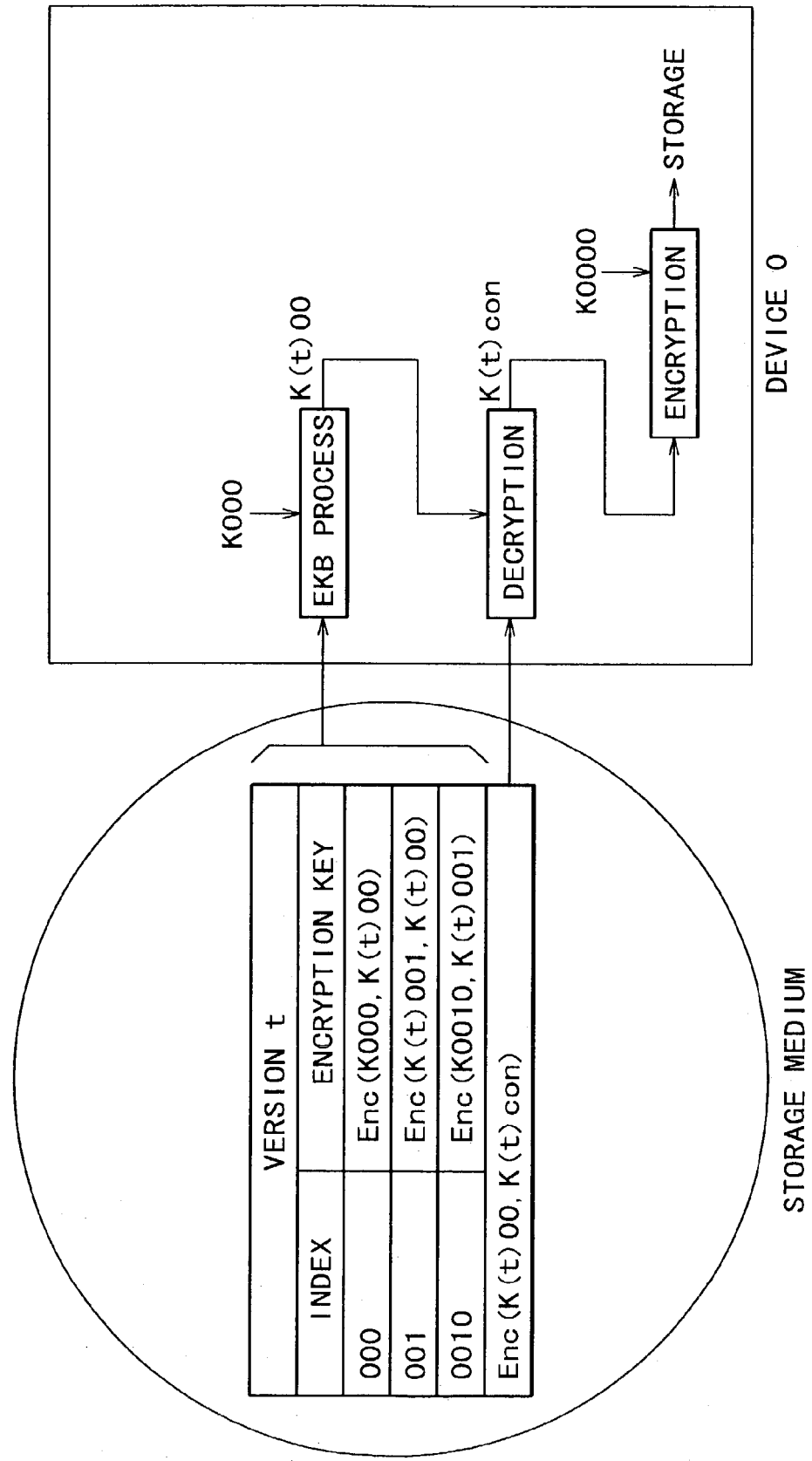

EKB

| DATA (ENCRYPTION KEY) | Enc(K0, K(t)R), Enc(K(t)1, K(t)R) <br> Enc(K(t)10, K(t)1), Enc(K11, K(t)1) <br> Enc(K(t)100, K(t)10), Enc(K101, K(t)10) <br> Enc(K1000, K(t)100) |
|---|---|
| TAG | 0: {0, 0}, 1: {1, 1}, 2: {0, 0}, 3: (0, 0) <br> 4: {1, 1}, 5: {0, 1}, 6: {1, 1} |

{LEFT TAG, RIGHT TAG}
" 0" STANDS FOR THE PRESENCE
OF DATA AND " 1" FOR THE
ABSENCE THEREOF IN EACH OF THE
LEFTWARD AND RIGHTWARD DIRECTIONS

MARK

Mark={LeafID, Own, Sigs(LeafID, Own)}

Enc ($K_{P11}$, Kc), Enc ($K_{P12}$, Kc), Enc ($K_{P13}$, Kc)

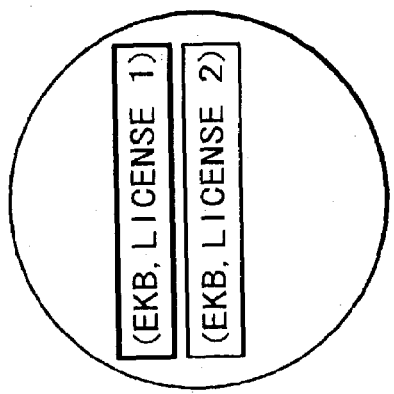
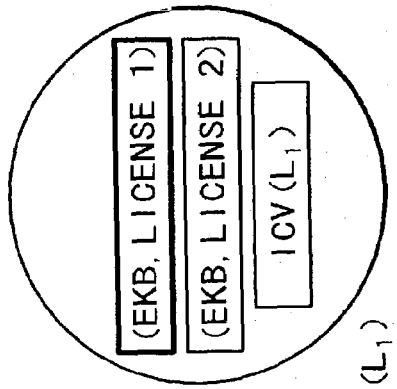
FIG. 50A
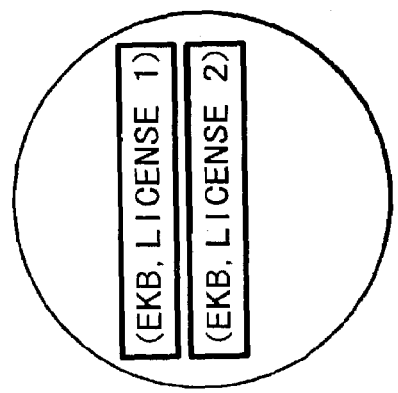
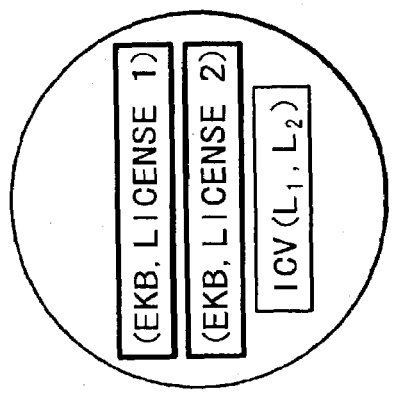
FIG. 50B

INFORMATION PROCESSING APPARATUS FOR WATERMARKING DIGITAL CONTENT

CROSS-REFERENCE TO RELATED APPLICATIONS

The present application is a national stage application under 35 U.S.C. 0 371 of International Application No. PCT/JP02/02956, filed Mar. 27, 2002, which claims priority from Japanese Application No. P2001-094807, filed Mar. 29, 2001.

BACKGROUND OF THE INVENTION

1. Technical Field

The present invention relates to an information processing apparatus. More particularly, the invention relates to an information processing apparatus for allowing different systems to manage contents using the same format.

2. Background Art

Today, the generalized use of telecommunication networks—typically the Internet—has enabled diverse kinds of audio and video contents to be distributed extensively.

There is concern that the Internet, with its global scale, could be utilized in distributing illegal copies of contents. This could cause serious damage to the copyright holders of the contents involved.

A copyright management system called SDMI (Secura Digital Music Intiative) has been established. The provisions of SDMI envisage proper control of the copyrights for contents such as music data that may be copied by users of audio equipment for their use.

Conventionally, different formats have been required for copyright control in two different cases of data distribution: when users of audio equipment copy contents for their personal use, and when contents are distributed over the Internet.

In order to address these requirements, the manufacturers of personal audio equipment and other content-handling devices have resorted to specialized formats of data exchange for such equipment and devices. The aim is to apply the audio equipment and other content-handling devices to all systems that may be employed for data distribution.

Under these circumstances, it has become difficult to manage the copyrights for contents being distributed particularly over the Internet.

SUMMARY OF THE INVENTION

The present invention has been made in view of the above circumstances and provides an apparatus, a method, and a program for allowing different systems to exercise secure control over the copyrights for contents.

In carrying out the invention and according to a first aspect thereof, there is provided an information processing apparatus for providing a content, comprising: a content acquiring element for acquiring the content; an extracting element for extracting a watermark from the content acquired by the content acquiring element; a header preparing element for preparing a header including the watermark extracted by the extracting element; a digital signature preparing element which, by use of a private key, prepares a digital signature based on data in the header prepared by the header preparing element; an encrypting element for encrypting the content acquired by the content acquiring element; a key information acquiring element for acquiring key information including key information needed to decrypt the content encrypted by the encrypting element; and a formatting element for formatting into a file format the header prepared by the header preparing element, the digital signature prepared by the digital signature preparing element, the content encrypted by the encrypting element, and the key information acquired by the key information acquiring element, before outputting what is formatted.

In a preferred structure according to the first aspect of the invention, the watermark may include copy control information.

In another preferred structure according to the first aspect of the invention, the header prepared by the header preparing element may include content identification information for identifying the content and license specifying information for specifying a license for the content.

In a further preferred structure according to the first aspect of the invention, the information processing apparatus may further comprise a certificate acquiring element for acquiring a certificate including a public key paired with the private key; wherein the formatting element formats into the file format the certificate acquired by the certificate acquiring element, before outputting the formatted certificate.

According to a second aspect of the invention, there is provided an information processing method for use with an information processing apparatus for providing a content, the information processing method comprising the steps of: acquiring the content; extracting a watermark from the content acquired in the content acquiring step; preparing a header including the watermark extracted in the extracting step; preparing a digital signature based on data in the header prepared in the header preparing step by use of a private key; encrypting the content acquired in the content acquiring step; acquiring key information including key information needed to decrypt the content encrypted in the encrypting step; and formatting into a file format the header prepared in the header preparing step, the digital signature prepared in the digital signature preparing step, the content encrypted in the encrypting step, and the key information acquired in the key information acquiring step, before outputting what is formatted.

According to a third aspect of the invention, there is provided a storage medium which stores a computer-readable program for use with an information processing apparatus for providing a content, the program comprising the steps of: acquiring the content; extracting a watermark from the content acquired in the content acquiring step; preparing a header including the watermark extracted in the extracting step; preparing a digital signature based on data in the header prepared in the header preparing step by use of a private key; encrypting the content acquired in the content acquiring step; acquiring key information including key information needed to decrypt the content encrypted in the encrypting step; and formatting into a file format the header prepared in the header preparing step, the digital signature prepared in the digital signature preparing step, the content encrypted in the encrypting step, and the key information acquired in the key information acquiring step, before outputting what is formatted.

According to a fourth aspect of the invention, there is provided a program executable by a computer for controlling an information processing apparatus for providing a content, the program causing the computer to carry out the steps of: acquiring the content; extracting a watermark from the content acquired in the content acquiring step; preparing a header including the watermark extracted in the extracting step; preparing a digital signature based on data in the header prepared in the header preparing step by use of a private key; encrypting the content acquired in the content acquiring step; acquiring key information including key information needed to decrypt the content encrypted in the encrypting step; and formatting into a file format the header prepared in the header preparing step, the digital signature prepared in the digital signature preparing step, the content encrypted in the encrypting step, and the key information acquired in the key information acquiring step, before outputting what is formatted.

According to a fifth aspect of the invention, there is provided an information processing apparatus for outputting a content, comprising: a content acquiring element for acquiring the content which has been encrypted; a key information detecting element for detecting key information which is attached to the content acquired by the content acquiring element and which is needed to decrypt the content; a content key acquiring element for acquiring a content key needed to decrypt the content, by use of the key information detected by the key information detecting element; a decrypting element for decrypting the content acquired by the content acquiring element, by use of the content key acquired by the content key acquiring element; a certificate detecting element for detecting a certificate from the content acquired by the content acquiring element; a first authenticating element for authenticating the certificate detected by the certificate detecting element, by use of a public key from a certificate authority; a public key acquiring element for acquiring a public key of a content provider providing the content, from the certificate detected by the certificate detecting element; a digital signature detecting element for detecting a digital signature from the content acquired by the content acquiring element; a second authenticating element for authenticating the digital signature detected by the digital signature detecting element, by use of the public key of the content provider acquired by the public key acquiring element; a watermark detecting element for detecting a watermark from a header attached to the content acquired by the content acquiring element; and a controlling element for controlling output of the content on the basis of the watermark detected by the watermark detecting element.

According to a sixth aspect of the invention, there is provided an information processing method for use with an information processing apparatus for outputting a content, the information processing method comprising the steps of: acquiring the content which has been encrypted; detecting key information which is attached to the content acquired in the content acquiring step and which is needed to decrypt the content; acquiring a content key needed to decrypt the content, by use of the key information detected in the key information detecting step; decrypting the content acquired in the content acquiring step, by use of the content key acquired in the content key acquiring step; detecting a certificate from the content acquired in the content acquiring step; firstly authenticating the certificate detected in the certificate detecting step, by use of a public key from a certificate authority; acquiring a public key of a content provider providing the content, from the certificate detected in the certificate detecting step; detecting a digital signature from the content acquired in the content acquiring step; secondly authenticating the digital signature detected in the digital signature detecting step, by use of the public key of the content provider acquired in the public key acquiring step; detecting a watermark from a header attached to the content acquired in the content acquiring step; and controlling output of the content on the basis of the watermark detected in the watermark detecting step.

According to a seventh aspect of the invention, there is provided a storage medium which stores a computer-readable program for use with an information processing apparatus for outputting a content, the program comprising the steps of: acquiring the content which has been encrypted; detecting key information which is attached to the content acquired in the content acquiring step and which is needed to decrypt the content; acquiring a content key needed to decrypt the content, by use of the key information detected in the key information detecting step; decrypting the content acquired in the content acquiring step, by use of the content key acquired in the content key acquiring step; detecting a certificate from the content acquired in the content acquiring step; firstly authenticating the certificate detected in the certificate detecting step, by use of a public key from a certificate authority; acquiring a public key of a content provider providing the content, from the certificate detected in the certificate detecting step; detecting a digital signature from the content acquired in the content acquiring step; secondly authenticating the digital signature detected in the digital signature detecting step, by use of the public key of the content provider acquired in the public key acquiring step; detecting a watermark from a header attached to the content acquired in the content acquiring step; and controlling output of the content on the basis of the watermark detected in the watermark detecting step.

According to an eighth aspect of the invention, there is provided a program executable by a computer for controlling an information processing apparatus for outputting a content, the program causing the computer to carry out the steps of: acquiring the content which has been encrypted; detecting key information which is attached to the content acquired in the content acquiring step and which is needed to decrypt the content; acquiring a content key needed to decrypt the content, by use of the key information detected in the key information detecting step; decrypting the content acquired in the content acquiring step, by use of the content key acquired in the content key acquiring step; detecting a certificate from the content acquired in the content acquiring step; firstly authenticating the certificate detected in the certificate detecting step, by use of a public key from a certificate authority; acquiring a public key of a content provider providing the content, from the certificate detected in the certificate detecting step; detecting a digital signature from the content acquired in the content acquiring step; secondly authenticating the digital signature detected in the digital signature detecting step, by use of the public key of the content provider acquired in the public key acquiring step; detecting a watermark from a header attached to the content acquired in the content acquiring step; and controlling output of the content on the basis of the watermark detected in the watermark detecting step.

Where the information processing apparatus, information processing method, storage medium, and program according to the first, second, third, and fourth aspects of the invention are in use, a header is first prepared including a watermark extracted from a content that is acquired. A private key is used to prepare a digital signature based on data in the prepared header. Also acquired is key information including key information needed to decrypt the acquired content that has been encrypted. The header, digital signature, content, and key information are all formatted into a file format before being output.

Where the information processing apparatus, information processing method, storage medium, and program according to the fifth, sixth, seventh, and eighth aspects of the invention are in use, a content is decrypted using a content key which is acquired by use of key information for decrypting an encrypted content and which is needed to decrypt the content in question. A digital signature attached to the content is authenticated using a public key of a content provider providing the content. A watermark, extracted from a header attached to the content, is used as the basis for controlling output of the content.

BRIEF DESCRIPTION OF THE DRAWINGS

FIG. 8 is a schematic view of a license structure;

FIG. 14 is a schematic view illustrating typical correspondences between nodes and devices;

FIG. 15A is an explanatory view of an enabling key block structure;

FIG. 15B is an explanatory view of another enabling key block structure;

FIG. 16 is an explanatory view showing how an enabling key block is utilized;

FIG. 50A is an explanatory view depicting how a license copying process is managed with ICV;

FIG. 50B is another explanatory view indicating how the license copying process is managed with ICV.

DETAILED DESCRIPTION

Best Mode for Carrying Out the Invention

Figure 1:
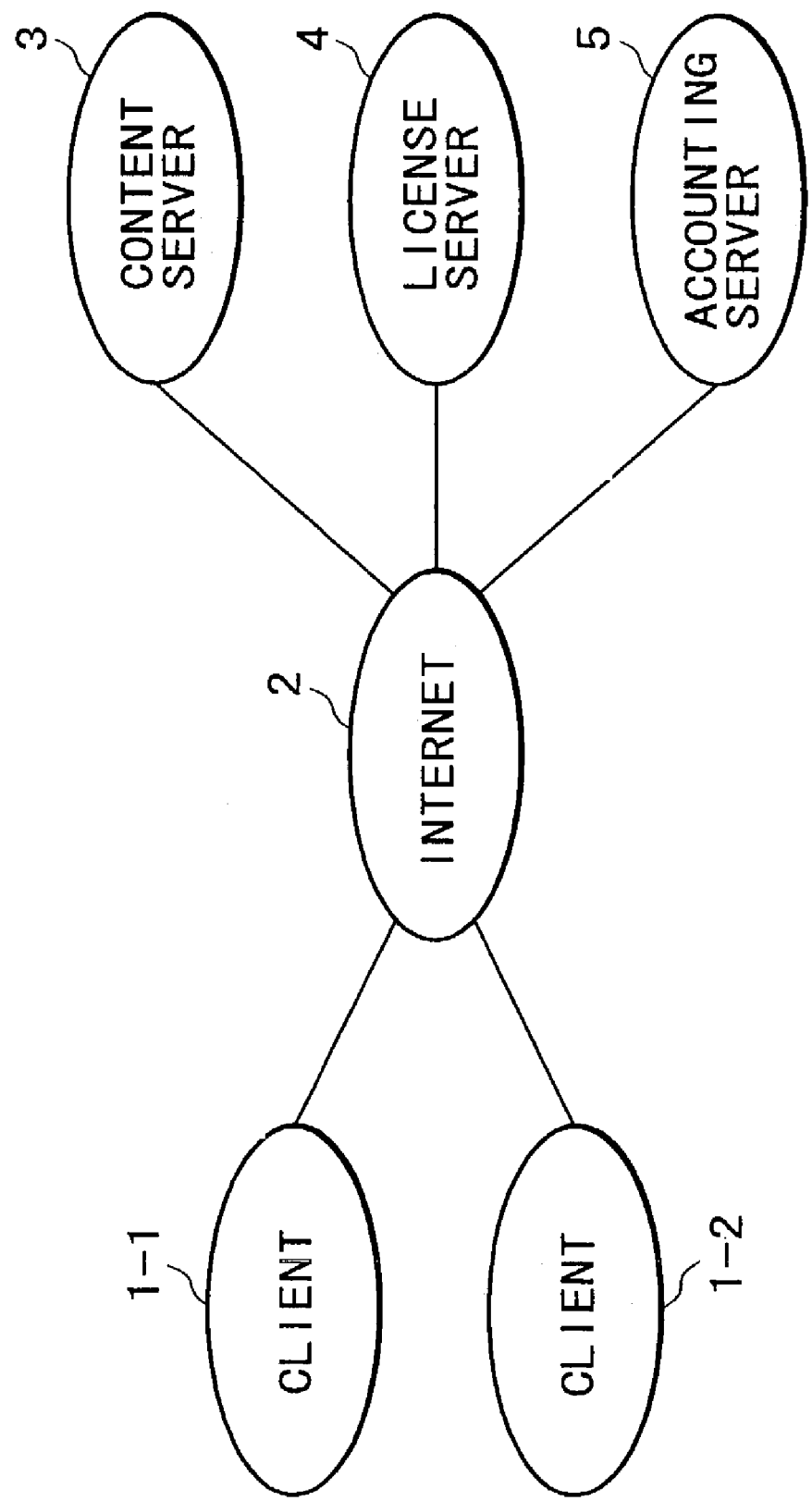
FIG. 1 is a block diagram outlining a typical configuration of a content providing system according to the invention.

FIG. 1 outlines a typical configuration of a content providing system according to the invention. Clients 1-1 and 1-2 (simply called the client 1 hereunder if there is no need for distinction therebetween) are connected to the Internet 2. Although only two clients are shown configured in the example of FIG. 1, any number of clients may be connected to the Internet 2 in practice.

The Internet 2 is also connected with a content server 3, a license server 4, and an accounting server 5. The content server 3 provides contents to the client 1. The license server 4 offers the client 1 licenses for using the contents provided by the content server 3. The accounting server 5 performs an accounting process regarding the client 1 having acquired a license.

Any number of content servers 3, license servers 4, and accounting servers 5 may be configured and connected to the Internet 2 in practice.

Figure 2:
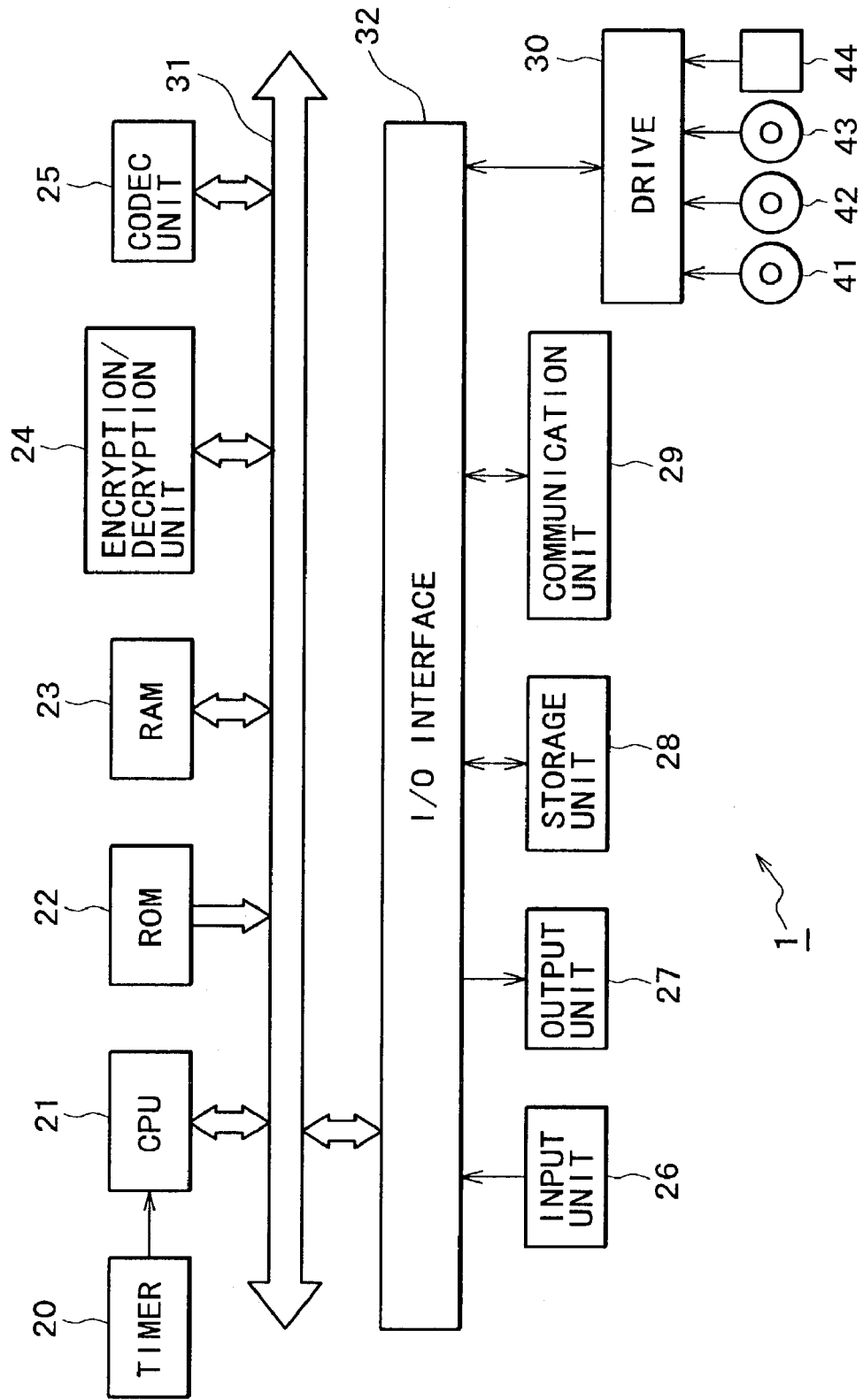
FIG. 2 is a block diagram showing a typical structure of a client included in the system of FIG. 1.

FIG. 2 shows a typical structure of the client 1.

In FIG. 2, a CPU (central processing unit) 21 carries out various processes using programs held in a ROM (read-only memory) 22 or those loaded from a storage unit 28 into a RAM (random access memory) 23. A timer 20 keeps time and supplies time information to the CPU 21. As needed, the RAM 23 may accommodate data required by the CPU 21 in executing diverse processes.

An encryption/decryption unit 24 encrypts content data and decrypts previously encrypted content data. A codec unit 25 encodes content data illustratively according to ATRAC3 (Adaptive Transform Acoustic Coding Version 3) standards, and sends the encoded data through an I/O interface 32 to a semiconductor memory 44 in a drive 30 for storage. The codec unit 25 also decodes encoded data retrieved from the semiconductor memory 44 in the drive 30.

The semiconductor memory 44 is illustratively constituted by a Memory Stick (trademark).

The CPU 21, ROM 22, RAM 23, encryption/decryption unit 24, and codec unit 25 are interconnected via a bus 31. The bus 31 is further connected to the I/O interface 32.

The I/O interface 32 is connected with an input unit 26, an output unit 27, a storage unit 28, and a communication unit 29. The input unit 26 comprises a keyboard and a mouse. The output unit 27 is composed of a display such as a CRT or an LCD as well as speakers. The storage unit 28 is typically made up of a hard disc drive. The communication unit 29 is illustratively composed of a modem or a terminal adapter that executes communication processes over the Internet 2. The communication unit 29 also exchanges analog or digital signals with other clients.

The I/O interface 23 is also connected to the drive 30 as needed. The drive 30 is loaded with a storage medium such as a magnetic disc 41, an optical disc 42, a magneto-optical disc 43, or a semiconductor memory 44 where necessary. Computer programs are retrieved from the loaded storage medium and installed into the storage unit 28 as needed.

Although not shown, the content server 3, license server 4, and accounting server 5 are each constituted by a computer having basically the same structure as that of the client 1 in FIG. 2. In the description that follows, structural details in FIG. 2 will be cited as applicable to the content server 3, license server 4, and accounting server 5 as well.

Figure 3:
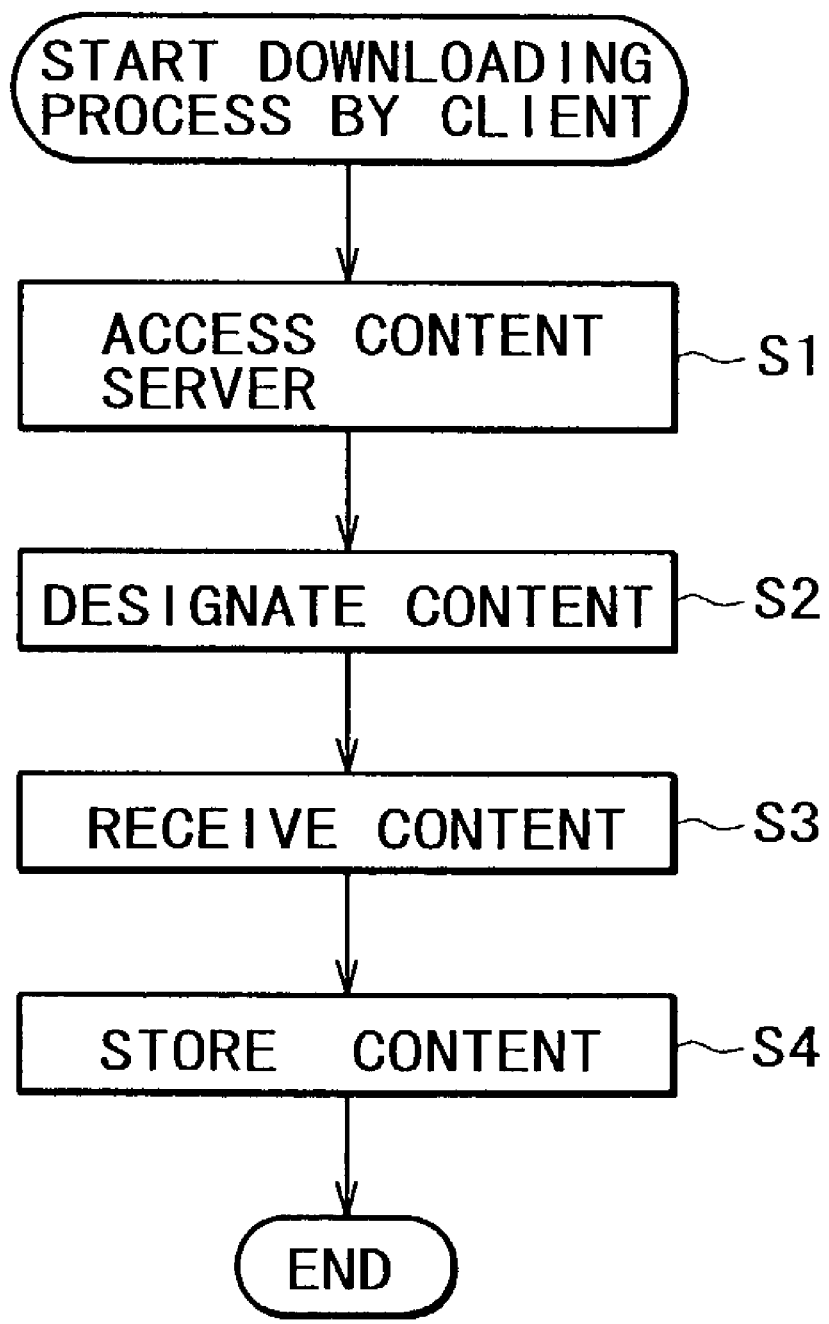
FIG. 3 is a flowchart of steps constituting a content downloading process performed by the client in FIG. 1.

How the client 1 is provided with a content from the content server 3 will now be described by referring to the flowchart of FIG. 3.

The user orders access to the content server 3 by operating the input unit 26. In response, the CPU 21 reaches step S1 and causes the communication unit 29 to access the content server 3 via the Internet 2. In step S2, the user inputs information for designating the content to be provided by operating the input unit 26. Given the content-designating information, the CPU 21 reports the information to the content server 3 through the communication unit 29 and via the Internet 2. Upon receipt of the report, the content server 3 returns encrypted content data, as will be described later with reference to the flowchart of FIG. 4. In step S3, the CPU 21 receives the transmitted content data through the communication unit 29. In step S4, the CPU 21 records the encrypted content data to the hard disc constituting the storage unit 28.

Figure 4:
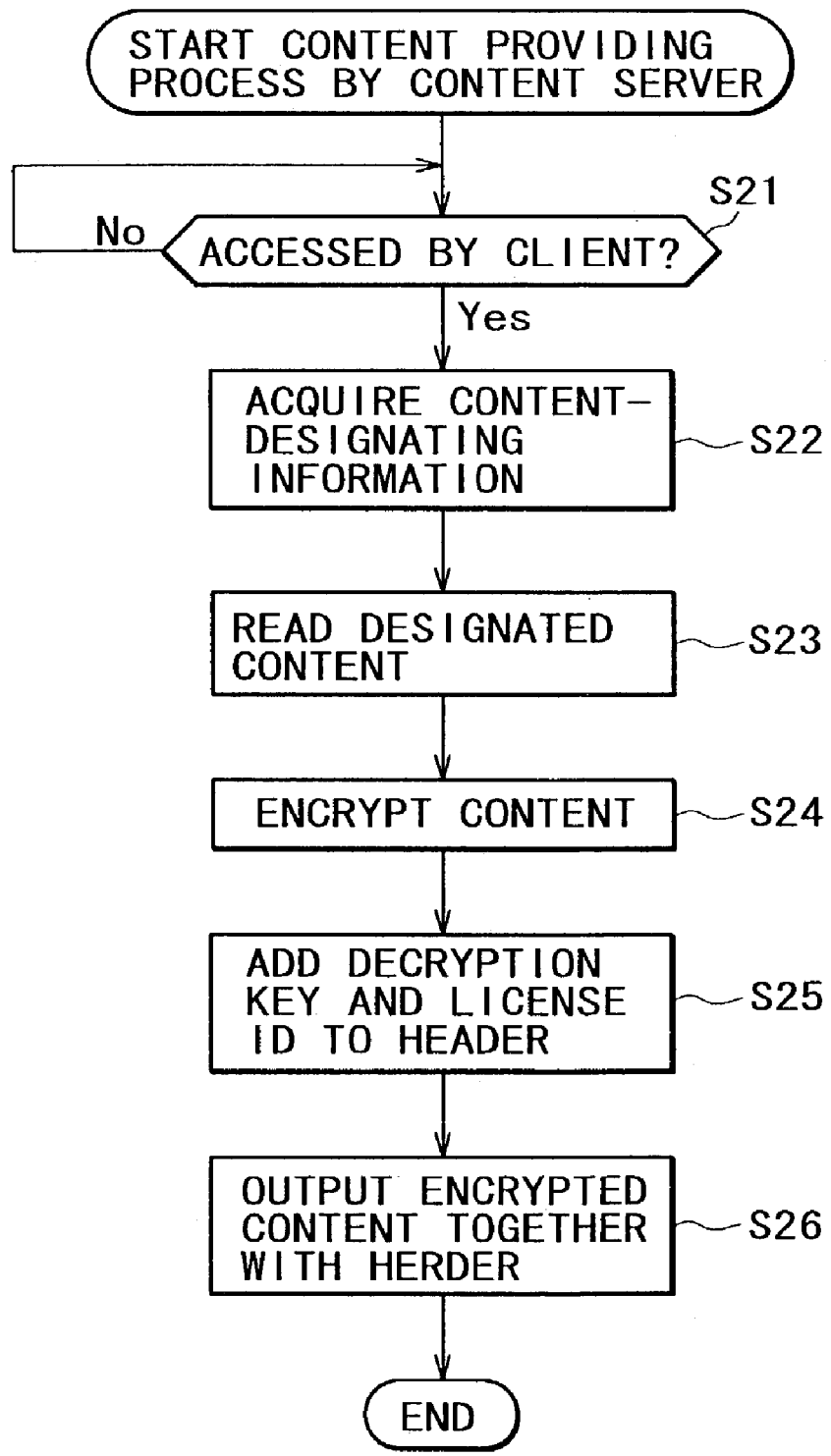
FIG. 4 is a flowchart of steps constituting a content providing process performed by a content server included in the system of FIG. 1.

Described below with reference to the flowchart of FIG. 4 is a content providing process carried out by the content server 3 in conjunction with the above-described process by the client 1. In the ensuing description, the structural details of the client 1 in FIG. 2 will be cited as applicable to the content server 3 as well.

In step S21, the CPU 21 of the content server 3 waits until it is accessed by the client 1 through the communication unit 29 and over the Internet 2. When accessed by the client 1, the CPU 21 reaches step S22 and acquires content-designating information sent from the client 1. This is the information reported by the client 1 in step S2 of FIG. 3.

In step S23, the CPU 21 of the content server 3 retrieves from the storage unit 28 the content designated by the information acquired in step S22. In step S24, the CPU 21 supplies the encryption/decryption unit 24 with the content data retrieved from the storage unit 28 and causes the unit 24 to encrypt the supplied data using a content key Kc.

All content data held in the storage unit 28 have already been encoded by the codec unit 25 based on ATRAC3. Any encoded content data retrieved from the storage unit 28 are thus encrypted further by the encryption/decryption unit 24.

Obviously, all content data to be placed in the storage unit 28 may be encrypted in advance. In such a case, step S24 of FIG. 4 may be skipped.

In step S25, the CPU 21 of the content server 3 adds key information (i.e., enabling key block (EKB) and data $K_{EKBC}$ (Kc) to be described later by referring to FIG. 5) needed to decrypt the encrypted content, and a license ID for identifying the license granting the use of the content, to a header as part of a format in which to transmit the encrypted content data. In step S26, the CPU 21 of the content server 3 transmits the content encrypted in step S24 and the header furnished with the key and license ID in step S25 to the accessing client 1 through the communication unit 29 and over the Internet 2.

Figure 5:
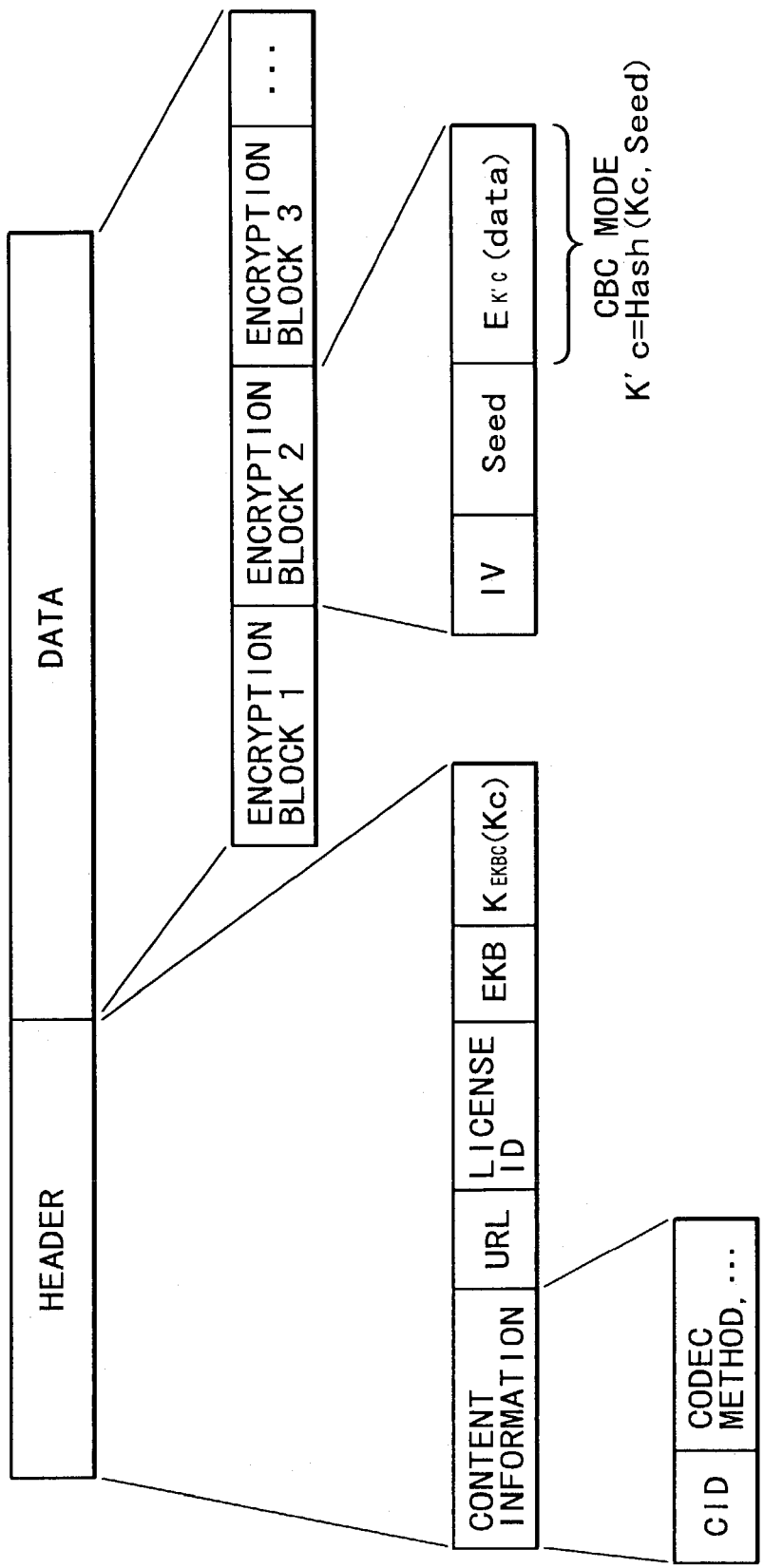
FIG. 5 is a schematic view of a format applicable to step S26 in FIG. 4.

FIG. 5 shows a typical format in which the content server 3 provides content data to the client 1. As illustrated in FIG. 5, the format is made up of a header and a data part.

The header comprises content information, a URL (uniform resource locator), a license ID, an enabling key block (EKB), and data $K_{EKBC}$(Kc) as the content key Kc encrypted by use of a key $K_{EKBC}$ derived from the EKB. The EKB will be described later in more detail with reference to FIGS. 15A and 15B.

The content information includes a content ID (CID) as information for identifying the content data formatted as data, and a codec method for coding and decoding the content in question.

The URL is information denoting the address to be accessed in acquiring the license designated by the license ID. Illustratively with the system of FIG. 1, the URL stands for the address of the license server 4 from which to acquire licenses. The license ID identifies the license to be needed in utilizing the relevant content recorded as data.

The data part comprises any number of encryption blocks. Each encryption block is made up of an initial vector (IV), a seed, and data EK'c(data) obtained by encrypting the content data using a key K'c.

The key K's is constituted by a value obtained by applying the content key Kc and a randomly established seed (value) to a hash function, as defined by the following expression:

$$K'c = \text{Hash}(Kc, \text{Seed})$$

Each encryption block is furnished with a different initial vector (IV) and a different seed.

The encryption of content data is carried out in units of eight bytes. Each eight-byte portion is encrypted by use of the encrypted result from the preceding eight-byte portion in what is known as CBC (cipher block chaining) mode.

In CBC mode, the first eight-byte content data portion cannot be encrypted using the encrypted result from the preceding eight-byte portion. Instead, the first eight-byte portion is encrypted by use of the initial vector IV as the initial value.

With CBC mode in effect, even if any one encryption block is unlawfully decrypted, the other encryption blocks will not be decrypted correspondingly.

This encryption scheme will be described later in more detail by referring to FIG. 47.

This encryption scheme, it should be noted, is not limitative of the invention. Alternatively, the content data may be encrypted by simply utilizing the content key Kc.

In the manner described, the client 1 can acquire content data unrestrainedly and free of charge from the content server 3. That is, large quantities of contents can be distributed in a fairly unconstrained manner.

However, before using any acquired content, each client 1 must be in possession of a license corresponding to the content. How the client reproduces a content will now be described by referring to FIG. 6.

In step S41, the CPU 21 of the client 1 acquires content ID information (CID) designated by the user operating the input unit 26. The ID information may be constituted illustratively by a content title and a number unique to each of the stored contents.

When a given content is designated, the CPU 21 reads a license ID relative to the content (i.e., ID of the license for granting the use of the content). The license ID is described in the header of the encrypted content data, as depicted in FIG. 5.

In step S42, the CPU 21 determines whether or not the license corresponding to the license ID retrieved in step S41 has already been acquired by the client 1 and stored in the storage unit 28. If the license has yet to be acquired, the CPU 21 goes to step S43 and performs a license acquiring process. Details of the license acquiring process will be described later with reference to the flowchart of FIG. 7.

If in step S42 the license is judged to have been acquired already or if the license acquiring process is carried out in step S43, then step S44 is reached. In step S44, the CPU 21 judges whether or not the acquired license falls within the corresponding expiration date. Whether or not the license has expired is determined by comparing the expiration date stipulated in the license (which will be described later by referring to FIG. 8) with the current date and time kept by the timer 20. If the license is judged to have expired, the CPU 21 goes to step S45 and performs a license renewing process. Details of the license renewing process will be described later by referring to the flowchart of FIG. 10.

If in step S44 the license is judged to be effective or if the license is renewed in step S45, then step S46 is reached. In step S46, the CPU 21 reads the applicable encrypted content data from the storage unit 28 and places the retrieved data into the RAM 23. In step S47, the CPU 21 supplies the encryption/decryption unit 24 with the content data stored in the RAM 23 in units of encryption blocks as shown in FIG. 5, and causes the unit 24 to decrypt the data using the content key Kc.

The content key Kc is obtained (to be described later in more detail by referring to FIGS. 15A and 15B) illustratively as follows: a key $K_{EKBC}$ is first acquired using a device node key (DNK). The content key Kc is then obtained from the data $K_{EKBC}(Kc)$ (see FIG. 5) by use of the acquired key $K_{EKBC}$.

In step S48, the CPU 21 supplies the codec unit 25 with the content data decrypted by the encryption/decryption unit 24, and causes the codec unit 25 to decode the supplied data. The CPU 21 then sends the data decoded by the codec unit 25 to the output unit 27 through the I/O interface 32. In turn, the output unit 27 converts the received digital data to analog format for audio output through the speakers.

How the license acquiring process is performed in step S43 of FIG. 6 will now be described in detail with reference to the flowchart of FIG. 7.

The client 1 accesses the license server 4 in advance for a registering process whereby service data are acquired, including a leaf ID, a DNK (device node key), a private key paired with a public key for the client 1, a public key of the license server 4, and certificates of the respective public keys. The registering process by the client 1 will be described later in detail by referring to FIG. 23.

The leaf ID represents identification information assigned to each client. The device node key (DNK) is required in decrypting an encrypted content key Kc included in the enabling key block (EKB) corresponding to the license of interest (DNK will be described later by referring to FIG. 12).

Figure 7:
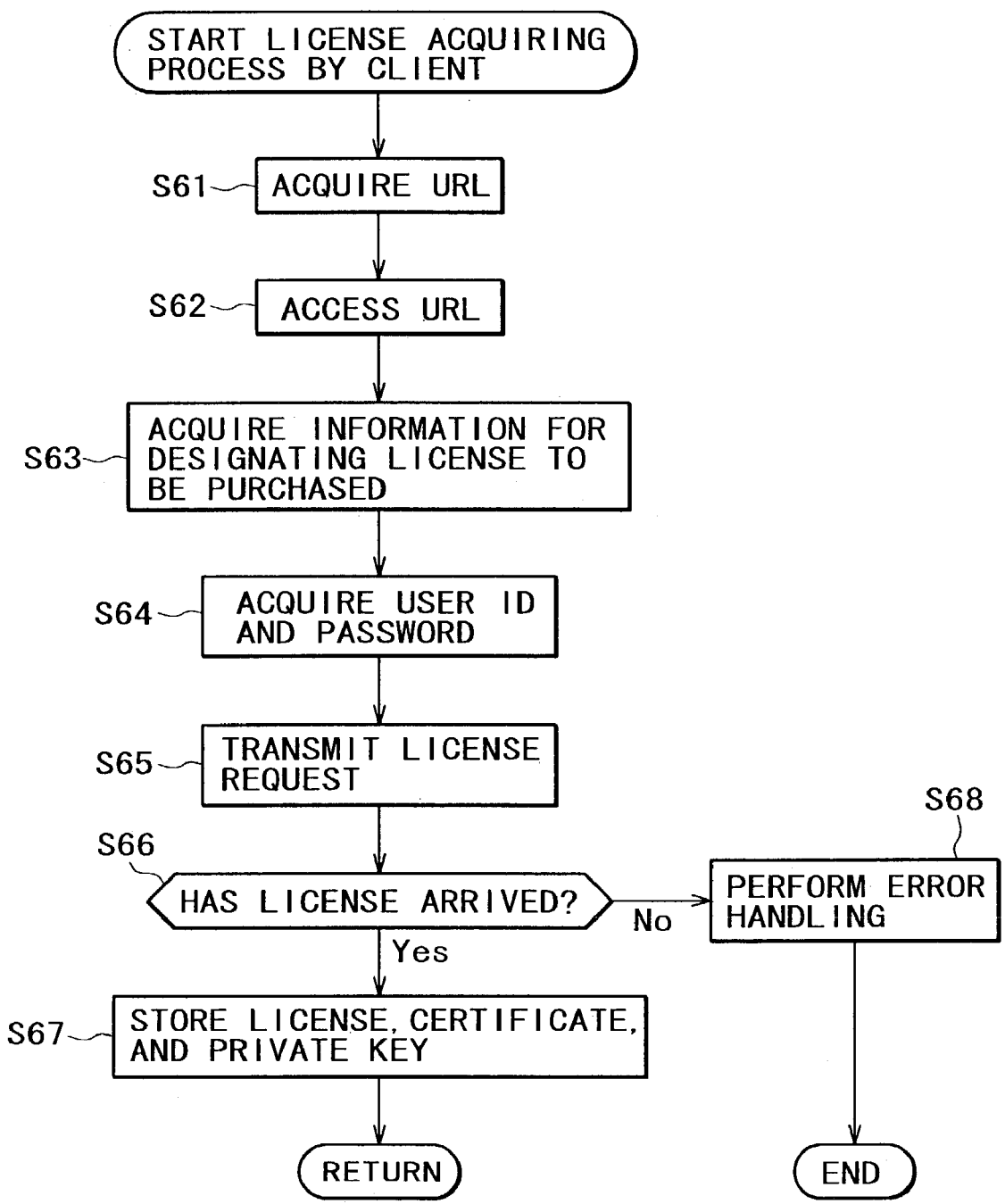
FIG. 7 is a flowchart of steps constituting a license acquiring process in step S43 of FIG. 6.

In step S61 of FIG. 7, the CPU 21 acquires from the header (FIG. 5) the URL corresponding to the license ID identifying the desired license. As described above, the URL denotes the address to be accessed in obtaining the license associated with the license ID also described in the header. In step S62, the CPU 21 accesses the URL obtained in step S61. More specifically, the CPU 21 gains access to the license server 4 through the communication unit 29 and over the Internet 2. At this point, the license server 4 requests the client 1 to input license-designating information for designating the license to be purchased (i.e., license needed for the use of the content), a user ID, and a password (see step S102 in FIG. 9). The CPU 21 displays the request on the display of the output unit 27. Given the display, the user operates the input unit 26 to enter the license-designating information, user ID, and password. The user ID and password have been acquired in advance by the user of the client 1 having accessed the license server 4 over the Internet 2.

In step S63, the CPU 21 acquires the license-designating information from the input unit 26. In step S64, the CPU 21 obtains the previously acquired user ID and password. In step S65, the CPU 21 causes the communication unit 29 to transmit to the license server 4 over the Internet a license request comprising the entered user ID, password, license-designating information, and a leaf ID contained in the service data (to be described later).

In turn, as will be described later with reference to FIG. 9, the license server 4 either transmits the license based on the user ID, password, and license-designating information (in step S109), or does not transmit the license if relevant conditions are not met (in step S112)

In step S66, the CPU 21 judges whether or not the license has arrived from the license server 4. If the license is judged transmitted, step S67 is reached in which the license is fed to the storage unit 28 for storage therein.

If in step S66 the license is not judged transmitted from the license server 4, then the CPU 21 goes to step S68 for error handling. More specifically, the CPU 21 inhibits any content reproducing process because the license for granting the use of the content in question is not acquired.

It is only after the client 1 has obtained the license applicable to the license ID attached to the content data in carrying out the above steps, can the content be used for reproduction.

The license acquiring process of FIG. 7 may alternatively be carried out before each user proceeds to obtain any content.

The license offered to the client 1 contains use conditions, a leaf ID, and other data items as shown in FIG. 8.

The use conditions include such information as a use time limit within which the content may be used, a download time limit within which the content may be downloaded, a maximum number of times the content may be copied, the number of times the content has been checked out so far, a maximum number of times the content may be checked out, the right to record the content to a CD-R, a maximum number of copies that can be made of the content to PDs (portable devices), the right to purchase the license outright, and the duty to keep use logs, all according to the license in question.

Figure 9:
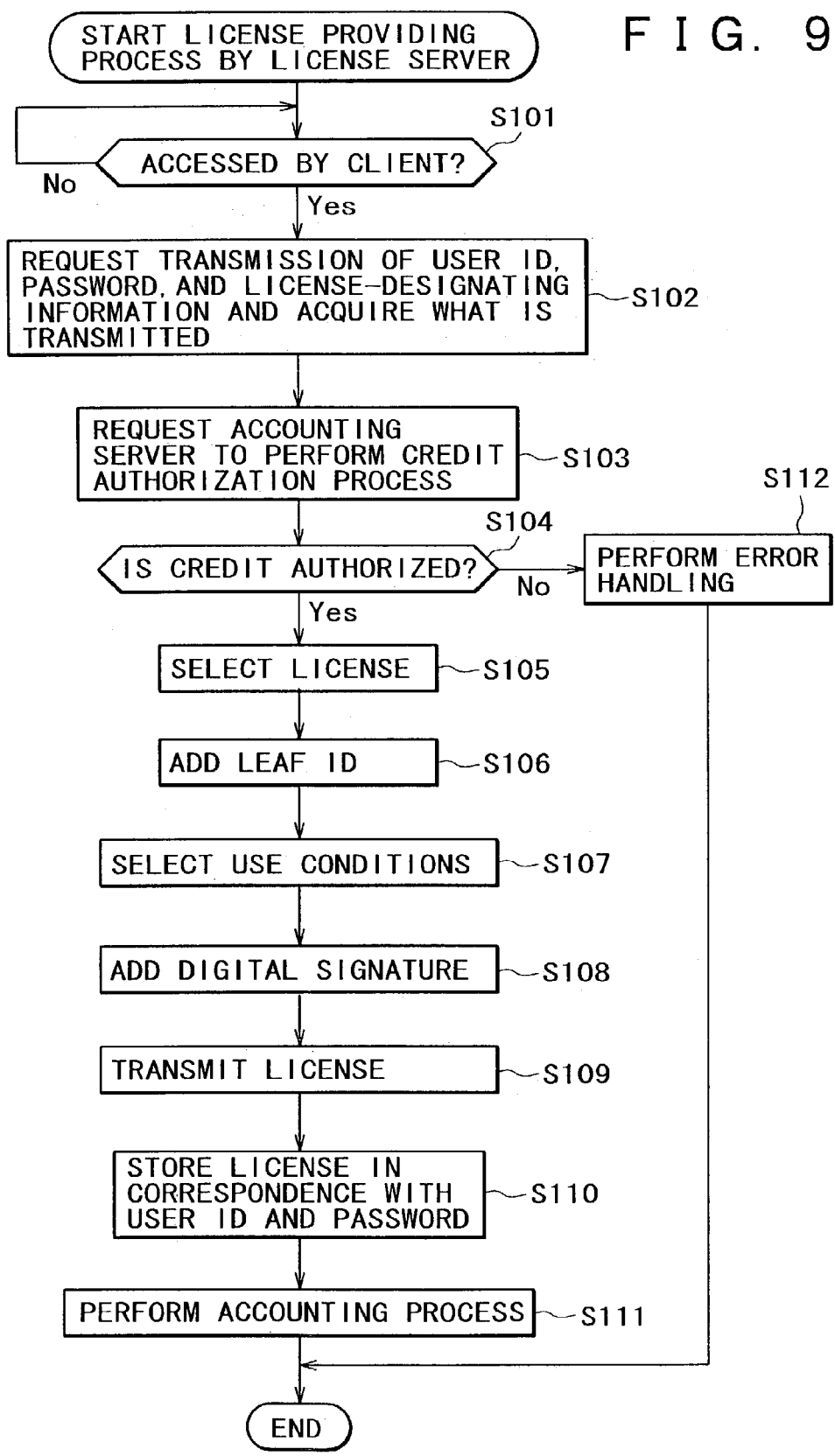
FIG. 9 is a flowchart of steps constituting a license providing process performed by a license server included in the system of FIG. 1.

Described below with reference to the flowchart of FIG. 9 is how the license server 4 performs a license providing process in conjunction with the license acquiring process carried out by the client 1 in FIG. 7. In this case, too, structural details in FIG. 2 will be cited as applicable to the license server 4 as well.

In step S101, the CPU 21 of the license server 4 waits until it is accessed by the client 1. The CPU 21 goes to step S102 when accessed by the client 1. In step S102, the CPU 21 requests the accessing client 1 to transmit a user ID, a password, and license-designating information. As described above, the user ID, password, leaf ID, and license-designating information (i.e., license ID) are transmitted from the client 1 in step S65 of FIG. 7. In turn, the CPU 21 of the license server 4 receives and acquires what has been transmitted through the communication unit 29.

In step S103, the CPU 21 of the license server 4 gains access to the accounting server 5 through the communication unit 29 and requests the accounting server to perform a credit authorization process regarding the user corresponding to the user ID and password. Given the credit authorization request from the license server 4 over the Internet 2, the accounting server 5 examines the payment history or other suitable records of the user defined by the user ID and password. A check is made illustratively to see if the user in question has failed to pay the price of any license in the past. If the user is not judged to have such nonpayment records, the accounting server 5 transmits credit authorization data; if the user is judged to have any nonpayment records, the accounting server 5 transmits credit rejection data.

In step S104, the CPU 21 of the license server 4 determines whether or not the accounting server 5 has returned the credit authorization data for granting the license to the user. If the credit authorization data are judged returned, step S105 is reached. In step S105, the CPU 21 retrieves from the storage unit 28 one of the stored licenses which corresponds to the license-designating information acquired in step S102. Each license held in the storage unit 28 has a license ID, version information, a date and time of preparation, and an expiration date described therein beforehand. In step S106, the CPU 21 adds the received leaf ID to the license. In step S107, the CPU 21 selects the use conditions corresponding to the license selected in step S105. If the use conditions were designated in step S102 by the user, the designated use conditions may be added as needed to the previously prepared use conditions. The CPU 21 furnishes the license with the use conditions thus selected.

In step S108, the CPU 21 affixes a digital signature to the license by use of a private key from the license server 4. This step generates a license whose structure is shown in FIG. 8.

In step S109, the CPU 21 of the license server 4 transmits the license (shown structurally in FIG. 8) to the client 1 through the communication unit 29 and over the Internet 2.

In step S110, the CPU 21 of the license server 4 places into the storage unit 28 the license that has just been transmitted (including the use conditions and leaf ID) in correspondence with the user ID and password acquired in step S102. In step S111, the CPU 21 carries out an accounting process. More specifically, through the communication unit 29, the CPU 21 requests the accounting server 5 to carry out an accounting process regarding the user corresponding to the user ID and password. Given the accounting request, the accounting server 5 bills the user for the license. If the user fails to pay the billed amount, the user from then on will be banned from acquiring any further license that may be requested.

In such a case, the accounting server 5 returns in step S104 the credit rejection data banning the granting of the requested license. Step S104 is then followed by step S112 in which the CPU 21 performs error handling. More specifically, the CPU 21 of the license server 4 outputs to the client 1 having gained access through the communication unit 29 a message saying that the license cannot be granted to the user. The CPU 21 then terminates the process.

In this case, the user cannot utilize the content (i.e., unable to decrypt the content), having failed to receive the license for the reason above.

Figure 6:
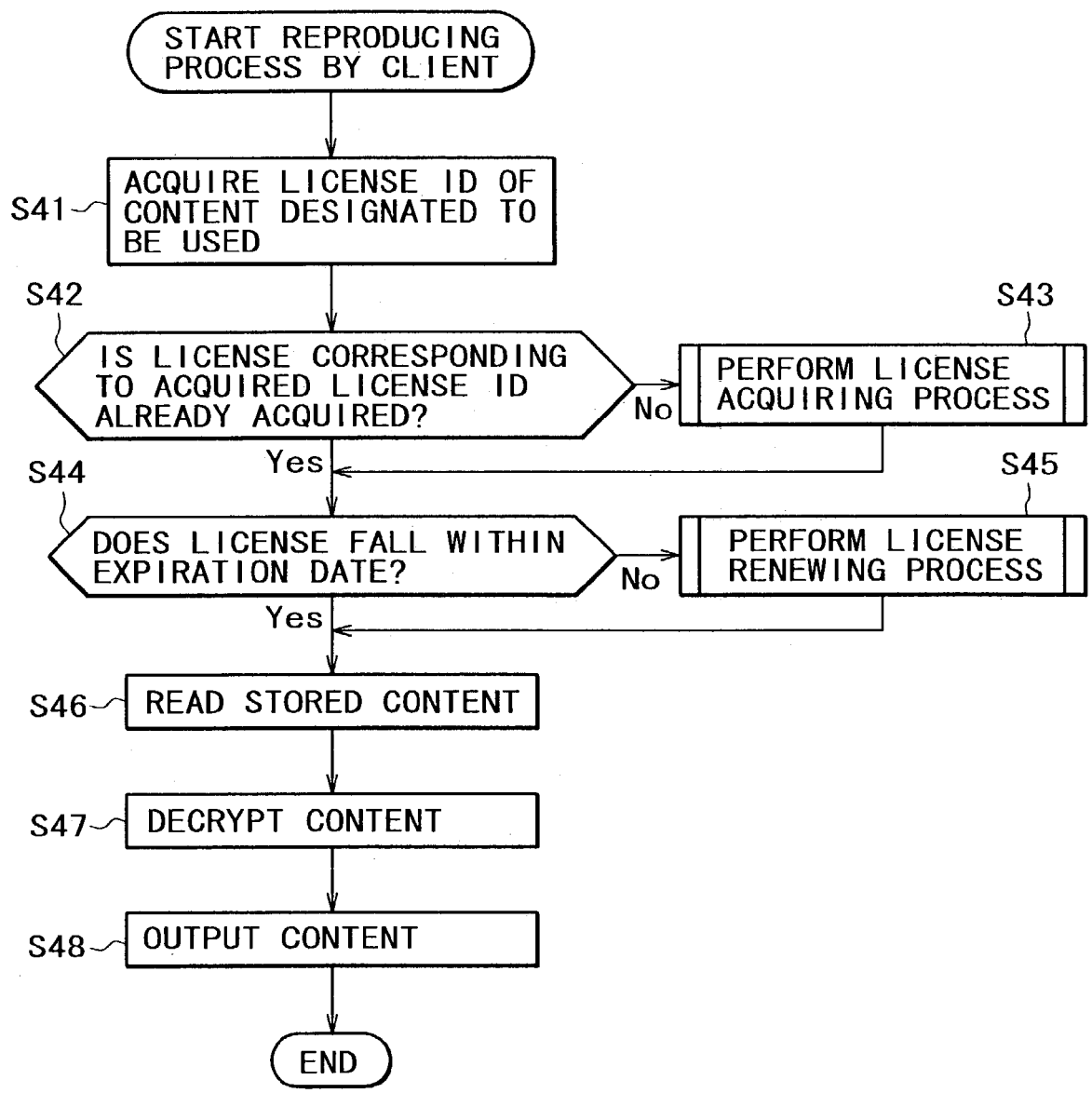
FIG. 6 is a flowchart of steps constituting a content reproducing process performed by the client in FIG. 1.
Figure 10:
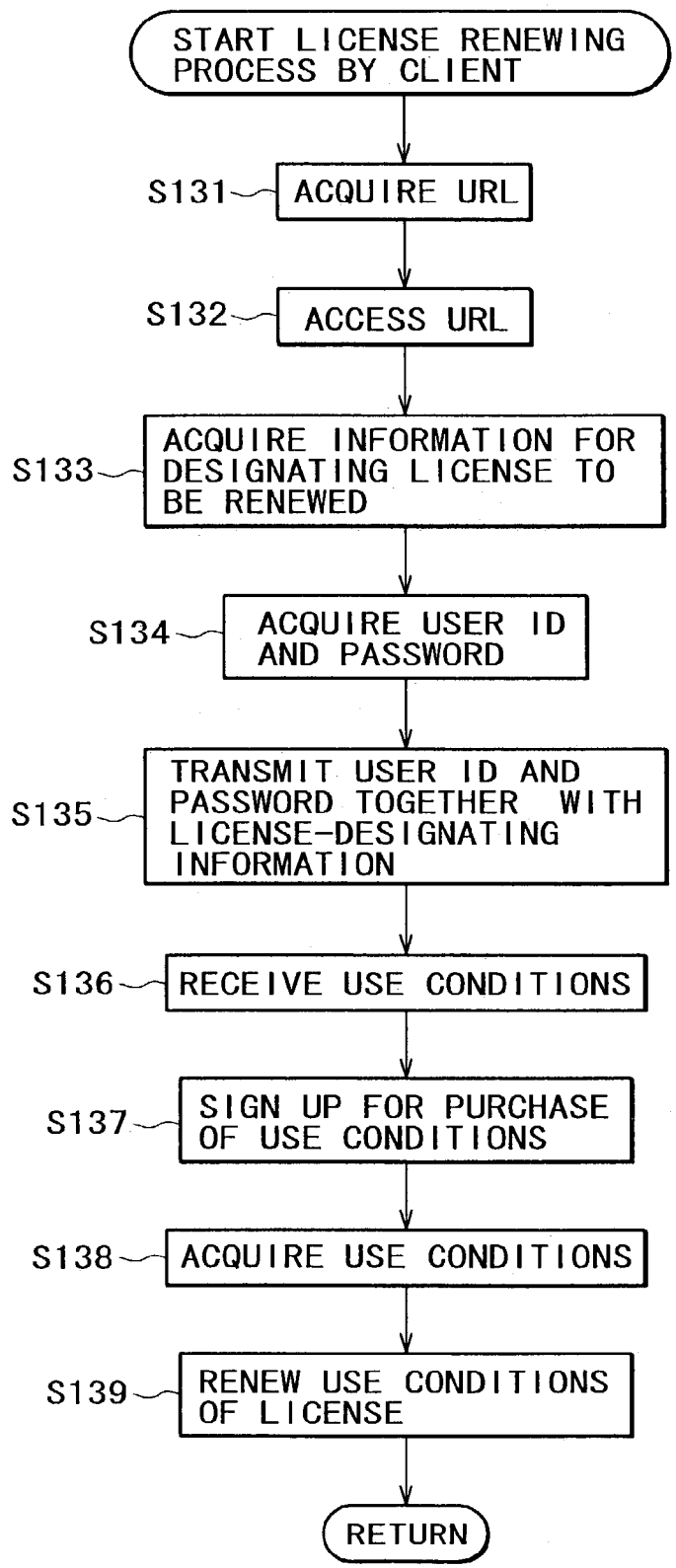
FIG. 10 is a flowchart of detailed steps constituting a license renewing process in step S45 of FIG. 6.

FIG. 10 is a flowchart of detailed steps constituting a license renewing process in step S45 of FIG. 6. Steps S131 through S135 in FIG. 10 are basically the same as steps S61 through S65 in FIG. 7, except that in step S133 the CPU 21 acquires the ID of the license that is not to be purchased but to be renewed. In step S135, the CPU 21 transmits to the license server 4 the ID of the license to be renewed together with the user ID and password.

In response to the transmission from the client 1 in step S135, the license server 4 proposes use conditions as will be described later (in step S153 of FIG. 11). In step S136, the CPU 21 of the client 1 receives the proposed use conditions from the license server 4 and forwards the received conditions to the output unit 27 for display. The user may select desired use conditions from those proposed or may add new conditions thereto by operating the input unit 26. In step S137, the CPU 21 transmits to the license server 4 sign-up data for purchasing the selected use conditions (i.e., conditions for renewing the license). Upon receipt of the sign-up data, the license server 4 returns definitively proposed use conditions (in step S154 of FIG. 11). In step S138, the CPU 21 of the client 1 acquires the use conditions from the license server 4. In step S139, the CPU 21 substitutes the newly acquired use conditions for the currently stored use conditions corresponding to the license in the storage unit 28.

Figure 11:
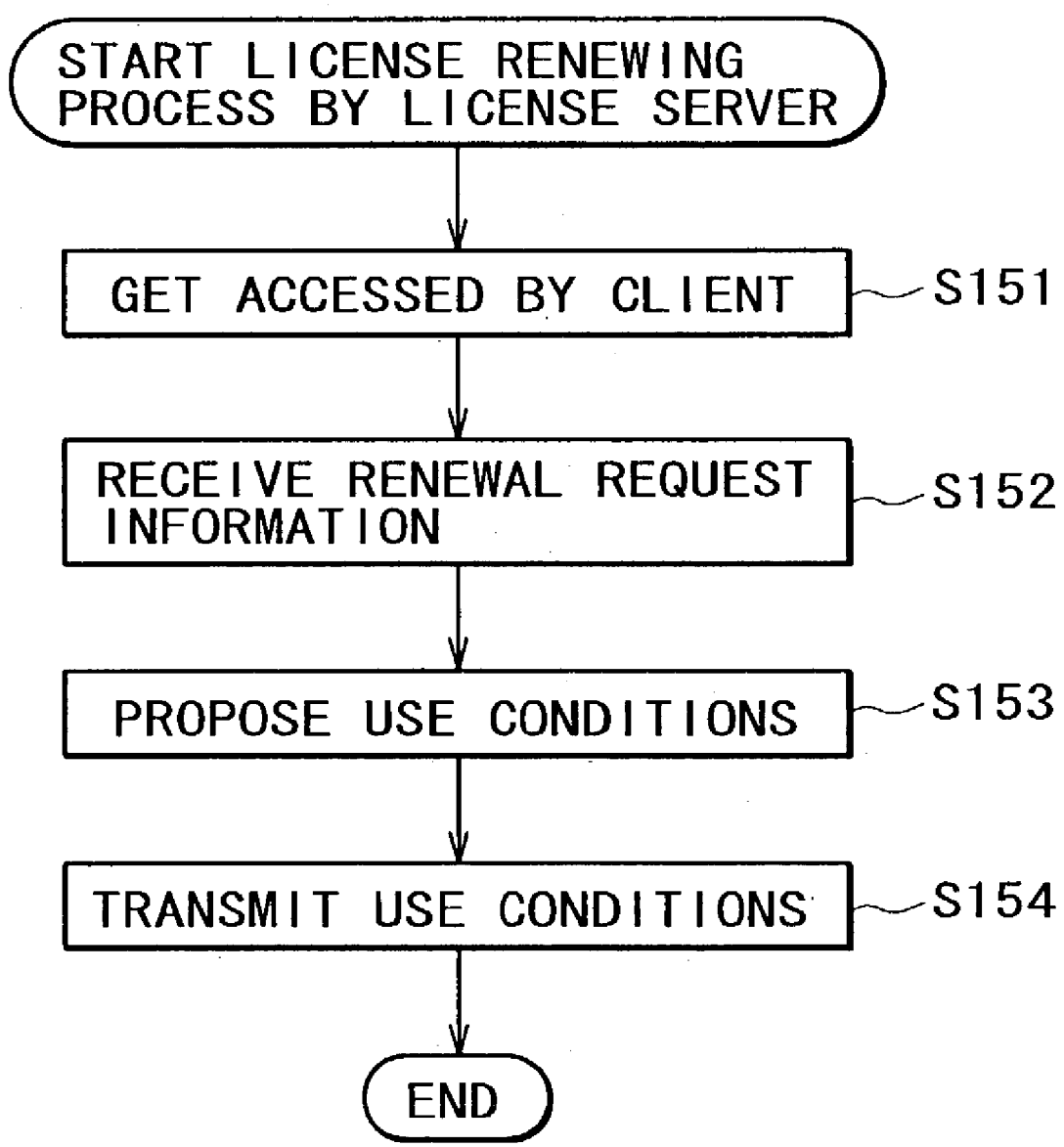
FIG. 11 is a flowchart of steps constituting a license renewing process performed by the license server in FIG. 1.

FIG. 11 is a flowchart of steps constituting a license renewing process performed by the license server 4 in conjunction with the license renewing process carried out by the client 1 as described above.

In step S151, the CPU 21 of the license server 4 is first accessed by the client 1. In step S152, the CPU 21 receives the license-designating information transmitted by the client 1 in step S135 together with a license renewal request.

In step S153, given the license renewal request, the CPU 21 retrieves from the storage unit 28 the use conditions (to be renewed) corresponding to the license in question. The retrieved use conditions are transmitted to the client 1.

Upon receipt of the use conditions thus proposed, the client 1 signs up for the purchase of the conditions in step S137 of FIG. 10 as described above. In step S154, the CPU 21 of the license server 4 generates data corresponding to the use conditions that the client 1 has signed up to purchase, and transmits the generated data to the client 1. In turn, the client 1 renews the use conditions of the currently registered license by utilizing the use conditions received in step S139 as described above.

Figure 12:
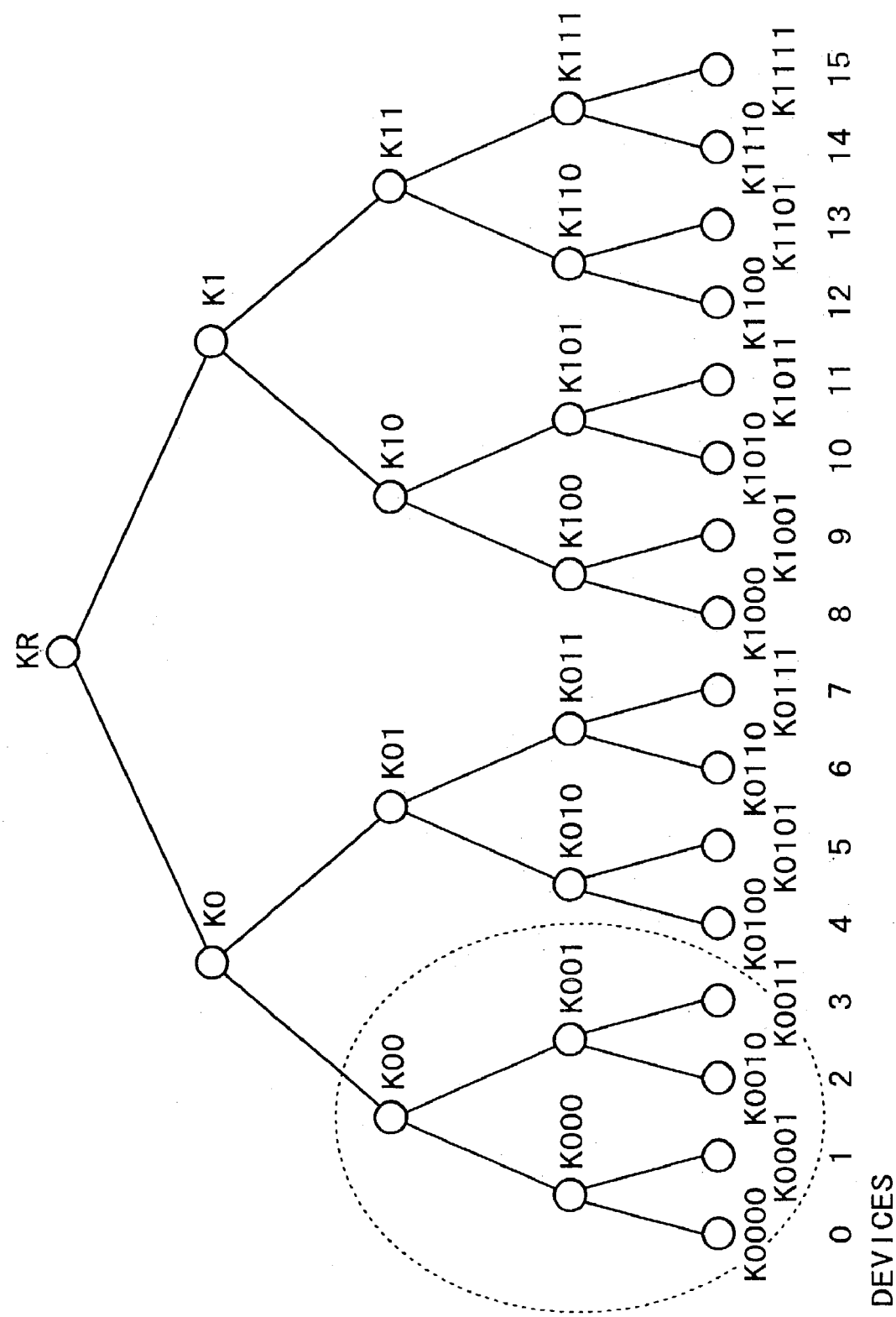
FIG. 12 is an explanatory view of a key structure.

The inventive system, as shown in FIG. 12, manages the keys of devices and licenses based on the principle of what is known as broadcast encryption (refer to Japanese Patent Laid-open No. 2001-352321). The keys make up a hierarchical tree structure in which the leaves at the bottom level correspond to the keys of individual devices. In the example of FIG. 12, keys are generated to represent 16 devices or licenses numbered 0 through 15.

Each key is defined so as to correspond with each of the nodes (shown as circles in the figure) constituting the tree structure. In this example, a root key KR denotes the root node at the highest level; keys K0 and K1 correspond to the nodes at the second-highest level; keys K00 through K11 represent the nodes at the third-highest level; and keys K000 through K111 match the nodes at the fourth-highest level. Keys K0000 through K1111 correspond to the leaves representative of the nodes at the bottom level (i.e., device nodes).

In this hierarchical structure, the key-immediately above, say, keys K0010 and K0011 is a key K001; and the key immediately above keys K000 and K001 is a key K00. In like manner, keys K00 and K01 are topped by a key K0, and keys K0 and K01 are topped by the route key KR.

The key granting the use of any content is managed in the form of a key corresponding to each node on a single path ranging from a given leaf at the bottom level to the root node at the topmost level. For example, the keys granting the use of a content based on the license relative to node No. 3 (leaf ID) are managed in the form of a path comprising the keys K0011, K001, K00, K0, and KR.

Figure 13:
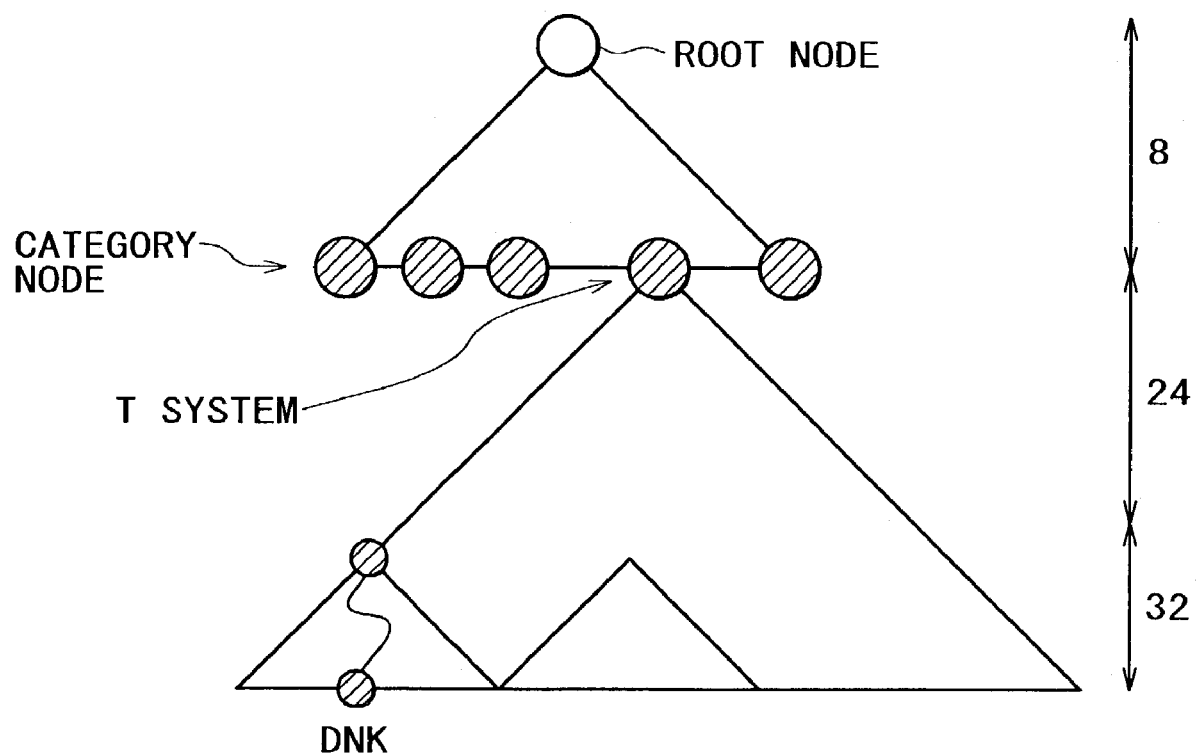
FIG. 13 is an explanatory view of a category node arrangement.

The inventive system, as shown in FIG. 13, manages the keys of devices and licenses using a key system based on the principle depicted in FIG. 12. In the example of FIG. 13, nodes at "8+24+32" levels constitute a tree structure in which each of the nodes ranging from the route node to the eighth-highest level is matched with a given category of devices. Illustratively, one category may comprise devices each employing a specific semiconductor memory such as Memory Stick; another category may include devices designed to receive digital broadcasts. To any one of such category nodes applies this system (indicated as the T system in the figure) acting as a license-managing system.

That is, licenses are made to correspond with the keys representing the nodes at the 24 levels below the node of this system (T system). In this case, it is possible to define as many as 2 to the 24th power (about 16 million) licenses. If the lowest 32 levels are also taken into account, it is possible to define as many as 2 to the 32nd power (about 4 billion) users (or clients). A device node key (DNK) refers to the key corresponding to each of the nodes on a given path ranging from any one of the leaves denoting the nodes at the lowest 32 levels to the root node. A leaf ID denotes the ID of any one of the leaves at the bottom level of the structure.

Each of the keys of devices and licenses corresponds to one of the paths made up of the nodes at the 64 (=8+24+32) levels. For example, a content key derived from a particular content through encryption is encrypted by use of the keys corresponding to the nodes making up the path assigned to the license of interest. The key at a given level is encrypted using the keys at the immediately lower level before being placed into an enabling key block (EKB; to be discussed later by referring to FIGS. 15A and 15B). The DNK is not placed within the EKB but is described in the service data supplied to the client 1 of the user. Using the DNK contained in the service data, the client 1 decrypts that key of the immediately higher level which is described in the EKB (see FIGS. 15A and 15B) distributed along with the content data. Using the key thus decrypted, the client 1 decrypts that key at the next higher level which is also described in the EKB. This decrypting process is repeated by the client 1 so as to obtain all keys belonging to the path in question.

FIG. 14 shows a typical hierarchical tree structure for classifying categories. The highest level in the hierarchical tree structure of FIG. 14 is a root key KR 2301 followed by node keys 2302 at intermediate levels. Leaf keys 2303 are defined at the bottom level of the structure. Each device is assigned its own leaf key, a series of node keys ranging from the leaf key to the root key, and the root key.

The nodes at the M-th highest level (M=8 in the example of FIG. 13) are defined as category nodes 2304. That is, each of the nodes at the M-th highest level is regarded as a node in which to establish a device of a specific category. Any one of the category nodes at the M-th highest level tops those nodes and leaves at the (M+1)th highest and subsequent levels which are associated with devices subsumed in the category in question.

For example, a node 2305 at the M-th highest level in FIG. 14 is set for the category called "Memory Stick (trademark)." All nodes and leaves under this node are used exclusively to establish various devices each utilizing Memory Stick. In other words, the nodes and leaves under the node 2305 are defined as a set of nodes and leaves associated with devices classified in the Memory Stick category.

Further a subcategory node 2306 may be established illustratively several levels below the M-th highest level. In the example of FIG. 14, a "reproduction-only device" node 2306 is shown established two levels below the "Memory Stick" category node 2305 as a subcategory node subsumed in the category of the Memory Stick-using devices. Immediately below the "reproduction-only device" subcategory node 2306 is a node 2307 for establishing a telephone with music reproduction capability; the node 2307 is subsumed in the "reproduction-only device" subcategory. Immediately below the "telephone with music reproduction capability" category are a "PHS" node 2308 and a "mobile telephone" node 2309, both subsumed in the "telephone with music reproduction capability" category.

The categories and subcategories are not limited to the types of devices alone; they may also be applied to nodes managed by manufacturers, content providers, banking or settlement organizations or the like in their unique manner in the form of processing units, jurisdictional units, units of provided services, or any other suitable units (called entities hereunder). For example, one category node may be established as the highest-level node dedicated to a game console XYZ marketed by a game console manufacturer. In this case, the manufacturer can market the game console XYZ by furnishing it with entities denoted by node keys or leaf keys that come under the topmost node. Thereafter, in distributing or renewing encrypted contents or various keys, the manufacturer may generate enabling key blocks (EKB) each constituted by any of the node keys or leaf keys under the highest-level node key in order to distribute data that can be used only on the devices corresponding to the nodes or leaves involved.

As described, where one node tops the other nodes defined as categories or subcategories subsumed in the highest node, a manufacturer, a content provider or any other organization managing the tree structure made up of these nodes may generate uniquely defined enabling key blocks (EKB) each covering nodes leading up to the highest-level node and may distribute the generated blocks to any devices belonging to the subordinate nodes under the topmost node. In that setup, any key may be renewed in a manner totally independent of the devices belonging to any other category except the topmost node.

For example, in the tree structure of FIG. 12, four devices 0, 1, 2 and 3 contained in a group possess common keys K00, K0 and KR as their node keys. This shared node key structure may be utilized in providing a common content key to the devices 0, 1, 2 and 3 only. If the shared node key K00 is established as a content key, only the devices 0, 1, 2 and 3 may be assigned the common content key without being furnished with any new key. As another example, suppose that a new content key Kcon is encrypted using the node key K00 to generate a value Enc(K00, Kcon) which is then distributed to the devices 0, 1, 2 and 3 over a network or by use of suitable storage media. In that case, solely the devices 0, 1, 2 and 3 can acquire the content key Kcon by decrypting the encrypted value Enc(K00, Kcon) using the shared node key K00. The notation Enc(Ka, Kb) represent the data obtained by encrypting data Kb with data Ka.

Suppose that at a given point "t" the keys K0011, K00, K00, K0 and KR owned by the device 3 are found to be exposed by a hacker through analysis. In that case, the device 3 needs to be isolated from the system in order to protect data exchanged within the system (i.e., in the group of devices 0, 1, 2 and 3). This requires replacing the node keys K00, K00, K0 and KR with new keys K(t)001, K(t)00, K(t)0 and K(t)R respectively and informing the devices 0, 1 and 2 of the renewed keys. The notation K(t)aaa indicates a renewed key of a generation "t" derived from a key Kaaa.

How renewed keys are distributed will now be described. The key renewal process is carried out illustratively by furnishing the devices 0, 1 and 2 with a table composed of block data called an enabling key block (EKB), shown in FIG. 15A, distributed over the network or by use of suitable storage media. Each enabling key block (EKB) is constituted by encryption keys that are used to distribute renewed keys to the devices corresponding to the leaves (i.e., nodes at the bottom level) in the tree structure such as that in FIG. 12. The enabling key block (EKB) may also be called a key renewal block (KRB).

The enabling key block (EKB) shown in FIG. 15A constitutes block data having a data structure in which only the devices needing to have their node keys renewed are allowed to do so. The example of FIG. 15A is the block data prepared in such a manner as to distribute renewed node keys of the generation "t" to the devices 0, 1 and 2 in the tree structure of FIG. 12. As is evident in FIG. 12, the devices 0 and 1 need renewed node keys K(t)00, K(t)0 and K(t)R while the device 2 requires renewed node keys K(t)001, K(t)00, K(t)0 and K(t)R.

As indicated by the EKB in FIG. 15A, each EKB contains a plurality of encryption keys. The encryption key in the bottom row of FIG. 15A is Enc(K0010, K(t)001) representative of the renewed node key K(t)001 encrypted by use of the leaf key K0010 owned by the device 2. The device 2 acquires the renewed node key K(t)001 by decrypting the encryption key Enc(K0010, K(t)001) using its own leaf key K0010. The renewed node key K(t)001 obtained through such decryption may then be used to decrypt another encryption key Enc(K(t)001, K(t)00) in the second row from the bottom of FIG. 15A; the decryption yields another renewed key K(t)00.

Likewise, another encryption key Enc(K(t)00, K(t)0) in the second row from the top in FIG. 15A is decrypted to provide a renewed node key K(t)0; the renewed node key K(t)0 is then used to decrypt another encryption key Enc(K(t)0, K(t)R) in the topmost row of FIG. 15A to produce a renewed root key K(t)R.

Meanwhile, the node key K000 is not subject to renewal. What the nodes 0 and 1 need as renewed node keys are the keys K(t)00, K(t)0 and K(t)R. The nodes 0 and 1 acquire the renewed node key K(t)00 by decrypting the encryption key Enc(K000, K(t)00) in the third row from the top in FIG. 15A using the node key K000 included in the device node keys. In like manner, the encryption key Enc(K(t)00, K(t)0) in the second row from the top in FIG. 15A is decrypted so as to provide the renewed node key K(t)0; the encryption key Enc(K(t)0, K(t)R) in the top row of FIG. 15A is decrypted in order to produce the renewed root key K(t)R. This is how the devices 0, 1 and 2 can obtain the renewed key K(t)R.

In FIG. 15, each of the indexes in the left-hand side column stands for an absolute address of a node key or a leaf key used as the decryption key for decrypting the corresponding encryption key listed in the right-hand side column.

Suppose that renewal of the node keys K(t)0 and K(t)R at the upper levels of the tree structure in FIG. 12 is not necessary and that only the node key K00 needs to be renewed. In that case, the enabling key block (EKB) of FIG. 15B may be used to distribute the renewed node key K(t)00 to the devices 0, 1 and 2.

The EKB shown in FIG. 15B is effective where a renewed content key is distributed so as to be shared within a specific group of devices. As an example, suppose that the devices 0, 1, 2 and 3 forming a group enclosed by dotted lines in FIG. 12 utilize a particular storage medium and that they need a renewed common content key K(t) con. In that case, a renewed node key K(t)00 is first derived from the node key K00 shared by the devices 0, 1, 2 and 3. The renewed node key K(t)00 is then used to encrypt the renewed content key K(t)con, generating data Enc(K(t)00, K(t)con). The encrypted data Enc(K(t)00, K(t)con) are distributed to the relevant devices together with the EKB shown in FIG. 15B. This distribution process ensures distribution of the data which can be used only by the devices involved and which cannot be decrypted by any device in any other group, such as device 4.

Illustratively, the devices 0, 1 and 2 can obtain the content key K(t)con in effect at time "t" by decrypting the encrypted data using the key K(t)00 derived from the EKB.

FIG. 16 schematically shows an example in which the content key K(t)con in effect at time "t" is acquired. In this example, the renewed common content key K(t)con is encrypted using the renewed node key K(t)00 to produce encrypted data Enc(K(t)00, K(t)con). The encrypted data are sent on a storage medium to the device 0 for processing along with the EKB shown in FIG. 15B. This is an example where EKB-based encrypted message data are employed as the content key K(t)con.

As shown in FIG. 16, the device 0 first generates the node key K(t)00 through the EKB process described above using the EKB at time t stored in the storage medium and the node key K000 included in the DNK previously stored in the device itself. The device 0 then decrypts the renewed content key K(t)con using the renewed node key K(t)00 decrypted, encrypts the decrypted content key K(t)con using the leaf key K0000 specific to the device, and stores the encrypted key.

Figure 17:
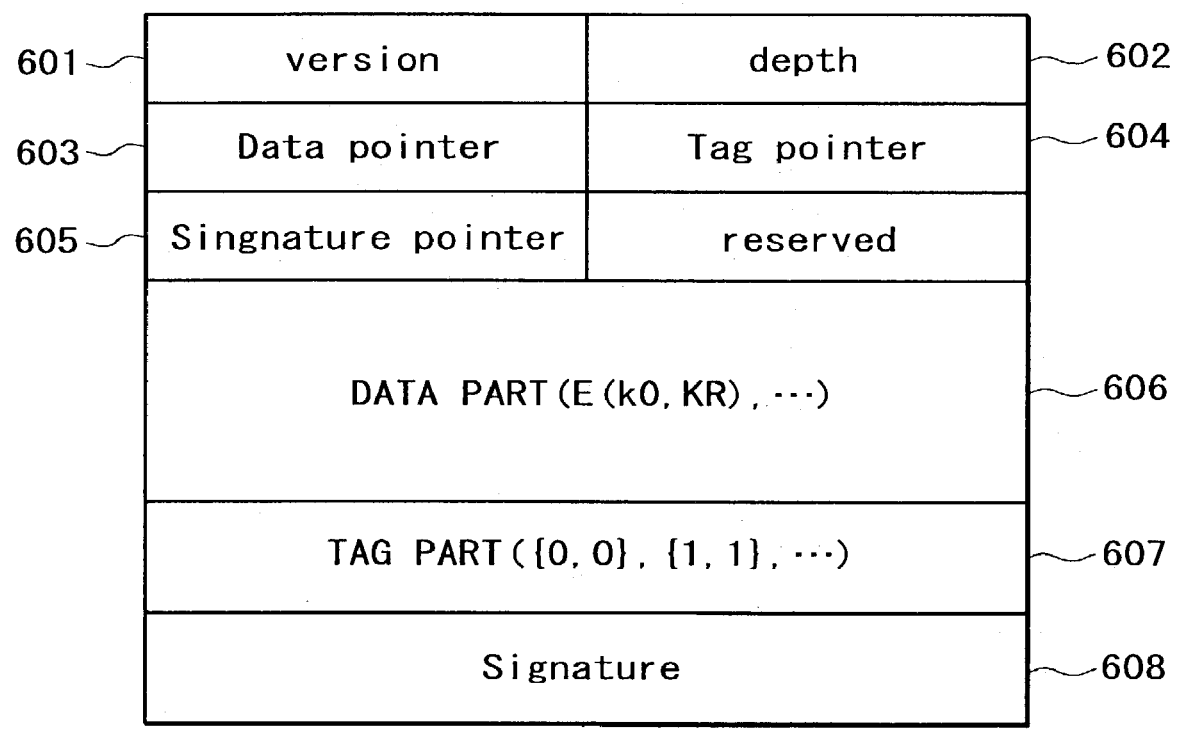
FIG. 17 is a schematic view indicating a typical format of the enabling key block.

FIG. 17 depicts a typical format of the enabling key block (EKB). In the format of FIG. 17, a version 601 is an identifier indicating the version of this enabling key block. The version 601 has two functions: to identify the most recent EKB, and to specify correspondence with the content. A depth 602 indicates how deep the level of a destination device for EKB distribution is in the hierarchical tree structure, the device receiving the distributed enabling key block (EKB). A data pointer 603 points to the position of a data part 606 in the EKB. A tag pointer 604 and a signature pointer 605 point to the positions of a tag part 607 and a signature 608 respectively.

The data part 606 accommodates data prepared illustratively by encrypting the node keys to be renewed. For example, the data part 606 may store encryption keys regarding the renewed node keys shown in FIG. 16.

The tag part 607 comprises tags that indicate the positions of the encrypted node keys and leaf keys contained in the data part 606. How the tags are furnished will now be described by referring to FIG. 18.

Figure 18:
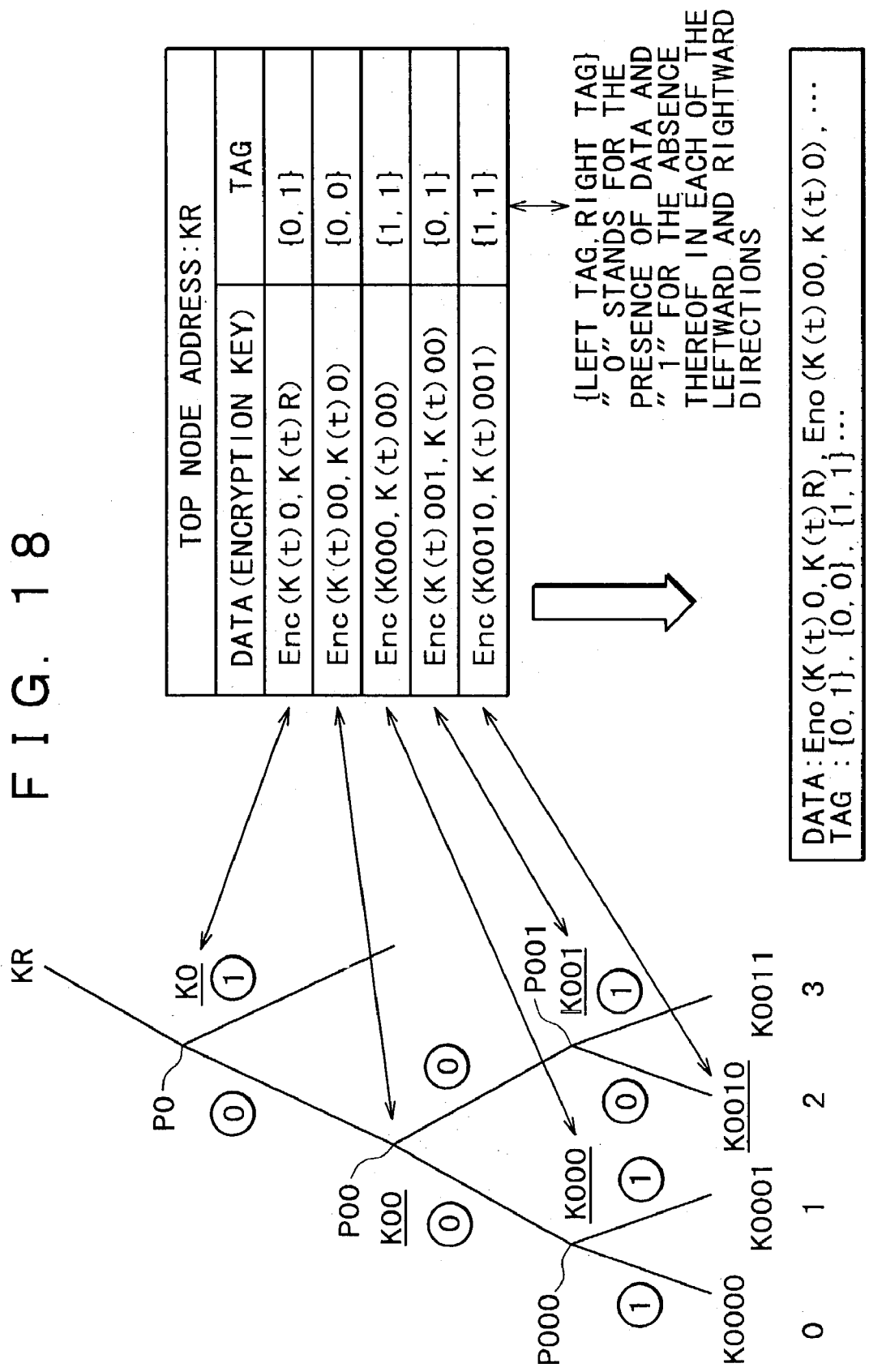
FIG. 18 is an explanatory view depicting a tag structure of the enabling key block.

FIG. 18 depicts how the enabling key block (EKB) explained above with reference to FIG. 15A is typically distributed as data. The data, shown in tabular form in FIG. 18, include a top node address indicative of the top node included in the encryption keys. In this example, the top node address is KR because the renewed key K(t)R of the root key is included. Here, the data Enc(K(t)0, K(t)R) in the highest row of the table correspond to a position P0 in the hierarchical tree structure of FIG. 18. The data Enc(K(t)00, K(t)0) in the next-highest row of the table correspond to a position P00 at the lower left of the preceding data position in the tree structure. If data are present below a given position in the tree structure, the tag for that position is set to 0; if data are absent, the tag for the position is set to 1. The tag format is given as {left (L) tag, right (R) tag}. In the position P00 at the lower left of the position P0 corresponding to the highest-row data Enc(K(t)0, K(t)R) in the table of FIG. 18, data exist and thus the left tag is set to 0 for the position P0. On the other hand, data are absent at the lower right of the position P0 so that the right tag is set to 1 for that position. In this manner, all data are furnished with tags and are arranged in tabular form as shown in FIG. 18, with the data in rows and the tags in columns.

Tags are established to indicate where a given data item Enc(Kxxx, Kyyy) is positioned in the tree structure. Whereas key data Enc(Kxxx, Kyyy), . . . held in the data part 606 are merely a series of encrypted data, the positions of the encryption keys representing the data can be determined in the tree structure through the use of the above-described tags. If the tags were not used, the data could still be structured as 0: Enc(K(t)0, K(t)R)
00: Enc(K(t)00, K(t)0)
000: Enc(K((t)000, K(t)00)
. . .

using the node indexes relative to the encrypted data as explained above with reference to FIGS. 15A and 15B. However, such an index-based data structure spawns huge quantities of redundant data, which can be detrimental to efficient data distribution over the network. By contrast, where tags are used as index data indicating where the keys are positioned, the key positions can be determined with a significantly reduced amount of data.

Returning to FIG. 17, the EKB format will be further explained. A signature 608 denotes a digital signature affixed illustratively by a key management center (i.e., license server 4), a content provider (content server 3) or a banking or settlement organization (accounting server 5) having issued the enabling key block (EKB). The device that has received the EKB authenticates the signature to ascertain that the EKB has been issued by a legitimate EKB-issuing party FIG. 19 summarizes the process in which a content supplied by the content server 3 is used on the basis of the relevant license acquired from the license server 4.

As illustrated, the content is first provided from the content server 3 to the client 1. The client 1 is then furnished with the license from the license server 4. The content is encrypted (Enc(Kc, Content)) using a content key Kc. The content key Kc is encrypted (Enc(KR, Kc)) using the root key KR (obtained from the EKB and corresponding to the key $K_{EKBC}$ in FIG. 5). The encrypted content key together with the EKB is added to the encrypted content that is offered to the client 1.

Figure 19:
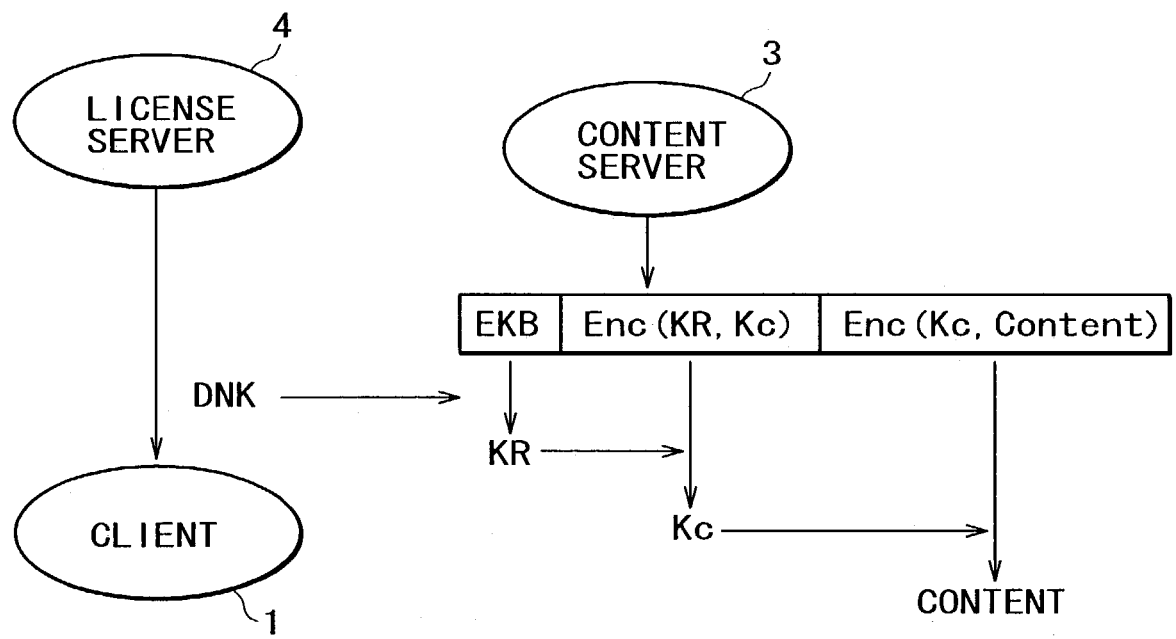
FIG. 19 is an explanatory view sketching a content decrypting process using a device node key (DNK)
Figure 20:
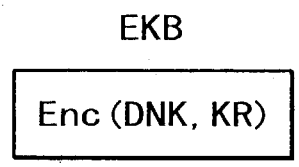
FIG. 20 is a schematic view of a typical enabling key block.

The EKB in FIG. 19 contains the root key KR that can be decrypted using a DNK (device node key) as shown in FIG. 20. The client 1 can thus obtain the root key KR from the EKB using the DNK contained in the service data. The content key Kc is decrypted from the encrypted content key Enc(KR, Kc) by use of the root key KR. The content key Kc is then used to decrypt the content from the encrypted data Enc(Kc, Content).

As described, where the DNK is assigned individually to each client 1, the license of a given client 1 can be revoked independently on the basis of the principle described above with reference to FIGS. 12, 15A and 15B.

When each license is distributed together with a leaf ID to the client 1, the client 1 brings the service data into correspondence with the license. Such correspondence helps prevent illegal copying of the license.

Where a client-addressed certificate and a private key are distributed as the service data to each client, the end user at the client can prepare a content that is resistant to illegal copying through the use of the service data.

How the certificate and private key are utilized will be described later with reference to the flowchart of FIG. 29.

As described above with reference to FIG. 13, a given category node may be established to bring the inventive content distribution system for managing licenses into correspondence with a category of devices that utilize diverse contents. That means the same device may be assigned a plurality of DNKs. It follows that contents of different categories can be managed by a single device.

Figure 21:
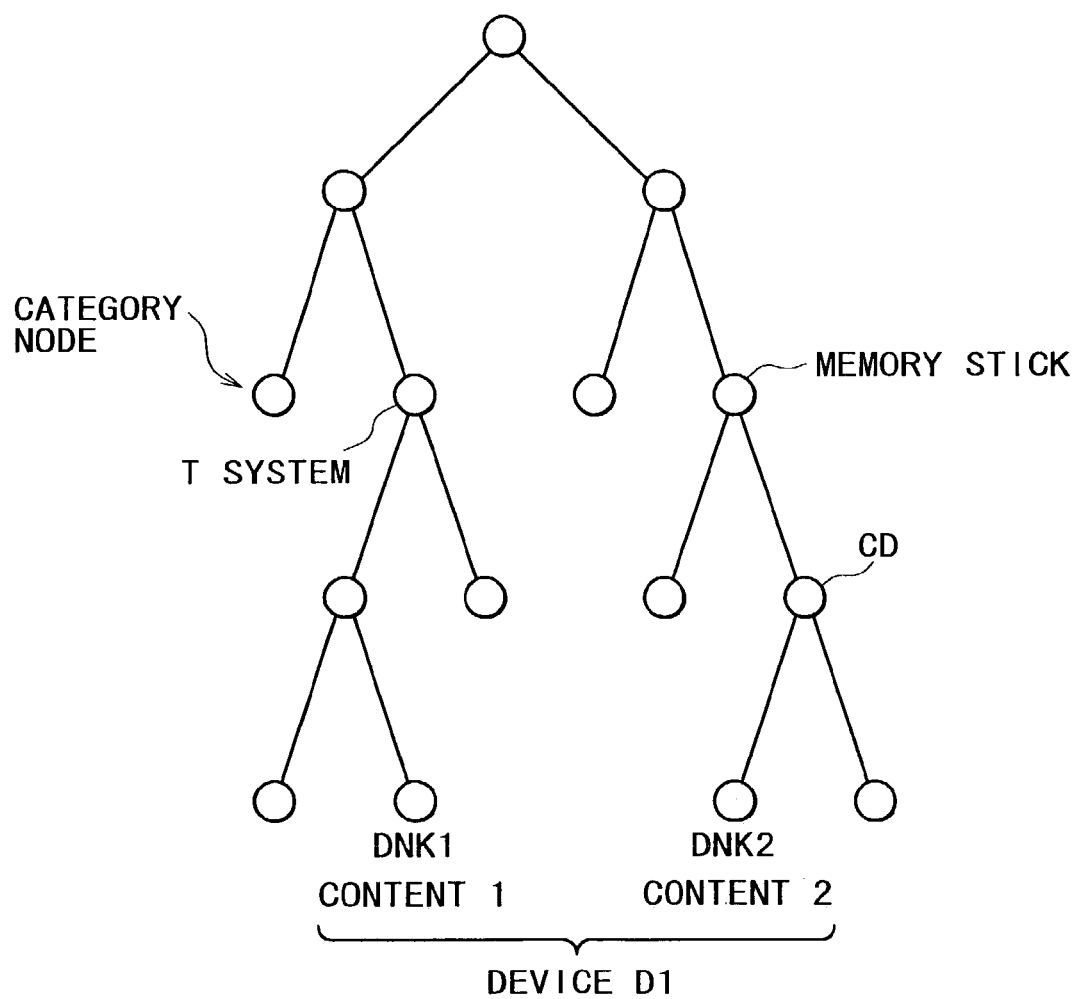
FIG. 21 is an explanatory view picturing how a plurality of contents are assigned to a single device.

FIG. 21 shows how such content management is carried out. In the setup of FIG. 21, a device D1 retains service data and a license for using a content 1 that is assigned DNK1 according to the inventive principle of the content distribution system. At the same time, the device D1 may also have a content 2 placed in a Memory Stick after it is ripped from a CD, the content 2 being assigned DNK2. In this case, the device D1 can concurrently deal with different contents, that is content 1 and content 2, distributed according to different systems (i.e., the content distribution system and the device management system). The arrangement above is not adopted if the currently assigned DNK is deleted before a new DNK is assigned so that the device in question is always associated with a single DNK.

Figure 22:
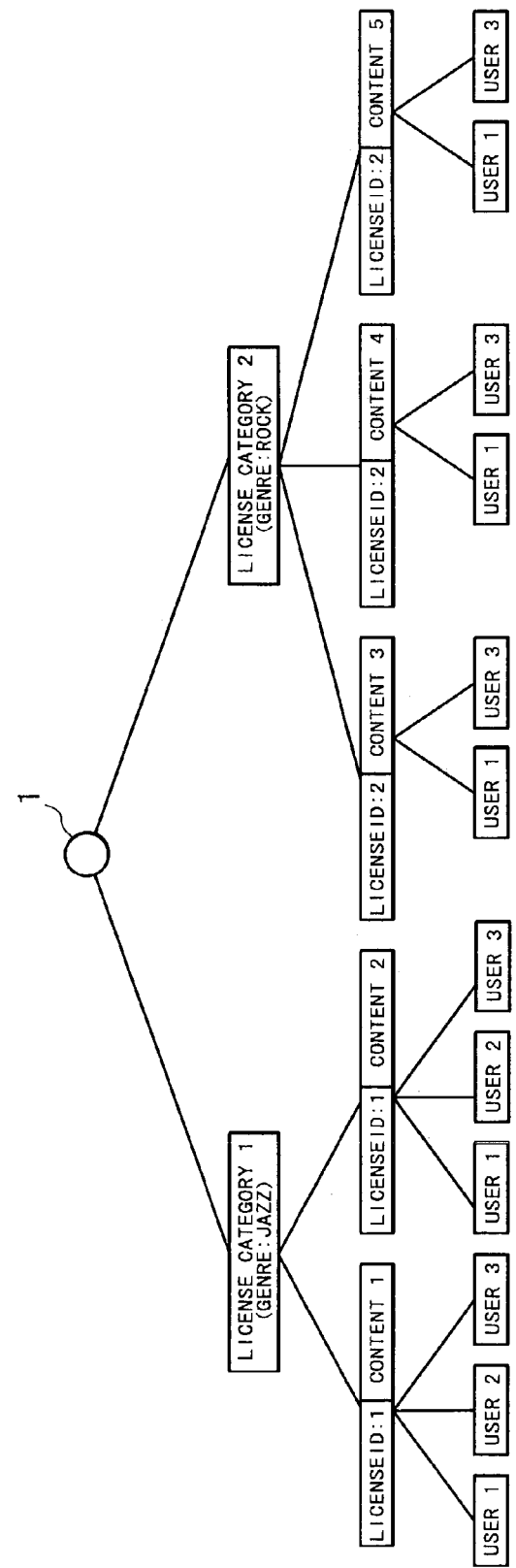
FIG. 22 is an explanatory view of license categories.

In the tree structure of FIG. 13, each of the triangles at the lowest 32 levels may illustratively be assigned a license category 1 and a license category 2 shown in FIG. 22. This means that any single category may be divided into subcategories for better management covering detailed data items such as the genre of the content, the disc label involved, the distributor's name, the type of distribution service, the source of the content, and a specific manner in which the content is offered.

In the example of FIG. 22, a license category 1 is shown covering the genre of jazz and a license category 2 the genre of rock and roll. The license category 1 is matched with contents 1 and 2 which have a license ID of 1 each and which are distributed to users 1, 2 and 3. The license category 2 comprises contents 3, 4 and 5 which having a license ID of 2 each and which are provided to the users 1 and 3.

In this setup, keys can be managed independently in units of categories according to the invention.

Also according to the invention, it is possible to have DNKs downloaded through the license server 4 to individual devices or storage media at the time of a registering process, instead of having the DNKs incorporated in devices or embedded on storage media beforehand. This makes it possible to implement a system for allowing users to acquire keys.

Figure 23:
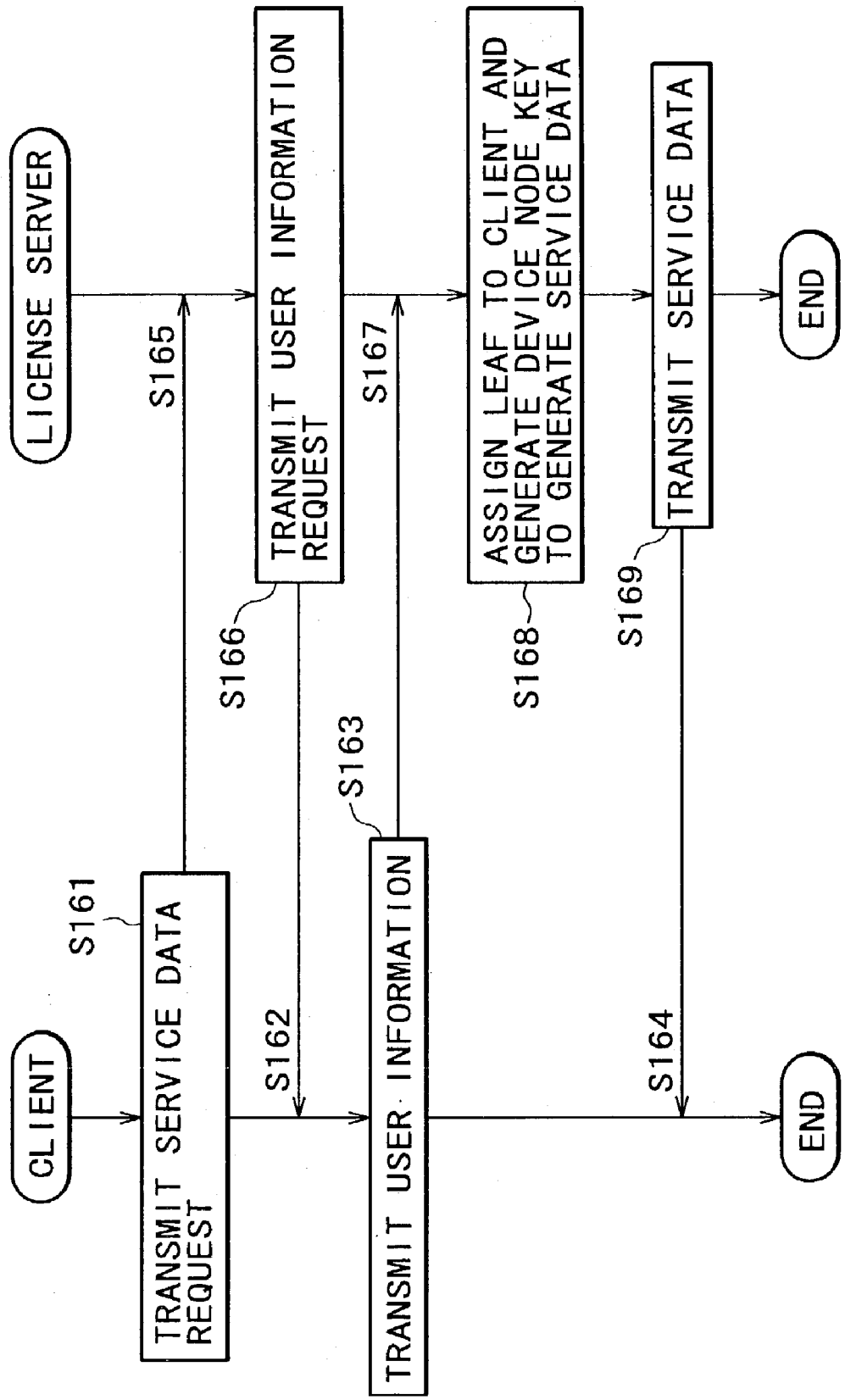
FIG. 23 is a timing chart explaining how a registering process is carried out.

How the above-mentioned registering process is performed by the client 1 will now be described with reference to FIG. 23.

In step S161, the CPU 21 of the client 1 causes the communication unit 29 to transmit a service data request to the license server 4. In step S165, the CPU 21 of the license server 4 receives the service data request through the communication unit 29. In step S166, the CPU 21 of the license server 4 transmits a user information request to the client 1 through the communication unit 29.

In step S162, the CPU 21 of the client 1 receives the user information request through the communication unit 29. In turn, the CPU 21 causes the output unit 27 to display a message prompting the user to enter user information. Upon viewing the message, the user operates the keyboard or the like to enter the user information such as the user's personal information and accounting information into the input unit 26. In step S163, the CPU 21 of the client 1 transmits the user-input information to the license server 4 through the communication unit 29.

In step S167, the CPU 21 of the license server 4 receives the user information through the communication unit 29. In step S168, the CPU 21 assigns the client 1 to any one of the unassigned leaves below the node of the category corresponding to the license server 4, and generates a device node key in the form of a set of node keys assigned to the nodes along the path ranging from the leaf assigned to the client 1 to the node corresponding to the category of the license server 4. The CPU 21 then generates service data by putting together the device node key generated as described, the leaf ID of the leaf assigned to the client 1, a private key of the client 1, a public key paired with the private key of the client 1, a public key of the license server, and certificates of the public keys. In step S169, the CPU 21 of the license server 4 transmits the generated service data to the client 1 through the communication unit 29 and causes the drive 30 to record the user information to an appropriate storage medium such as a hard disc in correspondence with the leaf ID.

In step S164, the CPU 21 of the client 1 receives the service data through the communication unit 29. In turn, the CPU 21 causes the encryption/decryption unit 24 to encrypt the received service data and causes the drive 30 to write the encrypted data to a suitable storage medium such as the hard disc.

In the manner described, the license server 4 registers the client 1 and its user. With the registration completed, the client 1 can receive service data including the device node key necessary for utilizing a desired content distribution service.

It is preferred that a content, once prepared, be made usable in any applications regardless of the way it is used. Illustratively, the same content should preferably be used in different content distribution services or irrespective of the domain use status differing from one situation to another. According to this invention, the license server 4 acting as a certificate authority provides each user (i.e., client 1) with a private key and a certificate of a public key corresponding to the private key. Each user prepares a signature using the distributed private key and affixes the signature to the content to attest its integrity, whereby any tampering of the content is prevented.

Figure 24:
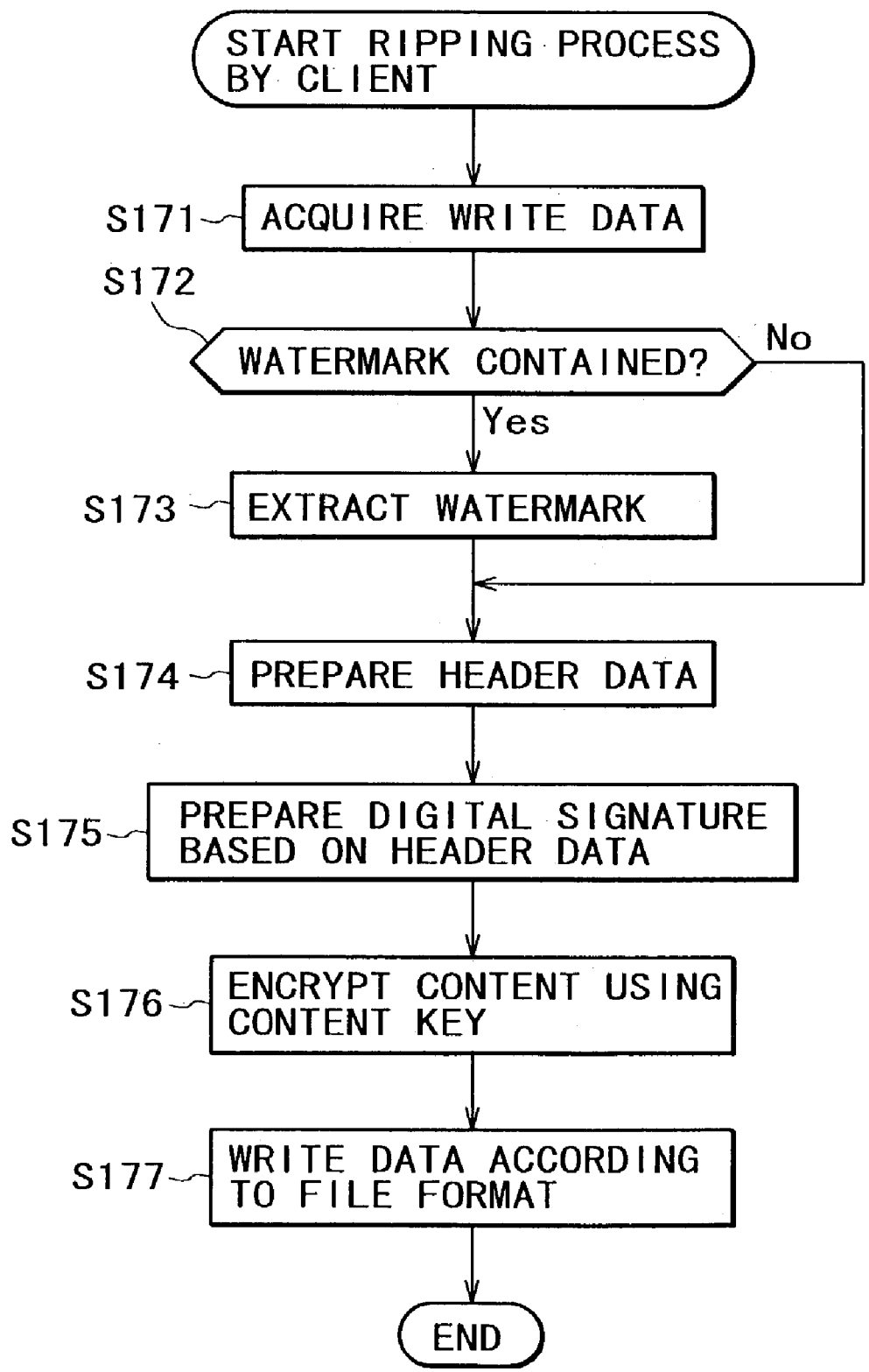
FIG. 24 is a flowchart of steps constituting a ripping process performed by the client.

How the above process is carried out will now be described by referring to the flowchart of FIG. 24. The process of FIG. 24 constitutes a ripping process performed by the user who reproduces data from a CD and stores the reproduced data into the storage unit 28.

In step S171, the CPU 21 of the client 1 first acquires data reproduced from the CD as write data through the communication unit 29. In step S172, the CPU 21 determines whether or not the write data acquired in step S171 contain a watermark. The watermark, made up of three-bit copy control information (CCI) and one-bit trigger data, is embedded in the content data. If the watermark is detected, the CPU 21 goes to step S173 to extract the watermark from the content. If no watermark is detected, step S173 is skipped.

In step S174, the CPU 21 prepares header data to be recorded in correspondence with the content. The header data is composed of a content ID, a license ID, the URL of the location to be accessed for acquisition of the license, and copy control information (CCI) along with trigger data included in the watermark.

In step S175, the CPU 21, using the client's private key, prepares a digital signature based on the header data generated in step S174. The private key has been acquired earlier from the license server 4 (in step S67 of FIG. 7).

In step S176, the CPU 21 causes the encryption/decryption unit 24 to encrypt the content using a content key. The content key is generated illustratively through random number generation.

In step S177, the CPU 21 writes the data illustratively to the magneto-optical disc 43 such as a Mini-disc in accordance with a suitable file format.

Where the storage medium is a Mini-disc, the CPU 21 in step S176 feeds the content to the codec unit 25 to encode the content based on ATRAC3. The encoded data are further encrypted by the encryption/decryption unit 24.

Figure 25:
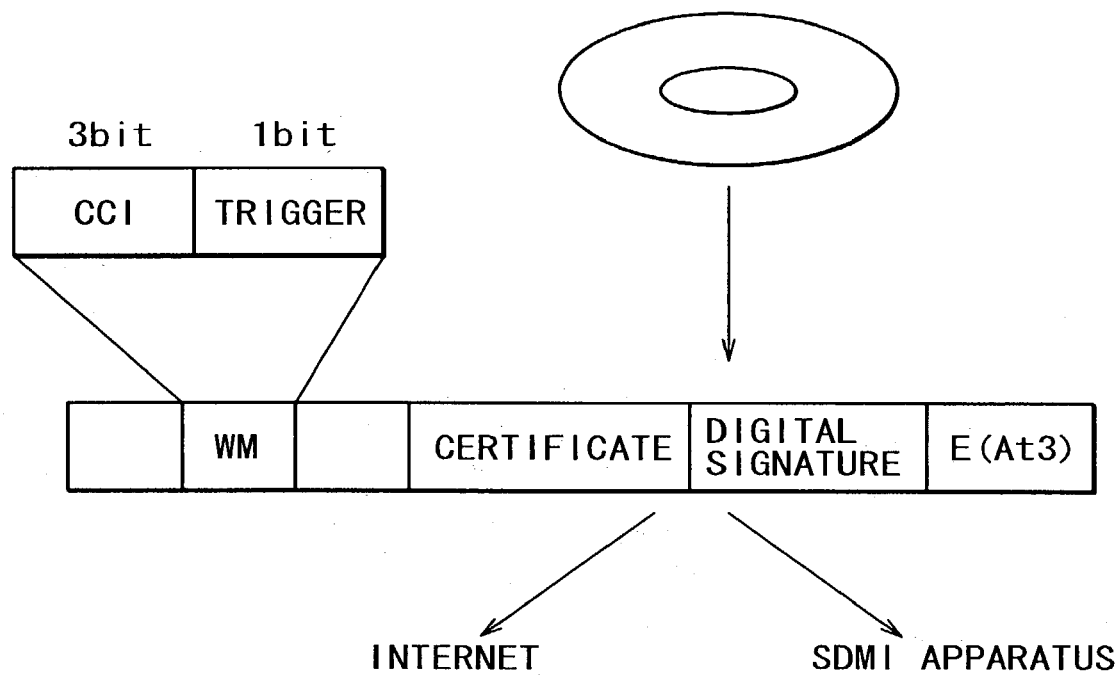
FIG. 25 is an explanatory view of a watermark structure.

FIG. 25 schematically shows how a content is written to a storage medium in the manner described above.

A watermark (WM) is extracted from an encrypted content E(At3) and written outside the content (i.e., in the header).

Figure 26:
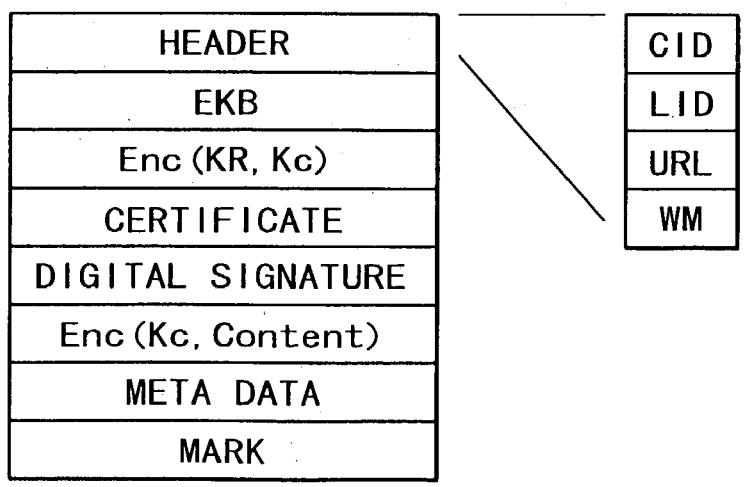
FIG. 26 is a schematic view of a typical content format.

FIG. 26 illustrates a mote detailed file format in which to record the content to the storage medium. In the format of FIG. 26, a header made up of a content ID (CID), a license ID (LID), a URL, and a watermark (WM) is recorded together with an EKB, data Enc(KR, Kc) prepared by encrypting a content key Kc using a toot key KR, a certificate(Cert), a digital signature Sig(Header) derived from the header, data Enc(Kc, Content) generated by encrypting the content using the content key Kc, meta data, and a mark.

The watermark, usually embedded in the content, may be embedded also in the header as shown in FIGS. 25 and 26. Such an outside-content watermark arrangement permits easy and quick detection of the information embedded in the content as the watermark, so that a check can be made rapidly to determine whether or not the content in question is allowed to be copied.

The meta data represent such data as a jacket, photos, and lyrics regarding the content. The meta data will be described later in more detail with reference to FIG. 32.

Figure 27:
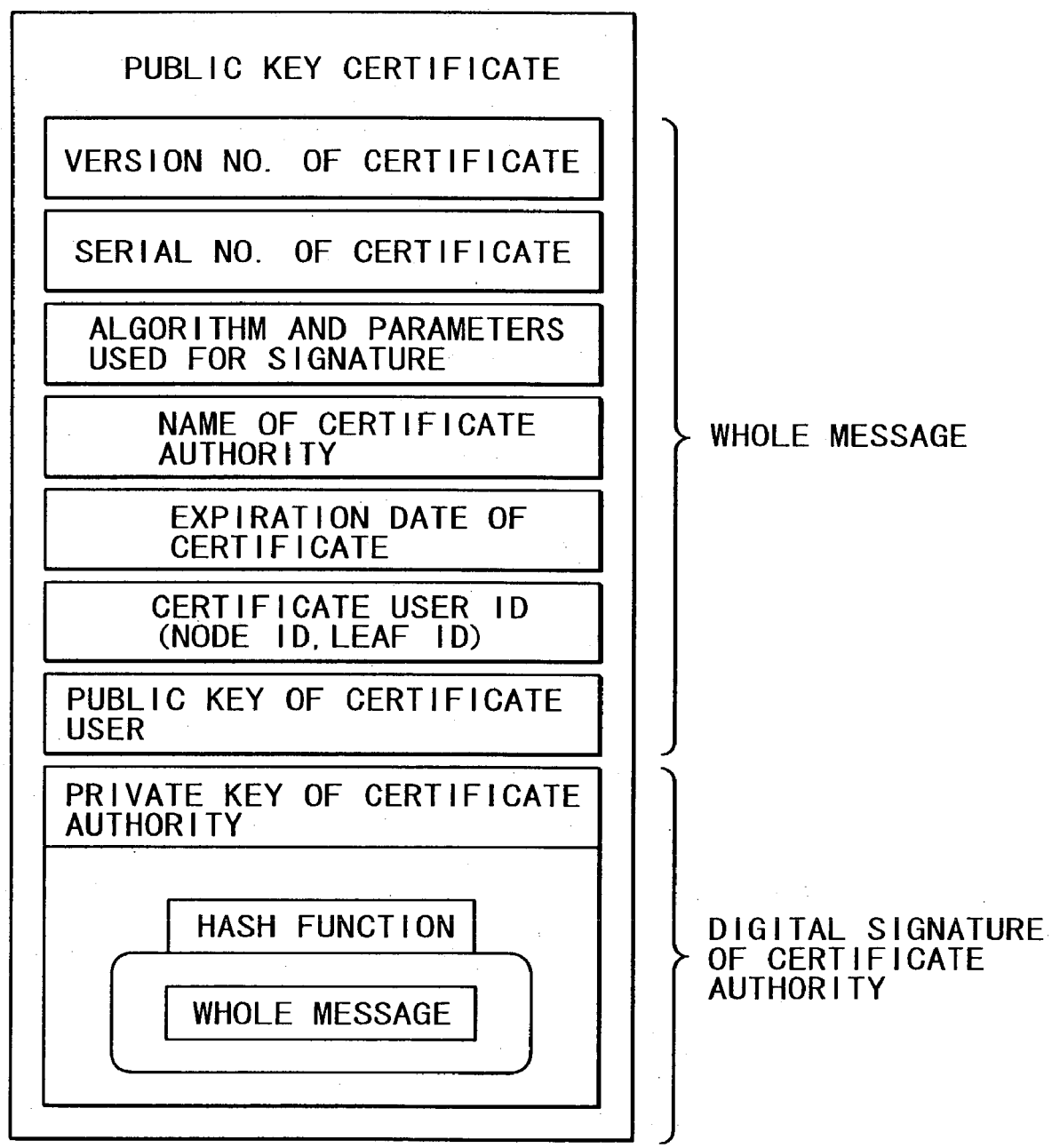
FIG. 27 is a schematic view of a typical public key certificate.

FIG. 27 schematically shows a typical public key certificate. The public key certificate is usually issued by the certificate authority (CA) of a public key cryptosystem. Illustratively, in order to prepare a public key certificate, the certificate authority supplements the user ID and public key submitted by the user with an expiration date and other information as well as a digital signature affixed by the authority. According to this invention, the license server 4 (or the content server 3) issues a certificate and a private key (thus a public key as well) to the user. In turn, the user submits his or her user ID and password to the license server 4 for registration, whereby the public key certificate is acquired.

The public key certificate in FIG. 27 has a message including a version number of the certificate, a certificate serial number assigned by the license server 4 to the certificate user, an algorithm and parameters used for a digital signature, the name of the certificate authority (license server 4), an expiration date of the certificate, the ID of the certificate user (node ID or leaf ID), and a public key of the certificate user. The message is supplemented with the digital signature prepared by the license server 4 acting as the certificate authority. The digital signature is made of data generated by use of the private key of the license server 4 on the basis of a hash value generated by applying a hash function to the message.

In the example of FIG. 12, the device 0 is assigned a node ID or a lead ID of "0000"; the device 1, the ID of "0001"; and the device 15, the ID of "1111." Such IDs determine where each device (i.e., entity) is positioned (as a leaf or a node) in the tree structure.

Where the license for granting the use of each content is distributed independent of the content in question, the content can be distributed unrestrainedly. All contents acquired in any manner or through any channels may then be handled in unified fashion.

If the file format is constituted as shown in FIG. 26, the copyright of each content in that format can be properly controlled not only when the content is distributed over the Internet but also when the content is offered to SDMI (Secure Digital Music Initiative) apparatuses.

Figure 28:
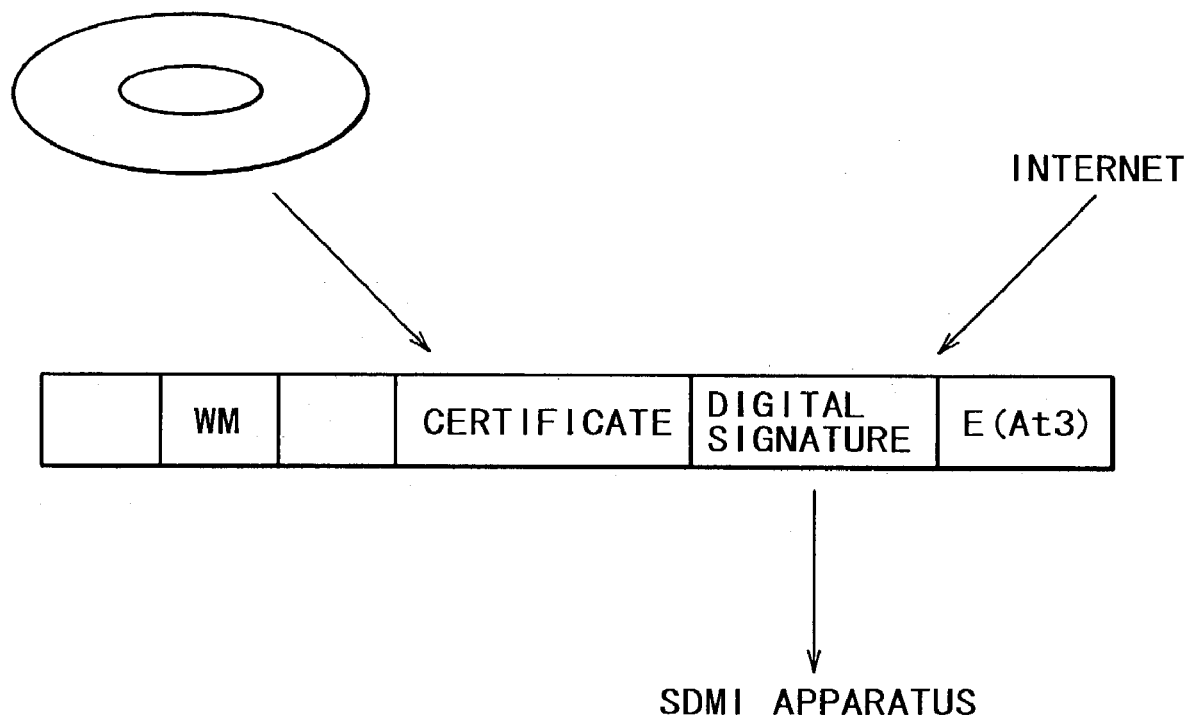
FIG. 28 is an explanatory view showing how a content is distributed.

Furthermore, if the content is distributed on a storage medium or over the Internet 2 as shown in FIG. 28, the content can be checked out to a portable device (PD) as an SDMI apparatus by resorting to the process explained above.

Figure 29:
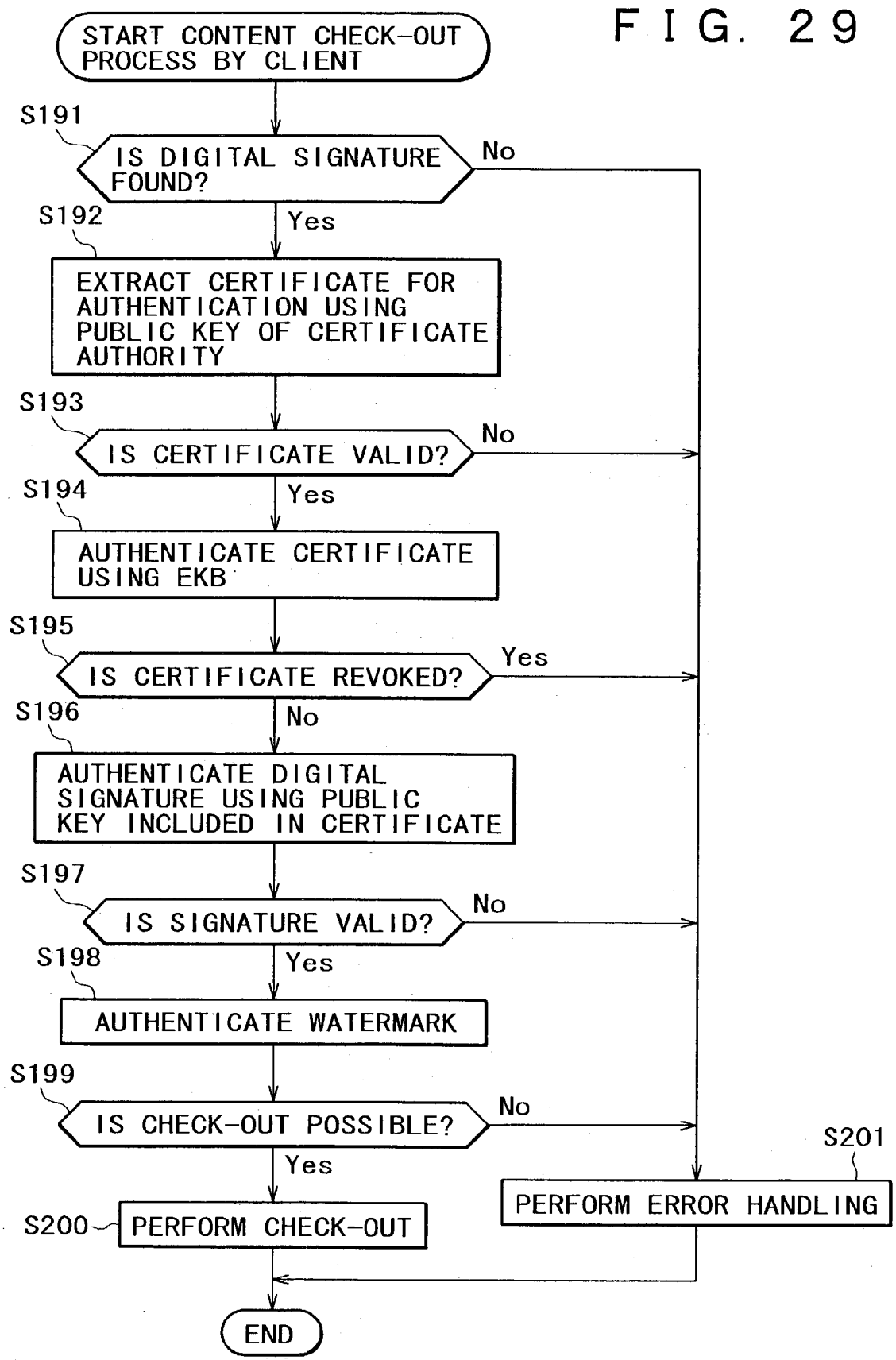
FIG. 29 is a flowchart of steps constituting a content check-out process performed by the client.

Described below with reference to the flowchart of FIG. 29 is how the client 1 checks out a content to another client (e.g., PD).

In step S191, the CPU 21 judges whether or not a digital signature is affixed to the content. If the digital signal is judged affixed, step S192 is reached. In step S192, the CPU 21 extracts a certificate from the content and authenticates it using a public key of the certificate authority (i.e., license server 4). More specifically, the client 1 acquires from the license server 4 a public key paired with the private key of the license server 4 and decrypts the digital signature affixed to the public key certificate by use of the acquired public key. As described above with reference to FIG. 27, the digital signature is prepared based on the private key of the certificate authority (license server 4) and thus can be decrypted using the public key of the license server 4. The CPU 21 further computes a hash value by applying a hash function to the whole message in the certificate. The CPU 21 compares the computed hash value with a hash value obtained by decrypting the digital signature. If the two values match, the message is judged to be free of tampering. If the two hash values differ upon comparison, the certificate is judged to have been tampered with.

In step S193, the CPU 21 checks to see whether or not the certificate has been tampered with. If the certificate is judged to be free of tampering, step S194 is reached in which the certificate is authenticated using the EKB. The authenticating process is carried out by determining whether or not it is possible to effect trace through the EKB based on the leaf ID included in the certificate (FIG. 27). How the authenticating process is performed will now be described with reference to FIGS. 30 and 31.

Figure 30:
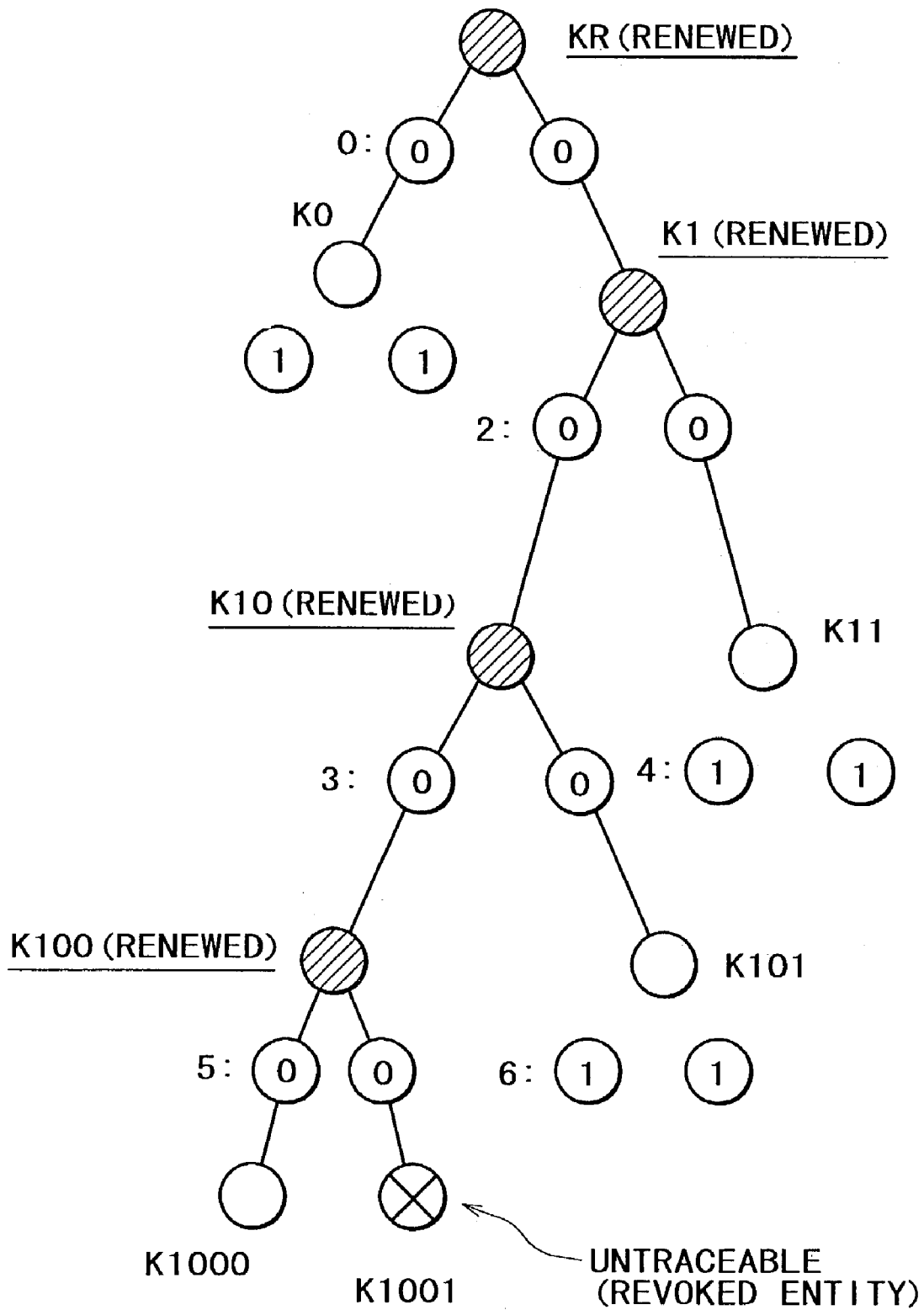
FIG. 30 is an explanatory view depicting how enabling key blocks are traced by tag.
Figure 31:
FIG. 31 is a schematic view of a typical enabling key block structure.

Suppose now that a device having a leaf key K1001 is a revoked device as shown in FIG. 30. In that case, an EKB having data (encryption keys) and tags shown in FIG. 31 is distributed to each device (leaf). The EKB is arranged so as to renew keys KR, K1, K10 and K100 for revoking the device 1001 in FIG. 30.

All leaves except the revoked device 1001 can acquire a renewed root key K(t)R. That is, since the leaves below a node key K0 each retain the unrenewed node key K0 within the device, each of these leaves can obtain a renewed root key K(t)R by decrypting an encryption key Enc(K0, K(t)R) using the key K0.

The leaves below a node 11 may each acquire a renewed node key K(t)1 by decrypting an encryption key Enc(K11, K(t)1) using a node key K11 yet to be renewed. Furthermore, an updated root key K(t)R may be obtained by decrypting an encryption key Enc(K(t)1, K(t)R) using the node key K(t)1. The leaves below a node key K101 may likewise obtain the renewed root key K(t)R.

A device 1000 having an unrevoked leaf key K1000 may acquire a node key K(t)100 by decrypting an encryption key Enc(K1000, K(t)100) using its own leaf key K1000. The node key K(t)100 thus acquired is then used successively to decrypt node keys at higher levels until the renewed root key K(t)R is obtained.

On the other hand, the revoked device 1001 is incapable of acquiring the renewed node key K(t)100 one level higher through the EKB process. That means the renewed root key K(t)R cannot be obtained.

The valid (i.e., unrevoked) device (client 1) is furnished with the EKB containing the data and tags shown in FIG. 31. The EKB is distributed by the license server 4 to each device for storage therein.

Each client may carry out an EKB tracing process using the furnished tags. The process involves determining whether or not the key distribution tree may be traced starting from the topmost root key.

Illustratively, the leaf ID "1001" of the leaf 1001 in FIG. 30 may be regarded as four-bit data (1, 0, 0, 1). A check is then made to see if the tree structure can be traced starting from the most significant bit. A "1" bit is interpreted to indicate a rightward advance and a "0" bit a leftward advance.

Because the most significant bit of the ID "1001" is "1," the trace advances right from the root key KR in FIG. 30.

The first tag (numbered 0) in the EKB is defined as 0: {0, 0}, interpreted to indicate the presence of data on both branches. Since the rightward advance is in effect in this case, the node key K1 is reached.

The trace now goes to a node below the node key K1. The second bit in the ID "1001" is 0, indicating a leftward advance. The tag numbered 1 denotes the presence or absence of data below the node key K0 to the left, and the tag numbered 2 represents the presence or absence of data below the node key K1. The latter tag is formulated as 2: {0, 0} as shown in FIG. 31, interpreted to indicate the presence of data on both branches. In this case the advance is in the leftward direction, and the node key K10 is reached.

The third bit in the ID "1001" is 0 denoting a leftward advance. The tag numbered 3 indicates the presence or absence of data below the node key K10. Formulated as 3: {0, 0}, this tag indicates the presence of data on both branches. The advance is to the left and the node key K100 is reached.

The least significant bit in the ID "1001" is "1" indicative of a rightward advance. The tag numbered 4 corresponds to the node key K11, and the tag numbered 5 denotes the sign of data under the node key K100. The latter tag is defined as 5: {0, 1} interpreted to indicate the absence of data to the right. That means the node 1001 cannot be reached. As a result, the device with the ID "1001" is judged as a revoked device, i.e., a device that is banned from acquiring any renewed root key through the EKB.

Meanwhile, a device with, say, the leaf key K1000 has the device ID of "1000." When the EKG tracing process is carried out using the tags in the EKB as described above, the node "1000" can be reached. This allows the device with the ID "1000" to be judged as a valid device.

Returning to FIG. 29, the CPU 21 in step S195 determines whether or not the certificate has been revoked based on the result of the authenticating process in step S194. If the certificate is not judged to be revoked, step S196 is reached. In step S196, the digital signature is authenticated using the public key contained in the certificate.

As shown in FIG. 27, the certificate contains the public key of the certificate user (i.e., content provider). This public key is utilized in authenticating the signature (in the header) shown in FIG. 26. More specifically, the public key is used to decrypt the digital signature Sig(Header) so as to obtain data (i.e., a hash value) for comparison with a hash value computed by applying a hash function to the header in FIG. 26. If the two hash values match, it means the header has not been tampered with. If the two hash values differ, that means the header has been tampered with.

In step S197, the CPU 21 determines whether or not the header has been tampered with. If no tampering is detected, step S198 is reached in which the watermark is authenticated. In step S199, the CPU 21 determines whether or not the result of watermark authentication justifies a check-out process. If the check-out process is judged to be allowed, then step S200 is reached in which the CPU 21 checks out the content. Specifically, the CPU 21 transfers the content to the client 1 of the check-out destination for copying.

Step S201 is reached for error handling and check-out is inhibited in any one of the following cases: if no digital signature is judged to exist in step S191; if the certificate is judged to have been tampered with in step S193; if the certificate cannot be authenticated in step S195 based on the EKB; if the result of digital signature authentication in step S197 has revealed that the header has been tampered with; or if the watermark is interpreted to require suppression of check-out in step S199.

As described, the license server 4 distributes a certificate and a private key to each user. Upon preparing a content, the user affixes a digital signature to the content to attest its integrity, whereby illegal distribution of the content is inhibited.

The watermark is extracted during preparation of the content and the watermark information is added to the digital signature. This protects the watermark information against tampering and ensures the integrity of the content.

Each content, once prepared, is thus ensured in its integrity regardless of the manner in which the content is distributed.

Since the use conditions are attached not to each content but to the license for granting the use of that content, the use conditions for all contents associated with a given license may be changed collectively as needed by simply changing the use conditions of the license in question.

How a mark is used will now be explained. As described above, use conditions are added not to contents but to licenses. It might happen that contents relative to a given license are subject to individually different usages. This state of affairs is dealt with by adding marks to the contents under a given license according to the invention.

Because one license is matched with a plurality of contents, it is difficult to specify individual usages of the contents solely in the use conditions of the corresponding license. In such cases, the use conditions are attached to individual contents for additional management purposes apart from the licenses.

Figure 32:
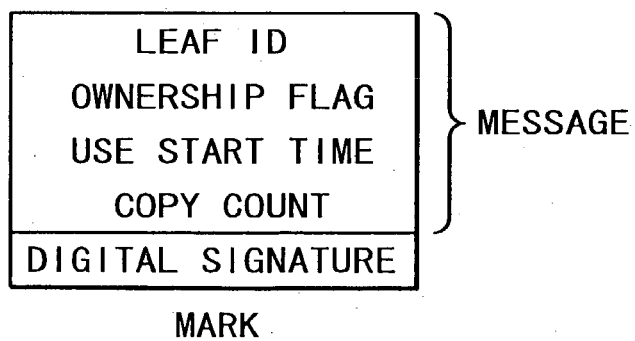
FIG. 32 is an explanatory view of a mark structure.

As shown in FIG. 32, the mark may illustratively have a user ID (leaf ID), an ownership flag, a use start time, and a copy count described therein.

The mark is also supplemented with a digital signature based on the leaf ID, ownership flag, use start time, copy count and the like constituting a message.

The ownership flag is added if the license for grating a limited-time use of the content is replaced by an outright purchase of the license (i.e., for permanent usage). The use start time is described if the content has started to be used within a specific time period. Illustratively, if the time period in which to download the content is limited, the use start time described here indicates the actual date and time at which the content is downloaded within that period. This is to certify that the content is used legitimately within the designated period.

The copy count is a log describing the number of times the content in question has been copied so far.

Figure 33:
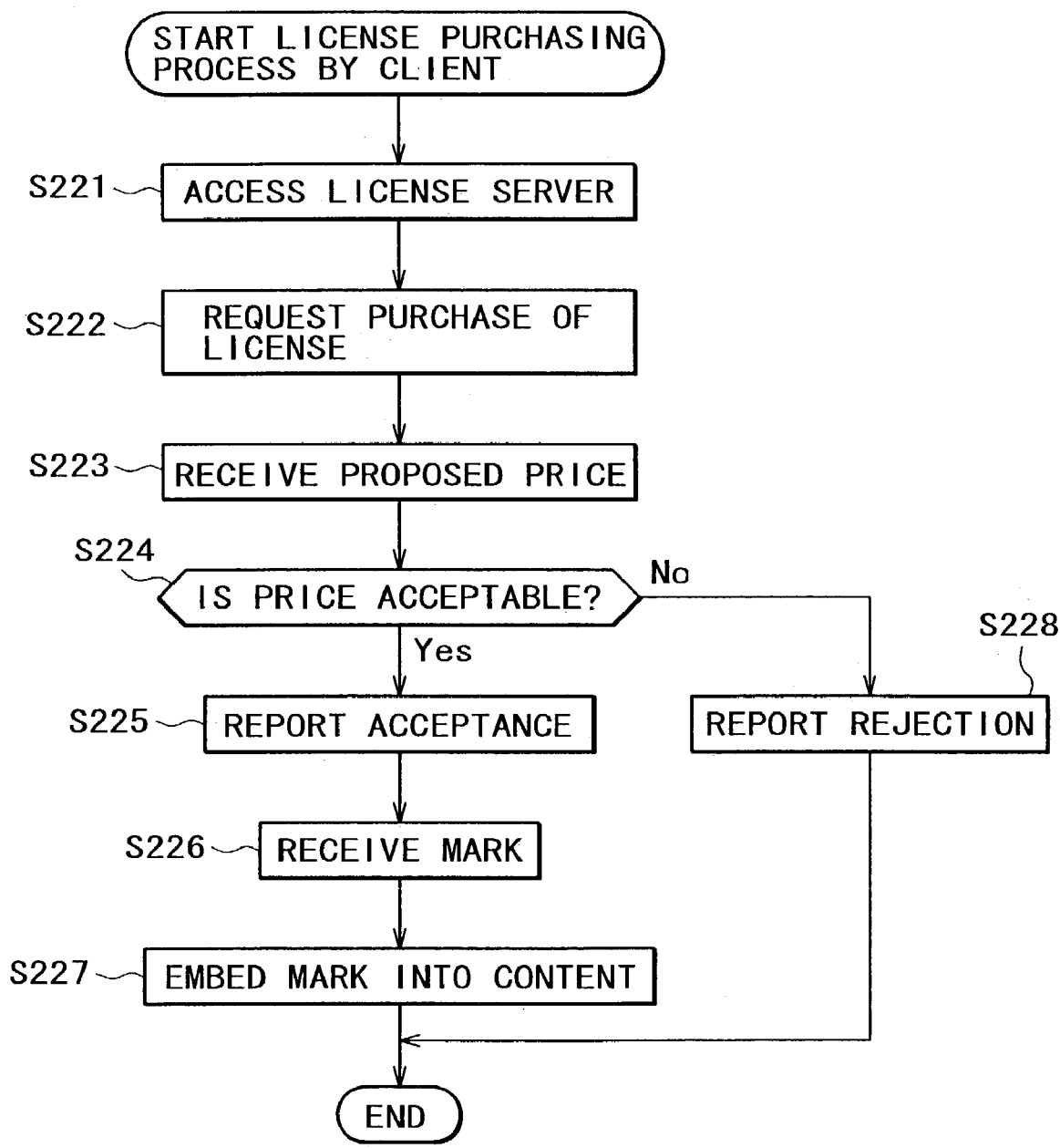
FIG. 33 is a flowchart of steps constituting a license purchasing process performed by the client.

Described below with reference to the flowchart of FIG. 33 is how a mark is added to a content when the user purchases the license for that content.

In step S221, the CPU 21 first gains access to the license server 4 over the Internet 2 in response to a command entered by the user into the input unit 26.

In step S222, the CPU 21 acquires the command input from the user through the input unit 26. In accordance with the command, the CPU 21 requests an outright purchase of the license from the license server 4.

Upon receipt of the request, the license server 4 proposes a price for the license, as will be described later with reference to the flowchart of FIG. 34 (in step S242 of FIG. 34). In step S223, the CPU 21 of the client 1 receives the proposed price from the license server 4 and causes the output unit 27 to display the price.

Upon viewing the display, the user decides whether or not to accept the proposed price. The user enters the result of his or her decision into the input unit 26.

In step S224, the CPU 21 receives the user's input through the input unit 26 and judges whether or not the user has accepted the proposed price. If the proposed price is judged accepted, the CPU 21 goes to step S225 and reports the acceptance to the license server 4.

Figure 34:
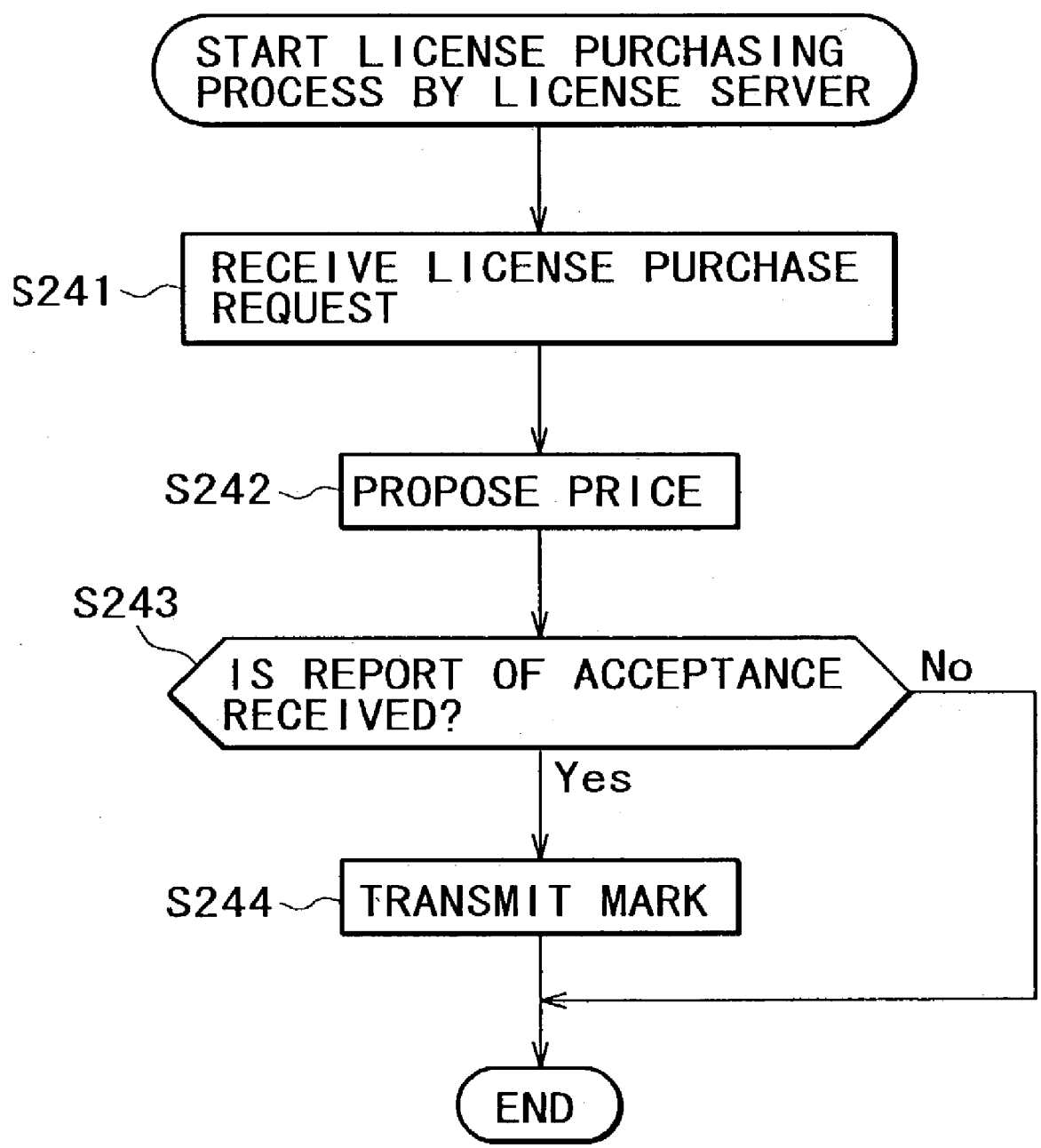
FIG. 34 is a flowchart of steps constituting a license purchasing process performed by the license server.

Given the report of the acceptance, the license server 4 returns a mark that has an ownership flag, i.e., information denoting the outright purchase of the license at the proposed price, described therein (in step S244 of FIG. 34). In step S226, the CPU 21 of the client 1 receives the mark from the license server 4. In step S227, the CPU 21 embeds the received mark into the content. This causes the mark including the ownership flag of FIG. 32 to be recorded as a mark of content relative to the purchased license in correspondence with the content. With the message thus renewed, the CPU 21 also renews the digital signature (FIG. 26) and writes the renewed signature to the storage medium.

If in step S224 the price proposed by the license server 4 is not judged accepted, step S228 is reached. In step S228, the CPU 21 reports rejection of the proposed price to the license server 4.

In conjunction with the above-described process of the client 1, the license server 4 carries out the steps in the flowchart of FIG. 34.

In step S241, the CPU 21 of the license server 4 first receives a license purchase request from the client 1 (in step S222 of FIG. 33). Upon receipt of the request, the CPU 21 goes to step S242 to retrieve from the storage unit 28 the price for the outright purchase of the license in question, and transmits the price to the client 1.

As described above, the client 1 reports either the acceptance or the rejection of the proposed price.

In step S243, the. CPU 21 of the license server 4 judges whether or not the report of the acceptance is received from the client 1. If the acceptance report is judged received, then step S244 is reached. In step S244, the CPU 21 of the license server 4 generates a mark that contains a message specifying the purchase of the license in question, affixes a digital signature to the mark using its own private key, and transmits the mark to the client 1. The mark thus transmitted is written to the applicable content in the storage unit 28 of the client 1 as described above (in step S227 of FIG. 33).

If in step S243 the acceptance report is not judged received from the client 1, then step S244 is skipped. In this case, the purchase of the license is not accomplished, so that the mark will not be transmitted.

Figures 35, 36:
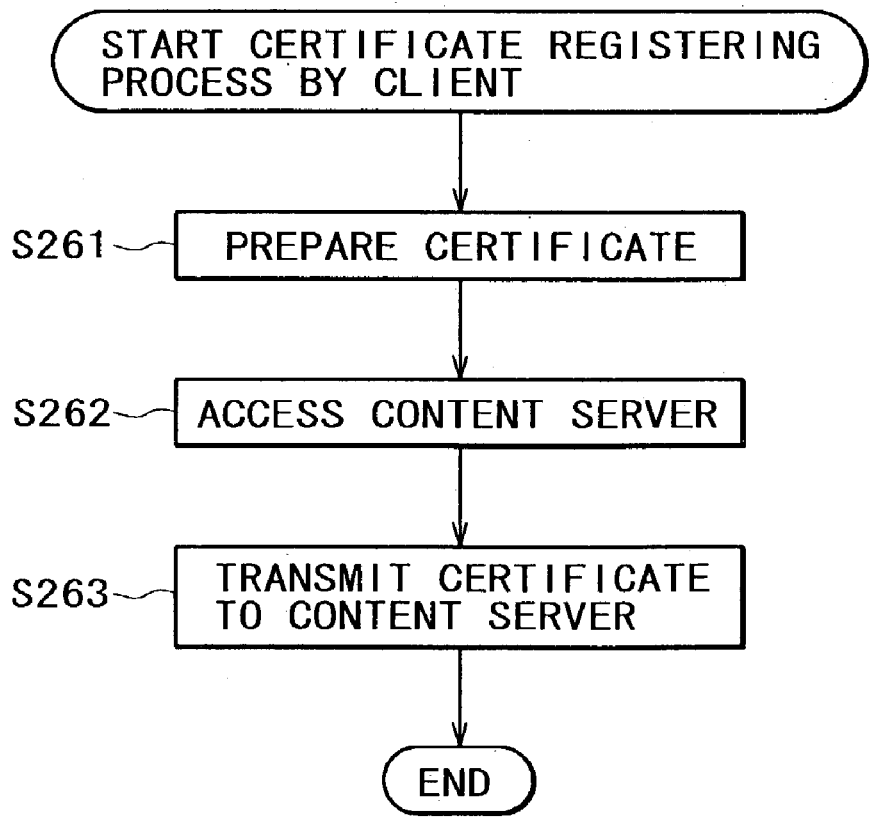
FIG. 35 is a schematic view of a typical mark structure.
FIG. 36 is a flowchart of steps constituting a certificate registering process performed by the client.

FIG. 35 shows a typical structure of a mark transmitted from the license server 4 to the client 1. In this example, the mark is made up of the user's leaf ID and his or her ownership flag (Own) and of a digital signature Sigs(LeafID, Own) generated using a private key S of the license server 4 on the basis of the leaf ID and ownership flag.

The mark is valid only for a specific content of a particular user. If the content in question is copied, the mark accompanying the copied content is invalidated.

As described, each content and its license are handled independently of one another, and the use conditions are associated with each license. This scheme makes it possible to offer diverse services reflecting the different use status of individual contents.

Described below is what is known as grouping. Grouping involves putting together a plurality of devices or storage media to form a group within which a content may be exchanged freely. Grouping usually applies to devices or storage media owned by an individual. Whereas the devices or storage media forming a single group were conventionally assigned a group key for control purposes, the target devices or storage media to be grouped may be associated with a single license for easier grouping control according to the invention.

It is also possible to register beforehand each of the devices forming a given group for the same control purpose. Typical grouping with devices registered in advance will now be described.

In this example, the user needs to register beforehand with the server the certificates of the devices to be grouped. The certificates are registered in the steps of the flowcharts in FIGS. 36 and 37.

Referring first to FIG. 36, the client (one of the devices to be grouped) has its certificate registered as follows: in step S261, the CPU 21 of the client 1 which is subjected to grouping prepares its own certificate containing its public key.

In step S262, the CPU 21 gains access to the content server 3 based on the user's input through the input unit 26. In step S263, the certificate prepared in step S261 is transmitted to the content server 3.

Alternatively, the certificate received from the license server 4 may be used unmodified for the registration.

The steps above are carried out by all devices that constitute the group in question.

Figure 37:
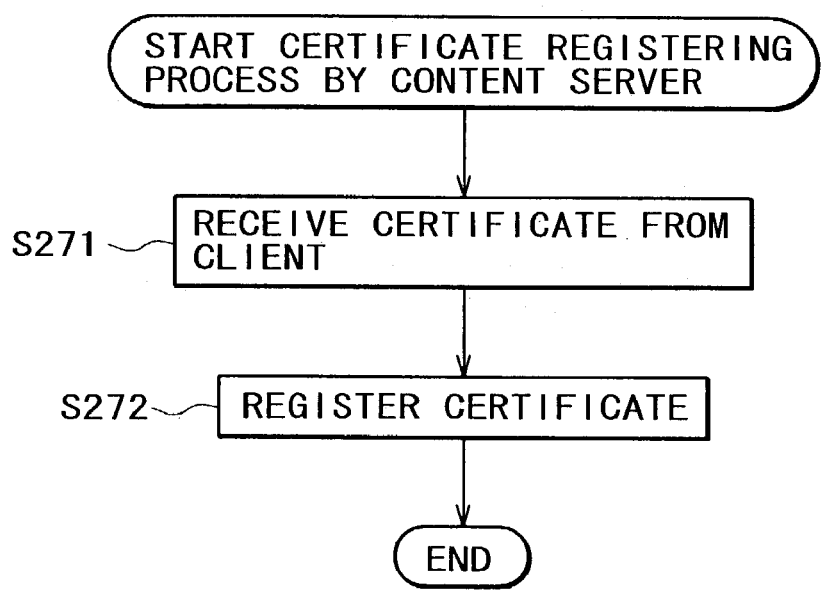
FIG. 37 is a flowchart of steps constituting a certificate registering process performed by the content server.

Described below with reference to the flowchart of FIG. 37 is how the content server 3 performs a certificate registering process in conjunction with the registering process carried out by the client 1 as shown in FIG. 36. In step S271, the CPU 21 of the content server 3 receives the certificate from the client 1. In step S272, the CPU 21 stores the received certificate into the storage unit 28.

The steps above are carried out regarding each of the devices constituting the group in question. As a result, the storage unit 28 of the content server 3 has the certificates of the devices registered in units of groups, as illustrated in FIG. 38.

Figure 38:
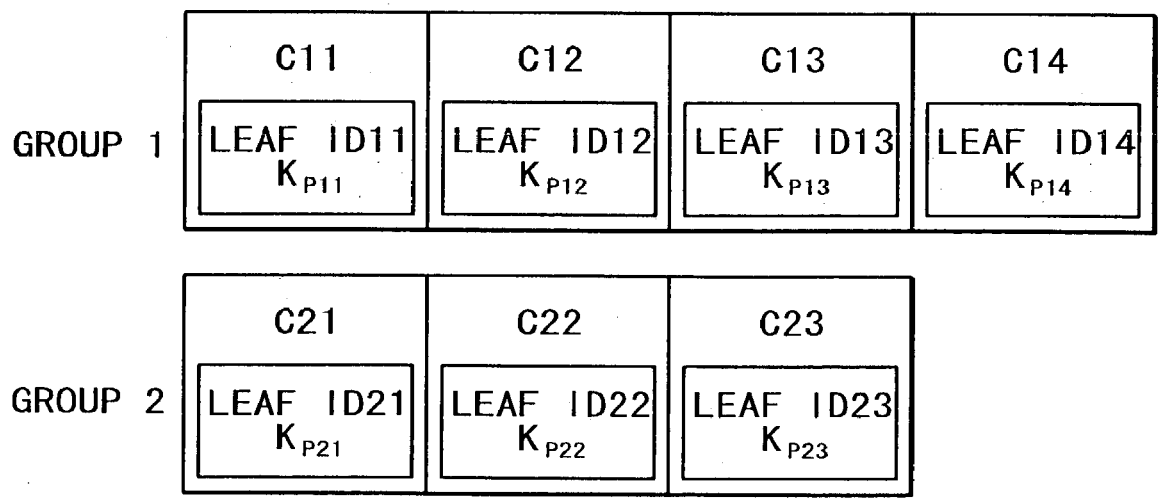
FIG. 38 is a schematic view of typical group certificates.

In the example of FIG. 38, a group 1 is matched with certificates C11 through C14 being registered. The certificates C11 through C14 contain corresponding public keys $K_{P11}$ through $K_{P14}$ respectively.

Likewise, certificates C21 through C23 are registered in association with a group 2. The certificates C21 through C23 include corresponding public keys $K_{P21}$ through $K_{P23}$ respectively.

In the manner described, the devices constituting each of the groups above have their certificates registered in advance. It might happen that a user possessing a group of devices requests the content server 3 to provide a content to the grouped devices. In that case, the content server 3 carries out the steps in the flowchart of FIG. 39.

In step S281, the CPU 21 of the content server 3 first authenticates the certificates belonging to the group in question from among the certificates held in the storage unit 28.

The authenticating process of step S281 is carried out as described above with reference to FIGS. 30 and 31, by tracing EKBs using tags based on the leaf IDs included in the certificates of the devices involved. The EKBs are also distributed to the content server 3 from the license server 4. The authenticating process rules out any certificate that has been revoked In step S282, the CPU 21 of the content server 3 selects the certificates found valid following the authenticating process of step S281. In step S283, the CPU 21 encrypts the content key using those certificates of the devices which were selected in step S282. In step S284, the CPU 21 transmits to the grouped devices the content together with the content key encrypted in step S283.

Suppose now that in the group 1 of FIG. 38, the certificate C14 is found revoked. In such a case, the process of step S283 generates encrypted data shown in FIG. 40.

Figures 39, 40:
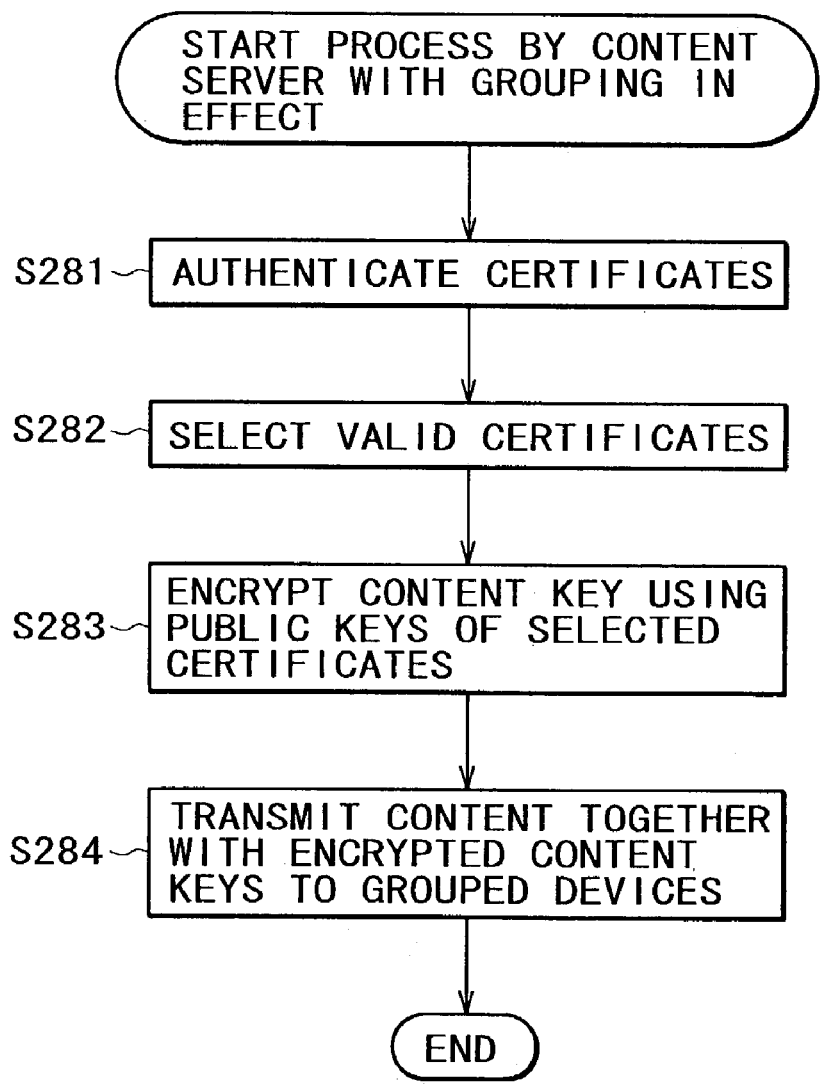
FIG. 39 is a flowchart of steps constituting a process performed by the content server where grouping is in effect.
FIG. 40 is a schematic view of an encrypted content key.

In the example of FIG. 40, the content key Kc is shown encrypted using the public key $K_{P11}$ of the certificate C11, public key $K_{P12}$ of the certificate C12, or public key $K_{P13}$ of the certificate C13.

Figure 41:
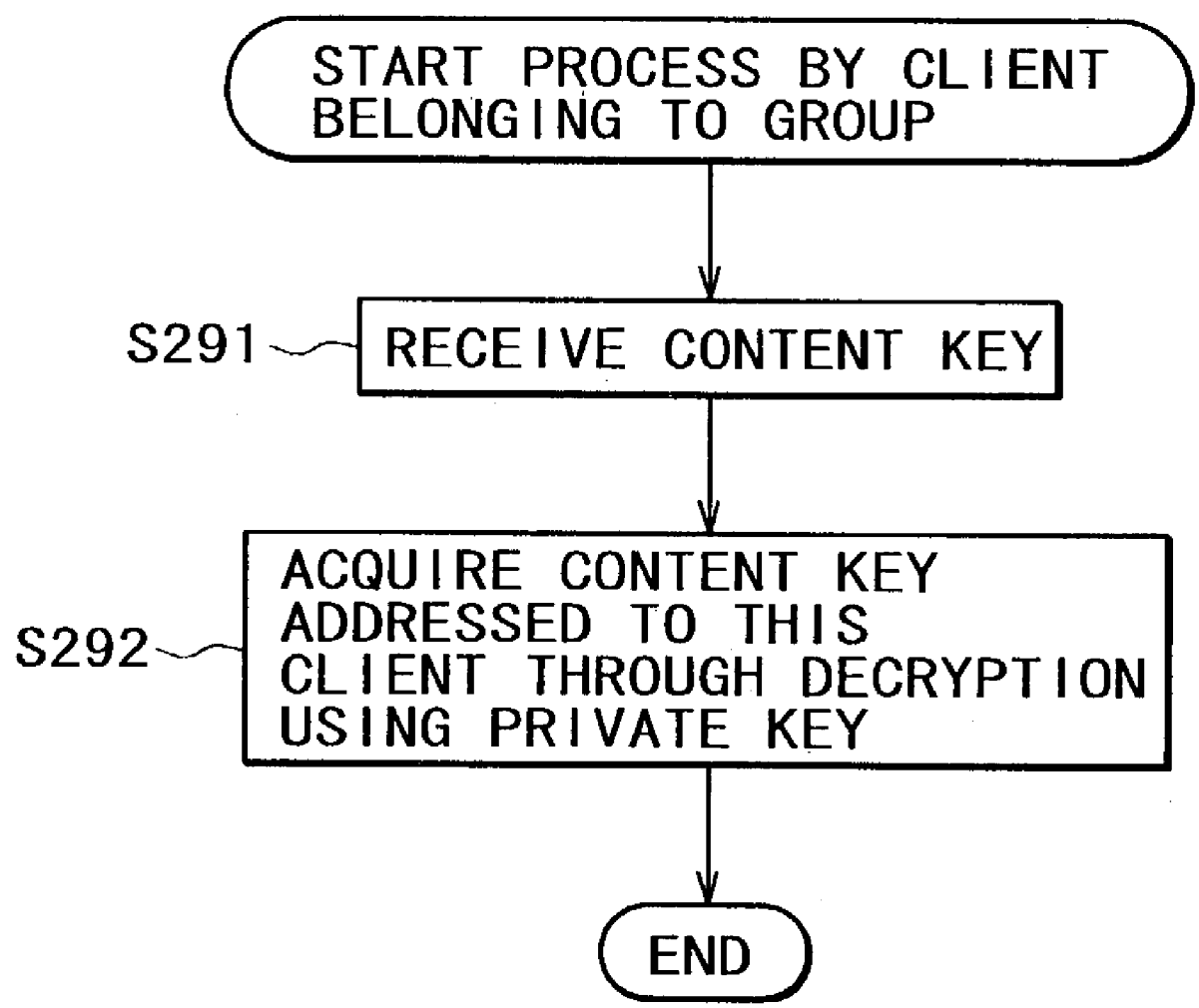
FIG. 41 is a flowchart of steps constituting a process performed by a client belonging to a group.

In conjunction with the process of FIG. 39 carried out by the content server 3, each of the grouped devices (i.e., clients) receiving the content performs the steps shown in the flowchart of FIG. 41.

In step S291, the CPU 21 of the client 1 receives the content together with the content key following its transmission from the content server 3 in step S284 of FIG. 39. The content has been encrypted by use of the content key Kc which in turn has been encrypted by the public key retained by each of the devices involved (FIG. 40).

In step S292, the CPU 21 using its own private key decrypts and acquires the content key addressed to the client, the self-addressed content key having been received in step S291. The acquired content key is then used to decrypt the content.

Illustratively, the device corresponding to the certificate C11 shown in FIG. 40 decrypts and acquires the content key Kc using its private key paired with the public key $K_{P11}$. The content key Kc is then utilized in decrypting the content.

The above-described steps are also carried out by the devices corresponding to the certificates C12 and C13. The device corresponding to the revoked certificate C14 does not receive along with the content a content key Kc that would have been encrypted by use of the public key specific to the device in question. That means the device is incapable of acquiring the content using the content key Kc.

In the foregoing description, devices are shown grouped with respect to the content key (i.e., content). Alternatively, devices may be grouped with regard to a license key (i.e., license).

In the manner described, multiple devices may be grouped for control purposes without recourse to a special group key or to an ICV (integrity check value), to be described later. The grouping procedure above is best suited for grouping a small number of devices.

According to this invention, it is also possible to checked out, check in, move or copy licenses. These processes are carried out under rules stipulated by SDMI.

How a license is checked out by a client will now be described by referring to the flowcharts of FIGS. 42 and 43.

Figure 42:
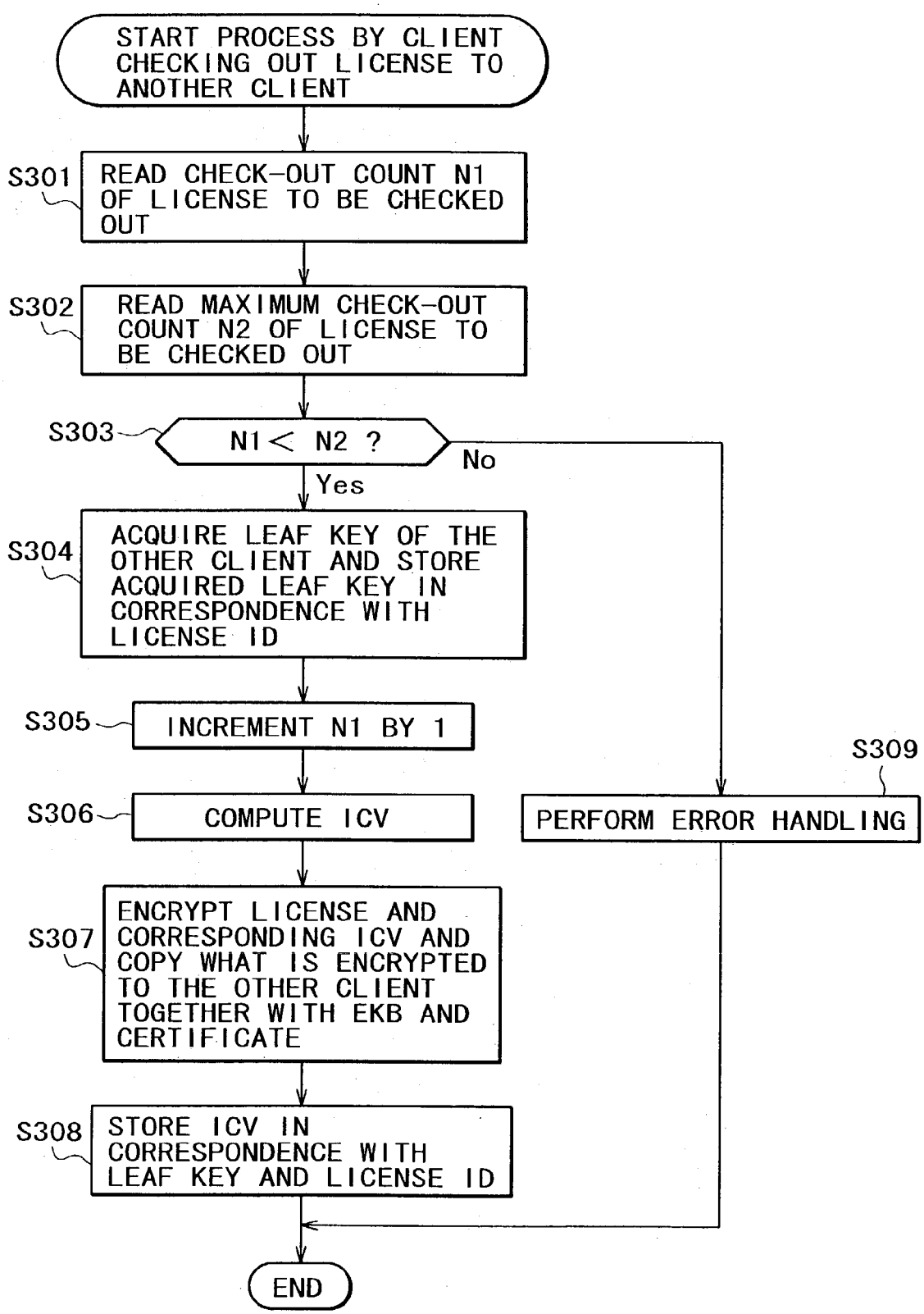
FIG. 42 is a flowchart of steps constituting a process performed by a client checking out a license to another client.

Described first are the steps in which the client checks out a license to another client, as shown in FIG. 42. In step S301, the CPU 21 of the client 1 reads a check-out count N1 of the license to be checked out. The check-out count is retrieved from the use conditions such as those shown in FIG. 8.

In step S302, the CPU 21 reads a maximum check-out count N2 of the license to be checked out. The maximum check-out count is also retrieved from the use conditions of the license.

In step S303, the CPU 21 compares the check-out count N1 retrieved in step S301 with the maximum check-out count N2 read in step S302. A check is made to see if the check-out count N1 is smaller than the maximum check-out count N2.

If the check-out count N1 is judged smaller than the maximum check-out count N2, step S304 is reached. In step S304, the CPU 21 acquires the leaf key of the other client (i.e., client of the check-out destination) and writes the acquired leaf key to a check-out list in the storage unit 28 in correspondence with the ID of the license to be checked out.

In step S305, the CPU 21 increments by 1 the check-out count N1 of the license, the count having been retrieved in step S301. In step S306, the CPU 21 computes an ICV based on the message of the license. The ICV will be described later with reference to FIGS. 47 through 51. The ICV scheme is designed to prevent the tampering of the licenses.

In step S307, the CPU 21 encrypts the license in question as well as the ICV computed in step S306 using the public key of this client, and outputs what is encrypted together with an EKB and a certificate to the other client for copying. In step S308, the CPU 21 writes the ICV computed in step S306 to a check list in the storage unit 28 in correspondence with the leaf key of the other client and the license ID.

If in step S303 the check-out count N1 is not judged smaller than (e.g., found equal to) the maximum check-out count N2, that means the maximum permissible check-out count has been exhausted so that the license can no longer be checked out. In that case, the CPU 21 goes to step S309 for error handling. The check-out process will be terminated unaccomplished.

Figure 43:
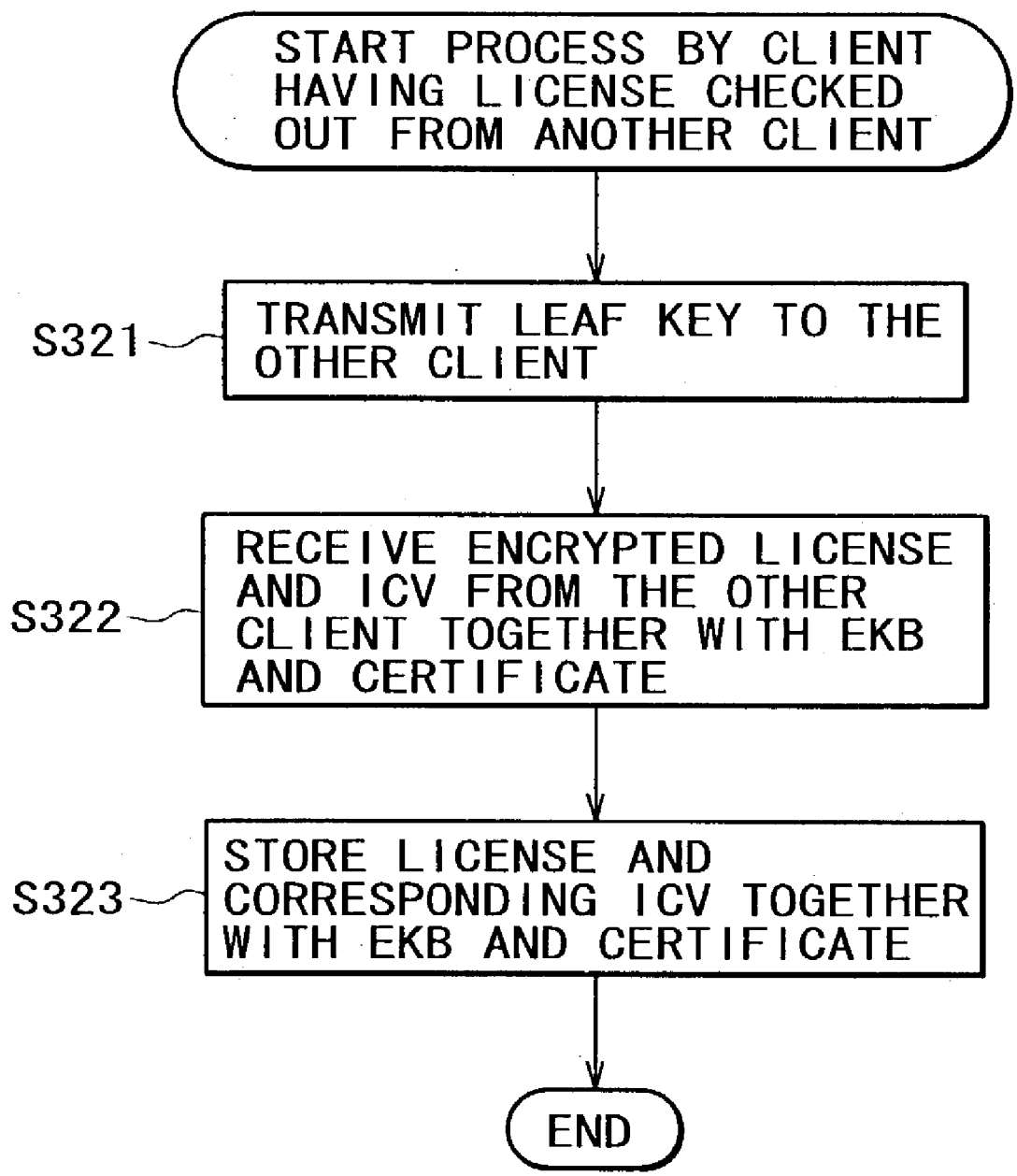
FIG. 43 is a flowchart of steps constituting a process performed by a client having a license checked out from another client.

Described below with reference to the flowchart of FIG. 43 is how a client has a license checked out from another client. This process takes place in conjunction with the check-out process of FIG. 42.

In step S321, the CPU 21 of the client 1 (of the check-out destination) transmits the leaf key of this client to another client (i.e., the license check-out source client). The leaf key is stored by the other client in correspondence with the license ID (in step S304).

In step S322, the CPU 21 receives from the other client 1 the encrypted license and ICV together with the EKB and certificate. The license, ICV, EKB, and certificate were transmitted earlier by the other client in step S307 of FIG. 42.

In step S323, the CPU 21 stores into the storage unit 28 the license, ICV, EKB, and certificate received in step S322.

Figure 44:
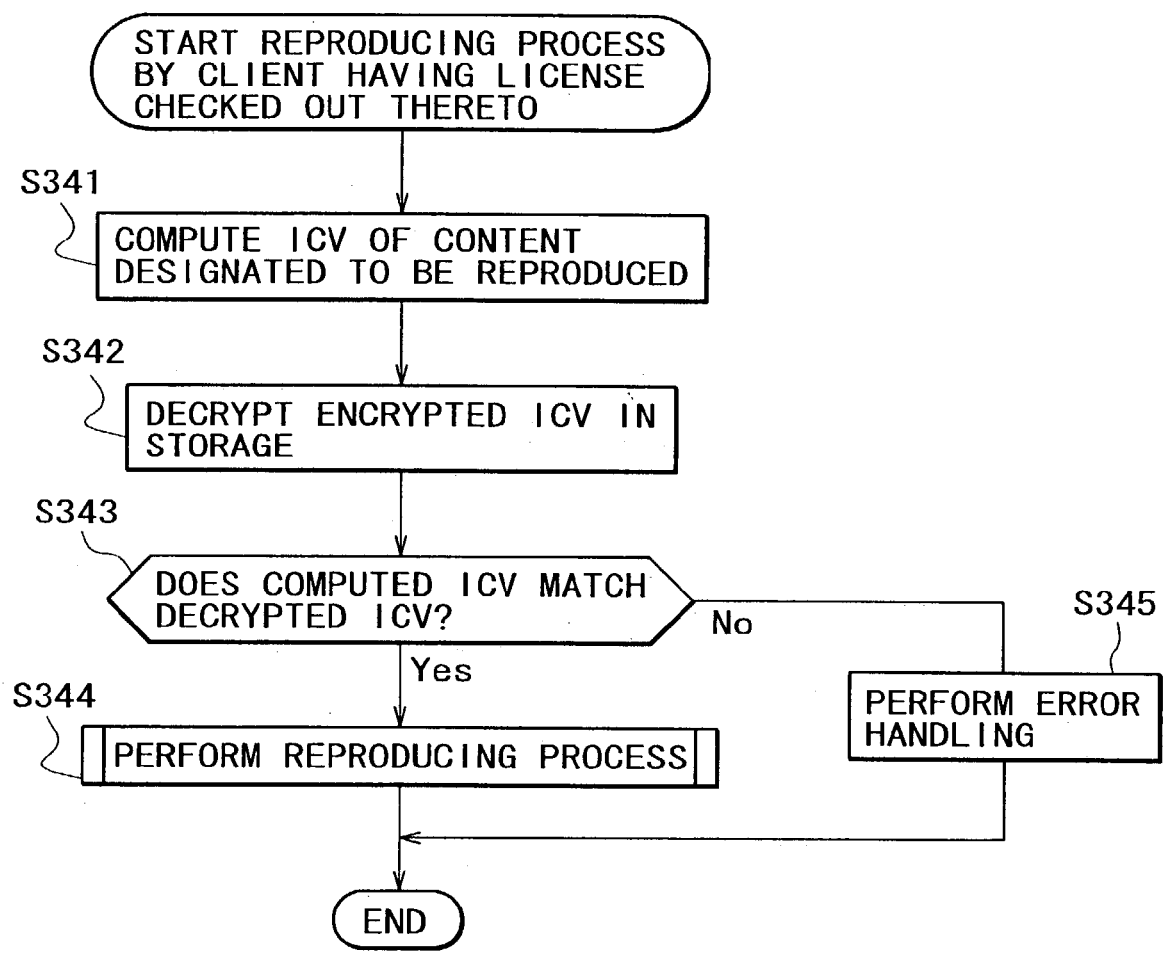
FIG. 44 is a flowchart of steps constituting a reproducing process performed by a client having a license checked out thereto.

The client 1 has the license checked out thereto from the other client in the manner described above. Thereafter, the client 1 reproduces the content corresponding to the checked-out license by carrying out the steps in the flowchart of FIG. 44.

In step S341, the CPU 21 of the client 1 computes the ICV of the content designated to be reproduced by the user through the input unit 26. In step S342, the CPU 21 decrypts the ICV in the storage unit 28 based on the public key included in the certificate.

In step S343, the CPU 21 judges whether or not the ICV computed in step S341 matches the ICV that was retrieved and decrypted in step S341. If the two values match, it means the license has not been tampered with. In that case, the CPU 21 goes to step S344 to reproduce the applicable content.

If in step S343 the two ICVs fail to match, that means the license may have been tampered with. In such a case, the CPU 21 goes to step S345 for error handling. Here, the content cannot be reproduced by use of the license in question.

Figure 45:
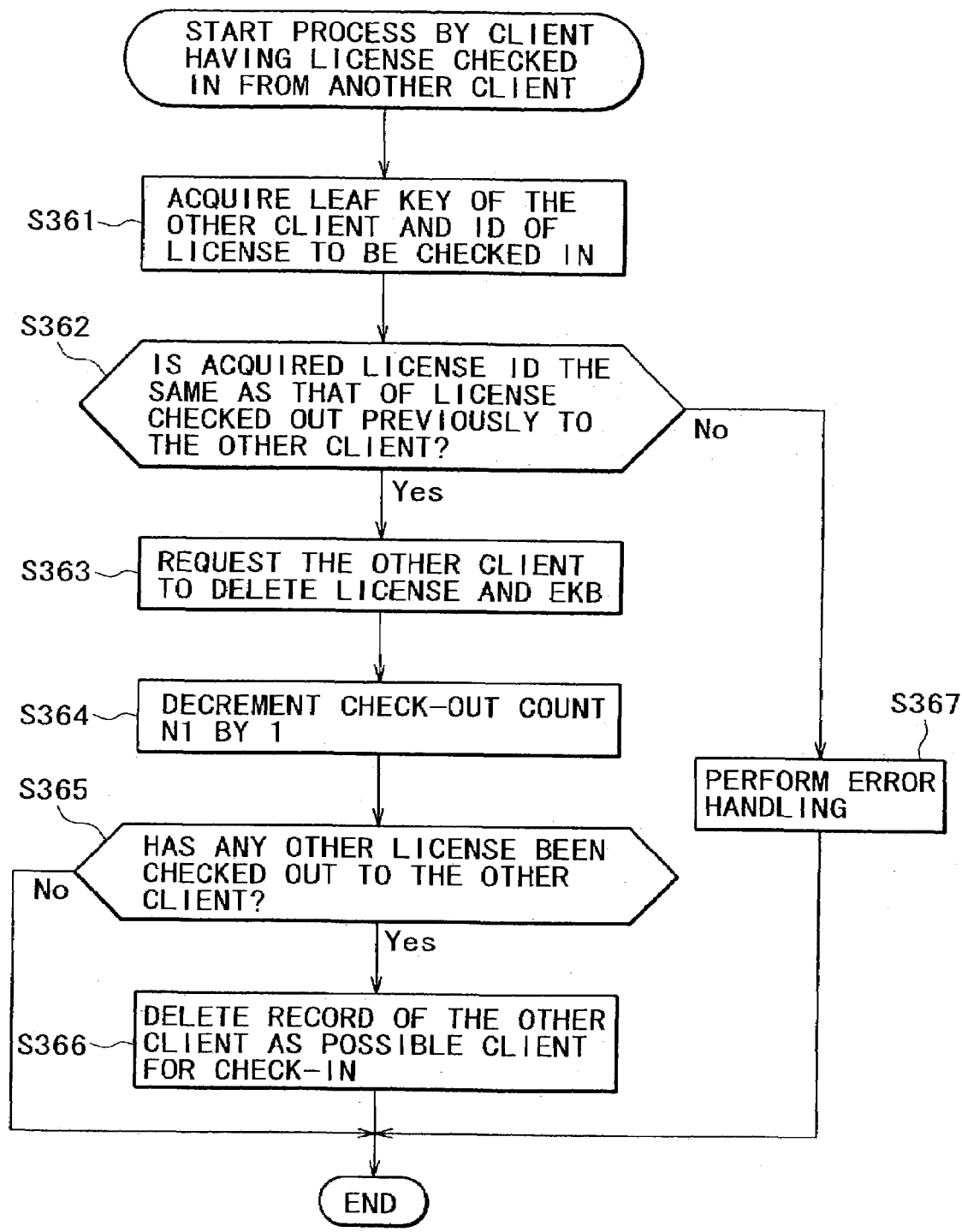
FIG. 45 is a flowchart of steps constituting a process performed by a client having a license checked in from another client.

Described below with reference to the flowchart of FIG. 45 is how a client has a previously checked-out license checked in from another client.

In step S361, the CPU 21 first acquires the leaf key of the other client (i.e., the client about to check in the license) and the ID of the license to be checked in. In step S362, the CPU 21 judges whether or not the target license whose ID was acquired in step S361 is a license previously checked out from this client to the other client. The judgment is made based on the ICV, leaf key and license ID stored in step S308 of FIG. 42. More specifically, a check is made to see whether or not the leaf key, license ID and ICV acquired in step S361 are held in the check-out list. If the leaf key, license ID and ICV are judged retained in the check-out list, that means the license in question has indeed been checked out by this client to the other client.

If the result of the check in step S362 is affirmative, then the CPU 21 goes to step S363 requesting the other client to delete the license, EKB and certificate involved. Given the request, the other client deletes the license, EKB and certificate as will be described later (in step S383 of FIG. 46).

In step S364, the CPU 21 decrements by 1 the check-out count N1 of the license in question. This is done to reflect the fact that a previously checked-out license is now returned (i.e., checked in).

In step S365, the CPU 21 determines whether or not this client has any other license still checked out to the other client. If there is no such license, step S366 is reached in which the CPU 21 deletes from the check-out list the record of the other client as a possible client for subsequent check-in. If in step S365 any other license is judged still checked out to the other client, the other client may subsequently request another check-in session and thus step S366 is skipped.

If in step S362 the license in question is not judged to be one previously checked out to the other client, then the CPU 21 goes to step S367 for error handling. In this case, the license in question is not subject to control by this client and the check-in process will not take place.

If the user has illegally copied the license, the stored ICV becomes different from the ICV computed on the basis of the license acquired in step S361. In that case, the check-in process will end unaccomplished.

Figure 46:
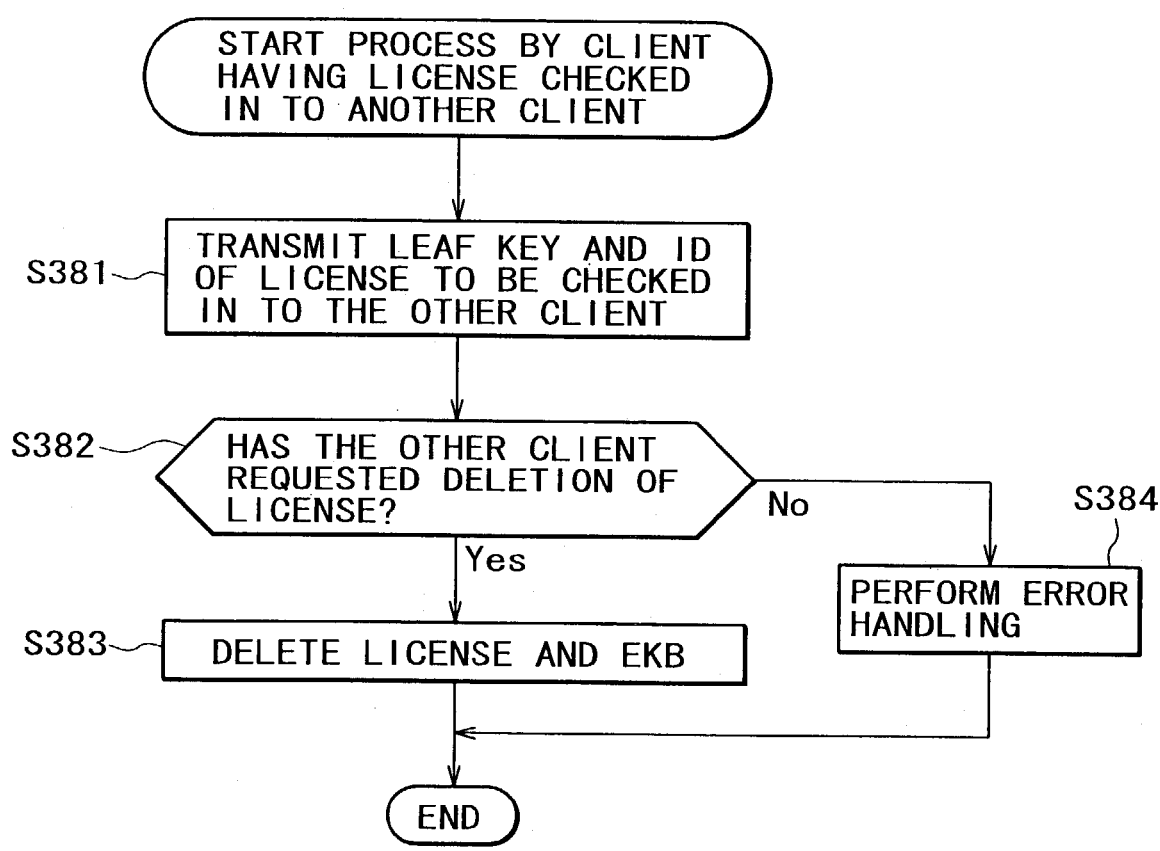
FIG. 46 is a flowchart of steps constituting a process performed by a client having a license checked in to another client.

FIG. 46 shows steps performed by a client having its license checked in to another client. This process takes place in conjunction with the license check-in process shown in the flowchart of FIG. 45.

In step S381, the CPU 21 of the client 1 transmits to another client (i.e., client 1 carrying out the steps in the flowchart of FIG. 45) the leaf key of this client 1 and the ID of the license to be checked in. As described above, the other client acquired earlier the leaf key and license ID in step S361 and authenticated the license to be checked in based on the acquired leaf key and license ID in step S362.

In step S382, the CPU 21 of this client 1 judges whether or not the other client has requested deletion of the license. That is, if the license is a legitimate license that can be checked in, the other client requests deletion of the license, EKB and certificate involved in step S363 as described above. Upon receipt of that request, the CPU 21 reaches step S383 to delete the license, EKB and certificate. Following step S383, the other client can no longer make use of the license in question. The check-out count N1 of the license is then decremented by 1 in step S364 and the check-in process is accomplished.

If in step S382 the other client is not judged to request the deletion of the license, then the CPU 21 goes to step S384 for error handling. The check-in process remains unaccomplished due to a mismatch of the ICVs involved.

In the same manner in which the check-in and check-out processes are carried out as described above, licenses can also be copied or moved from one client to another.

What follows is a description of how an integrity check value (ICV) is generated for each license, how the ICV is brought into correspondence with the license, and how the ICV is computed to determine whether or not the license in question has been tampered with. The same process applies to prevention of tampering with regard to both licenses and contents.

The ICV (integrity check value) for a given license is computed illustratively by having a hash function applied to that license as $$ICV=\mathrm{hash}(Kicv, L1, L2, \ldots)$$

where Kicv stands for an ICV generation key, and L1, L2, ... denote license information. A message authentication code (MAC) for use in ICV generation constitutes an important element of the license information.

Figure 47:
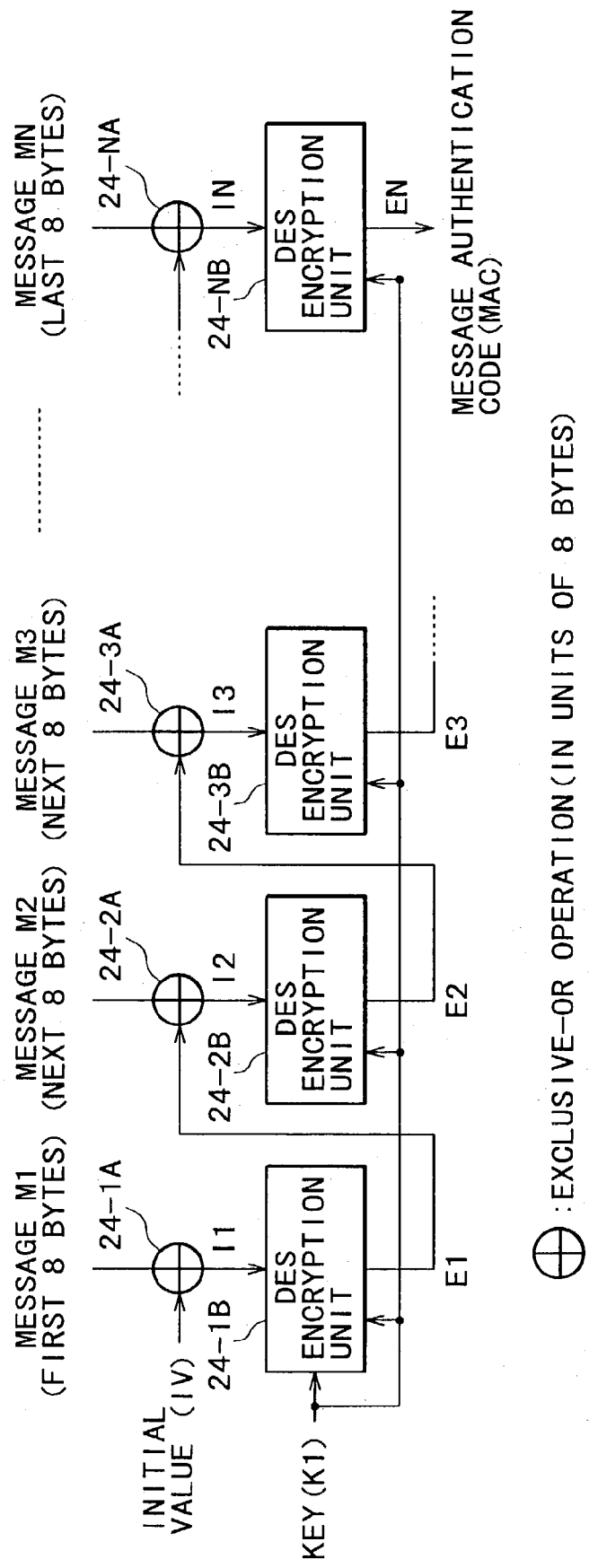
FIG. 47 is an explanatory view showing how a message authentication code (MAC) is generated.

FIG. 47 is an explanatory view showing how a message authentication code (MAC) is generated using a DES (Data Encryption Standard) arrangement. As shown in FIG. 47, a message to be encrypted by DES is divided into units of eight bytes (the divided units of the message are called divided messages M1, M2, ..., MN hereunder). First, an initial value (IV) and the divided message M are exclusively ORed by an arithmetic unit 24-1A outputting a resulting value of I1. The value I1 is input to a DES encryption unit 24-1B for an encrypting process using a key K1, the unit 24-1B outputting a resulting value of E1. The value E1 and divided message M2 are exclusively ORed by an arithmetic unit 24-2A which outputs a resulting value of I2. The value I2 is input to a DES encryption unit 24-2B for an encrypting process using the key K1, the unit 24-2B outputting a resulting value of E2. These steps are repeated to cover all divided messages. A value EN ultimately resulting from a DES encryption unit 24-NB in the most downstream stage constitutes a message authentication code (MAC).

A hash function is applied to the MAC thus acquired and to the ICV generation key for the license, whereby an integrity check value (ICV) of the license is generated. Illustratively, if the ICV created upon generation of the license is judged to be the same as the ICV produced anew based on the license, it guarantees that the license has not been tampered with. If the two ICVs are found to be different upon comparison, that means the license has been tampered with.

Described below is how the ICV generation key Kicv of a given license is typically delivered to devices using the above-described enabling key block (EKB). In this case, encrypted message data in the EKB are used as the ICV generation key for the license in question.

Figure 48:
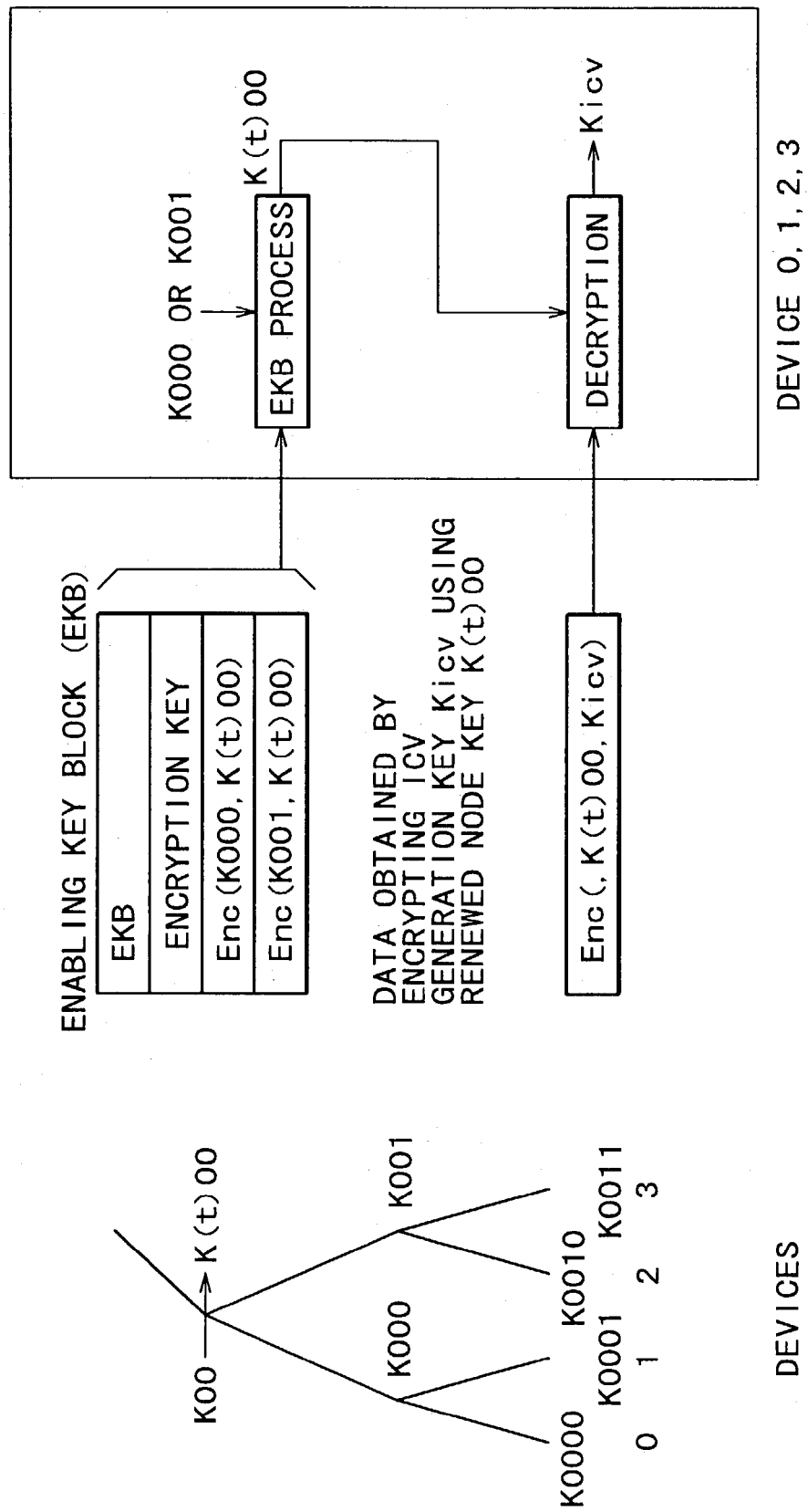
FIG. 48 is an explanatory view outlining a decrypting process of an integrity check value (ICV) generation key.
Figure 49:
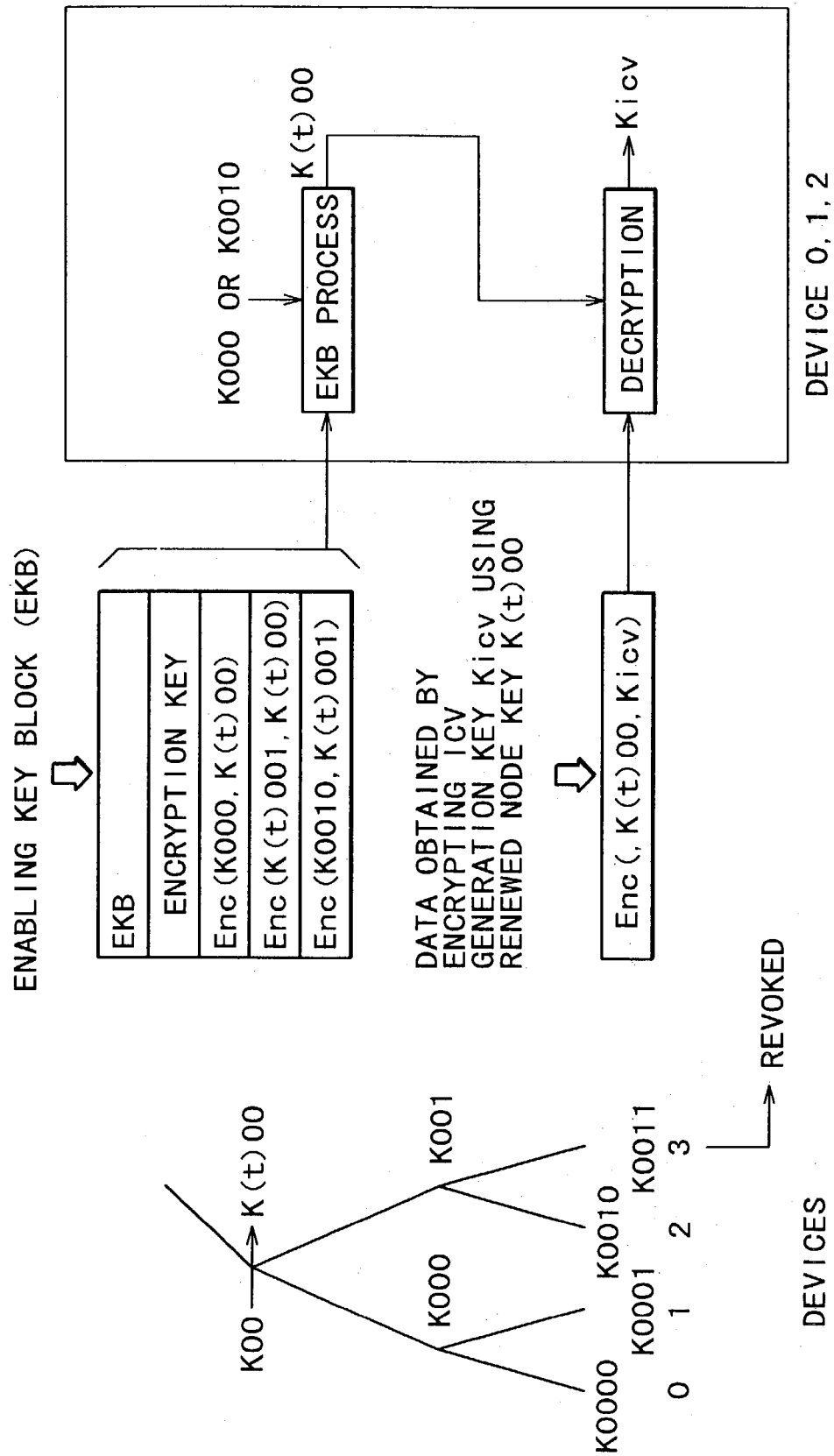
FIG. 49 is an explanatory view illustrating another decrypting process of the ICV generation key.

FIGS. 48 and 49 show examples in which a license common to a plurality of devices is sent to them with an enabling key block (EKB) used to deliver the ICV generation key Kicv for verifying the integrity of the license in question. The example of FIG. 48 involves delivering an ICV generation key Kicv decryptable by devices 0, 1, 2 and 3, while the example of FIG. 49 involves delivering an ICV generation key Kicv decryptable solely by devices 0, 1 and 2 with the device 3 revoked.

In the example of FIG. 48, a renewed node key K(t)00 is used to encrypt the ICV generation key Kicv, giving data Enc(K(t)00, Kicv). The data Enc(K(t)00, Kicv) are delivered along with the EKB from which the renewed node key K(t)00 may be decrypted by each of the devices 0, 1, 2 and 3 using their respective node keys and leaf keys. As shown on the right-hand side of FIG. 48, each device first decrypts the EKB to acquire the renewed node key K(t)00, and decrypts the encrypted ICV generation key Enc(K(t)00, Kicv) using the acquired node key K(t)00 in order to obtain the ICV generation key Kicv.

The other devices 4, 5, 6, 7, etc., even when they receive the same enabling key block (EKB), cannot acquire the renewed node key K(t)00 by decrypting the received EKB using their own node keys and leaf keys. Thus only the legitimate devices alone can receive the delivered ICV generation key.

In the example of FIG. 49, it is assumed that the device 3 in the group enclosed by broken line in FIG. 12 is revoked because of a leaked key and that the enabling key block (EKB) decryptable only by the devices 0, 1 and 2 is generated and delivered to them. The EKB and the ICV generation key Kicv in FIG. 49 are encrypted by the node key K(t)00 to produce encrypted data Enc(K(t)00, Kicv) for delivery to the devices involved.

Shown on the right-hand side of FIG. 49 are steps for decrypting the delivered EKB and encrypted data. The devices 0, 1 and 2 first acquire the renewed node key K(t)00 by decrypting the received EKB using their own leaf keys or node keys. The renewed node key K(t)00 thus acquired is then used in a decrypting process to obtain the ICV generation key Kicv.

The devices 4, 5, 6, etc., in other groups shown in FIG. 12 may receive the same data (i.e., EKB) but are incapable of acquiring the renewed node key K(t)00 from the received data using their own leaf keys or node keys. Similarly, the revoked device 3 cannot obtain the renewed node key K(t)00 using its own leaf key or node key. Only the devices with legitimate rights are capable of decrypting the ICV generation value for their use.

Where the ICV generation key is delivered by use of the EKB as described above, it is possible to implement a scheme whereby the ICV generation key is delivered in a way securely decryptable only by those entitled to receive the key with a minimum of data amount involved.

The use of the integrity check value (ICV) for licenses makes it possible to eliminate illegal copy of EKBs and encrypted licenses. Illustratively, as shown in FIG. 50A, suppose that licenses L1 and L2 are stored on a storage medium 1 together with EKBs for allowing the licenses to be acquired and that what is stored on the storage medium 1 is copied entirely to a storage medium 2. In that case, with the EKBs and licenses copied onto the storage medium 2, the copied licenses can be used by any device capable of decrypting the EKBs.

In the example of FIG. 50B, the licenses held legitimately on a given storage medium are furnished with a corresponding integrity check value ICV(L1, L2). The value ICV(L1, L2) denotes an ICV given as $ICV=\text{hash}(Kicv,L1,L2)$ which is an integrity check value computed by having a hash function applied to the licenses L1 and L2. In the example of FIG. 50B, the storage medium 1 legitimately contains the licenses L1 and L2 together with the integrity check value ICV(L1, L2) generated based on the two licenses. The storage medium 2 legitimately contains the license L1 along with an integrity check value ICV(L1) generated based on the license L1.

In the case of FIG. 50B, suppose that the EKB and the license 2 held on the storage medium 1 are copied to the storage medium 2 and that a license check value is generated anew for the storage medium 2. In that case, the integrity check value ICV(L1, L2) is generated which differs from Kicv(L1) retained on the storage medium 2. This reveals tampering with or illegal copy of the license that has been written to the storage medium. A device about to reproduce data from the storage medium carries out an ICV check before a data-reproducing step to determine whether or not there is a match between the generated ICV and the stored ICV. In case of a mismatch, the device will not reproduce data from the storage medium. This prevents reproduction of any illegally copied license.

In order to enhance security further, it is possible to generate the integrity check value (ICV) for each license on the basis of data including a renewal counter. More specifically, the ICV is computed as $ICV=\text{hash}(Kicv,\text{counter}+1,L1,L2,\ldots)$ where the counter (counter+1) is established as a value that is incremented by 1 every time the ICV is renewed. The counter value needs to be stored in a secure memory.

Where the ICV for a license cannot be held on the same storage medium as the license in question, that ICV may be held on a storage medium separate from that of the license.

Illustratively, if a license is placed onto a read-only medium, an MO, or like storage medium that is not copy-protected, then putting the corresponding ICV on the same medium may prompt an unscrupulous user illegally to renew the ICV compromising its integrity. Such an eventuality is circumvented by keeping the ICVs on a secure storage medium in the host machine so that they are retrieved as needed for license copy control (e.g., check-in, check-out, move). This scheme provides securer ICV control measures and more elaborate license tampering checks.

Figure 51:
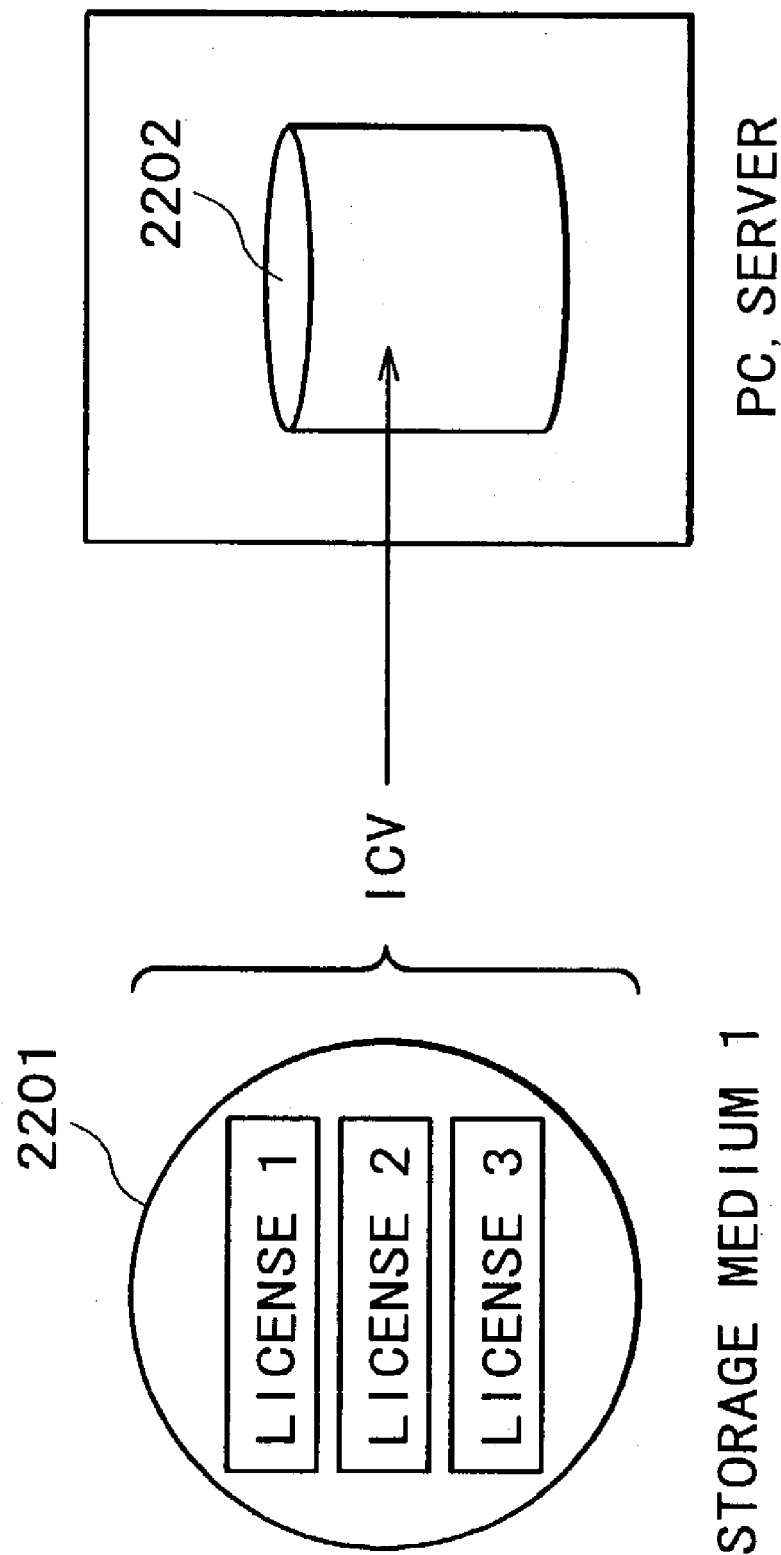
FIG. 51 is an explanatory view showing how licenses are managed.

The scheme above is typically implemented as shown in FIG. 51. In the example of FIG. 51, licenses 1, 2 and 3 are held on a storage medium 2201 such as a read-only medium, an MO or other storage medium that is not copy-protected. The ICV regarding these licenses is retained on a secure storage medium 2202 in the host machine that cannot be accessed freely by users. This arrangement prevents dishonest users from illegally renewing the integrity check value (ICV). Each device loaded with the storage medium 2201 requests the host machine such a PC or a server to perform ICV checks to determine whether or not data reproduction from the loaded storage medium is permitted. This effectively prevents illegal copying of or tampering with any license.

The clients to which this invention applies include not only so-called personal computers but also PDAs (personal digital assistants), mobile telephones and game consoles.

The series of steps described above may be executed either by hardware or by software. For software-based processing to take place, programs constituting the software may be either incorporated beforehand in dedicated hardware of a computer or installed upon use over a network or from a suitable program storage medium into a general-purpose personal computer or like equipment capable of executing diverse functions.

As shown in FIG. 2, the program storage medium is offered to users apart from computers not only as a package medium constituted by the magnetic disc 41 (including floppy discs), optical disc 42 (including CD-ROM (compact disc-read only memory) and DVD (digital versatile disc)), magneto-optical disc 43 (including MD (Mini-disc)), or semiconductor memory 44, each containing the necessary programs; but also in the form of the ROM 22 or the hard disc in the storage unit 28 which contains the programs and which are incorporated in the computers before being offered to users.

In this specification, the steps which are stored on the program storage medium and which describe the programs to be executed represent not only the processes that are carried out in the depicted sequence (i.e., on a time series basis) but also processes that are conducted parallelly or individually.

Any programs implementing security-related processes should preferably be encrypted to guard against analysis for tampering. Illustratively, the programs for carrying out cryptographic processes should be structured as tamper-resistant modules.

Information placed in the header of a content to identify the license for using that content is not limited to the license ID for uniquely identifying the license in question. In the above-described embodiments, the license ID serves as information which specifies the license granting the use of a particular content; as information which identifies the content whose use is granted by a specific license; and as information which is requested by a license request from the client 1 for identification of a given license. Alternatively, each content may include a list of information about various attributes of the content in question, and each license may comprise a conditional expression of the content whose use is granted by the license in question. In this case, the attribute information attached to each content constitutes information for identifying the license for granting the use of the content in question, and the conditional expression included in each license serves as information for specifying the content whose use is granted by the license in question; the license ID serves as information for uniquely identifying each license. These arrangements make it possible to assign a plurality of licenses to a single content, thereby providing a flexible license issuing scheme.

The content data are not limited to music data. Contents may be constituted illustratively by image data, moving image data, text data, animation data, software programs, or a combination of any of them.

In this specification, the term "system" refers to an entire configuration made up of a plurality of component devices.

INDUSTRIAL APPLICABILITY

In the information processing apparatus according to the first, second, third, and fourth aspects of the invention, a header including a watermark, certificate, digital signature, encrypted content, and key information are all formatted into a file format. Thus the information processing apparatus can output content in a format capable of managing copyrights under SDMI provisions as well as the copyrights for contents distributed over the network such as the Internet.

In the information processing apparatus according to the fifth, sixth, seventh, and eighth aspects of the invention, the authorization process is performed by use of the certificate and digital signature and the output of content is controlled on the basis of watermark of the header. This can prevent the use of a content illegally copied against the SDMI system and a content illegally copied over the Internet.

The invention claimed is:

1. An information processing apparatus for providing content, said apparatus comprising:
content acquiring means for acquiring data that includes the content and an embedded watermark;
extracting means for extracting the embedded watermark from the acquired data;
header preparing means for preparing a header that is appended to the content and placing the extracted watermark into the header;
digital signature preparing means for preparing, using a private key, a digital signature based on data in the header;
encrypting means for encrypting the content;
key information acquiring means for acquiring key information that includes key information needed to decrypt the encrypted content; and
formatting means for formatting the header, the digital signature, the encrypted content, and the acquired key information according to a file format before being outputted.

2. The information processing apparatus according to claim 1, wherein the watermark includes copy control information.

3. The information processing apparatus according to claim 1, wherein the header includes content identification information for identifying the content and includes license specifying information for specifying a license for the content.

4. The information processing apparatus according to claim 1, further comprising certificate acquiring means for acquiring a certificate that includes a public key which is paired with the private key; wherein said formatting means formats the acquired certificate into the file format before outputting the formatted certificate.

5. In an information processing apparatus, an information processing method for providing content, said information processing method comprising:
acquiring data that includes the content and an embedded watermark;
extracting the embedded watermark from the acquired data;
preparing a header, including placing the extracted watermark into the header;
preparing a digital signature based on data located in the header using a private key;
encrypting the content;
acquiring key information that included key information needed to decrypt the encrypted content; and
formatting the header, the digital signature, the encrypted content, and the key information according to a file format before being outputted.

6. A computer-readable storage medium storing a program for carrying out an information processing method for providing content, said information processing method comprising:
acquiring data that includes the content and an embedded watermark;
extracting the embedded watermark from the acquired data;
preparing a header, including placing the extracted watermark into the header;
preparing a digital signature based on data located in the header using a private key;
encrypting the content;
acquiring key information that included key information needed to decrypt the encrypted content; and
formatting the header, the digital signature, the encrypted content, and the key information according to a file format before being outputted.

7. A system, comprising:
a first information processing apparatus for providing content, including:
content acquiring means for acquiring data that includes the content and an embedded watermark,
extracting means for extracting the embedded watermark from the acquired data, header preparing means for preparing a header that is appended to the content and placing the extracted watermark into the header,
digital signature preparing means for preparing, using a private key, a digital signature based on data in the header,
encrypting means for encrypting the content,
key information acquiring means for acquiring key information that includes key information needed to decrypt the encrypted content, and
formatting means for formatting the header, the digital signature, the encrypted content, and the key information according to a file format,
output means for outputting what is formatted as file formatted data; and
a second information processing apparatus for outputting content, including:
input means for inputting the file formatted data,
content acquiring means for acquiring the encrypted content from the file formatted data,
key information detecting means for detecting the key information in the file formatted data,
content key acquiring means for acquiring, from the detected key information, a content key needed to decrypt the encrypted content,
decrypting means for decrypting the encrypted content using the acquired content key,
certificate detecting means for detecting a certificate in the file formatted data,
first authenticating means for authenticating the detected certificate using a first public key obtained from a certificate authority,
public key acquiring means for acquiring, from the detected certificate, a second public key of a content provider providing the content,
digital signature detecting means for detecting the digital signature in the file formatted data,
second authenticating means for authenticating the detected digital signature using the second public key,
watermark detecting means for detecting the watermark of the header of the file formatted data, and
controlling means for controlling output of the content based on the detected watermark.

8. An information processing method for providing and outputting content, said information processing method comprising:
acquiring data that includes the content and an embedded watermark;
extracting the embedded watermark from the acquired data;
preparing a header that is appended to the content and placing the extracted watermark into the header;
preparing, using a private key, a digital signature based on data in the header;
encrypting the content;
acquiring key information that includes key information needed to decrypt the encrypted content;
formatting the header, the digital signature, the encrypted content, and the key information according to a file format into file formatted data;
acquiring the encrypted content from the file formatted data;
detecting the key information in the file formatted data;
acquiring a content key needed to decrypt the encrypted content using the detected key information;
decrypting the encrypted content using the acquired content key;
detecting a certificate in the file formatted data;
authenticating the detected certificate using a first public key obtained from a certificate authority;
acquiring, from the detected certificate, a second public key of a content provider that provides the acquired content;
detecting the digital signature in the file formatted data;
authenticating the detected digital signature using the second public key;
detecting the watermark of the header of the file formatted data; and
controlling output of the content based on the detected watermark.

9. A computer-readable storage medium storing a program for carrying out an information processing method for providing and outputting content, said information processing method comprising:
acquiring data that includes the content and an embedded watermark;
extracting the embedded watermark from the acquired data;
preparing a header that is appended to the content and placing the extracted watermark into the header;
preparing, using a private key, a digital signature based on data in the header;
encrypting the content;
acquiring key information that includes key information needed to decrypt the encrypted content;
formatting the header, the digital signature, the encrypted content, and the key information according to a file format into file formatted data;
acquiring the encrypted content from the file formatted data;
detecting the key information in the file formatted data;
acquiring a content key needed to decrypt the encrypted content using the detected key information;
decrypting the encrypted content using the acquired content key;
detecting a certificate in the file formatted data;
authenticating the detected certificate using a first public key obtained from a certificate authority;
acquiring, from the detected certificate, a second public key of a content provider that provides the acquired content;
detecting the digital signature in the file formatted data;
authenticating the detected digital signature using the second public key;
detecting the watermark of the header of the file formatted data; and
controlling output of the content based on the detected watermark.

* * * * *